(12) United States Patent
Prentice

(10) Patent No.: US 8,731,781 B2
(45) Date of Patent: May 20, 2014

(54) DYNAMICALLY-SUPPORTED MOVABLE DOWNFORCE-GENERATING UNDERBODY IN A MOTOR VEHICLE

(76) Inventor: Michael Prentice, Reno, NV (US)

( * ) Notice: Subject to any disclaimer, the term of this patent is extended or adjusted under 35 U.S.C. 154(b) by 0 days.

(21) Appl. No.: 13/413,064

(22) Filed: Mar. 6, 2012

(65) Prior Publication Data

US 2013/0238198 A1 Sep. 12, 2013

(51) Int. Cl.
*G06F 7/00* (2006.01)
*B62D 35/00* (2006.01)

(52) U.S. Cl.
USPC ..... 701/49; 296/180.1; 296/180.5; 296/181.5

(58) Field of Classification Search
CPC ........ B62D 24/02; B62D 24/04; B62D 27/00; B62D 27/06; B62D 21/11; B62D 21/14
USPC ........... 701/49; 296/37.3, 180.5, 181.5, 180.1
See application file for complete search history.

(56) References Cited

U.S. PATENT DOCUMENTS

| | | | |
|---|---|---|---|
| 2,719,053 A | 9/1955 | McInnis | |
| 2,955,869 A | 10/1960 | Blaser | |
| 3,524,672 A | 8/1970 | Rawlings | |
| 3,768,582 A | 10/1973 | Phillippe | |
| 3,776,587 A | 12/1973 | Oxlade | |
| 3,851,912 A * | 12/1974 | Grosseau | 296/35.1 |
| 4,049,309 A | 9/1977 | Seal | |
| 4,072,336 A | 2/1978 | Ruzicka | |
| 4,248,455 A * | 2/1981 | Manning | 280/6.152 |
| 4,386,801 A | 6/1983 | Chapman | |
| 4,569,551 A | 2/1986 | Rauser et al. | |
| 4,770,457 A | 9/1988 | Tomforde | |
| 4,772,060 A | 9/1988 | Kretschmer | |
| 4,896,749 A | 1/1990 | Walker | |
| 4,946,218 A | 8/1990 | Jurik | |
| 5,016,912 A * | 5/1991 | Smith et al. | 280/6.151 |
| 5,280,990 A | 1/1994 | Rinard | |
| 5,322,340 A * | 6/1994 | Sato et al. | 296/180.1 |

(Continued)

FOREIGN PATENT DOCUMENTS

| | | |
|---|---|---|
| CA | 1149841 A1 | 7/1983 |
| DE | 710241 C | 9/1941 |

(Continued)

OTHER PUBLICATIONS http://en.wikipedia.org/wiki/Ground_effect_(cars), Visited on Jun. 9, 2011.

(Continued)

*Primary Examiner* — Fadey Jabr
*Assistant Examiner* — Angelina Shudy
(74) *Attorney, Agent, or Firm* — Gerry J. Elman; Elman Technology Law, P.C.

(57) ABSTRACT

A downforce-generating device for improving motor vehicle control is described. The device includes a movable underbody with a suspension-mounted support system such that the movable underbody transfers downforce load to, and moves with, the wheels of the vehicle. The suspension-mounted support system is adapted to functionally or physically disengage the movable underbody from the suspension of the vehicle upon lifting the movable underbody with a separate retraction system. A height-adjustment system may be provided to precisely control the ride height and orientation of the movable underbody relative to the roadway during vehicle travel.

21 Claims, 41 Drawing Sheets

(56) References Cited

U.S. PATENT DOCUMENTS

| | | | |
|---|---|---|---|
| 5,333,969 A * | 8/1994 | Blaha et al. | 404/91 |
| 5,419,608 A | 5/1995 | Takemoto | |
| 5,530,648 A * | 6/1996 | Lavey | 701/37 |
| 6,007,102 A | 12/1999 | Helmus | |
| 6,202,010 B1 * | 3/2001 | Shono et al. | 701/37 |
| 6,279,488 B1 * | 8/2001 | Hachmann et al. | 105/453 |
| 6,336,515 B1 | 1/2002 | Secondari | |
| 6,575,522 B2 * | 6/2003 | Borghi et al. | 296/180.5 |
| 6,644,720 B2 * | 11/2003 | Long et al. | 296/180.4 |
| 6,654,998 B1 * | 12/2003 | Berdan et al. | 29/464 |
| 6,742,616 B2 | 6/2004 | Leban | |
| 6,968,918 B2 * | 11/2005 | Chernoff et al. | 180/313 |
| 7,093,889 B2 | 8/2006 | Graham | |
| 7,380,869 B2 * | 6/2008 | Nakaya | 296/180.1 |
| 7,497,502 B2 | 3/2009 | Wood | |
| 7,654,544 B2 | 2/2010 | Lounsberry | |
| 7,661,753 B2 * | 2/2010 | Shinedling et al. | 296/180.5 |
| 7,695,050 B2 * | 4/2010 | Neale | 296/180.1 |
| 7,717,494 B2 | 5/2010 | Nagahama | |
| 7,740,303 B2 | 6/2010 | Wood | |
| 7,748,772 B2 | 7/2010 | Boivin | |
| 7,753,755 B2 | 7/2010 | Clark | |
| 7,828,368 B2 * | 11/2010 | Ortega et al. | 296/181.5 |
| 2004/0049330 A1 * | 3/2004 | Fioriletta et al. | 701/37 |
| 2005/0040637 A1 * | 2/2005 | Wood | 280/768 |
| 2009/0085370 A1 * | 4/2009 | Bartel et al. | 296/178 |
| 2010/0125389 A1 * | 5/2010 | Talty et al. | 701/37 |
| 2011/0035103 A1 * | 2/2011 | Arenz | 701/37 |
| 2011/0068566 A1 * | 3/2011 | Bartel et al. | 280/788 |
| 2011/0079969 A1 * | 4/2011 | Amlie et al. | 280/6.159 |
| 2011/0095563 A1 * | 4/2011 | Andersen | 296/180.1 |
| 2012/0013113 A1 * | 1/2012 | Trenne et al. | 280/849 |
| 2012/0046828 A1 * | 2/2012 | Lanzilotta et al. | 701/37 |
| 2012/0146307 A1 * | 6/2012 | Kim | 280/124.159 |
| 2013/0154553 A1 * | 6/2013 | Steele | 320/108 |
| 2013/0168165 A1 * | 7/2013 | Bartel et al. | 180/41 |

FOREIGN PATENT DOCUMENTS

| | | |
|---|---|---|
| EP | 30122 B1 | 6/1981 |
| ES | 8201912 A1 | 4/1982 |
| FR | 1063557 A1 | 5/1954 |
| FR | 2062016 A5 | 6/1971 |
| FR | 2363472 A1 | 3/1978 |
| FR | 2822430 A1 | 9/2002 |
| FR | 2846290 A1 | 4/2004 |
| GB | 1419497 A | 12/1975 |
| GB | 2269142 A | 2/1994 |
| GB | 2344854 A | 6/2000 |
| JP | 56146475 A | 11/1981 |
| JP | 2005053321 A | 3/2005 |
| JP | 2011057147 A | 3/2011 |

OTHER PUBLICATIONS http://www.symscape.com/blog/secrets_of_diffusers, Visited on Jun. 9, 2011.

* cited by examiner

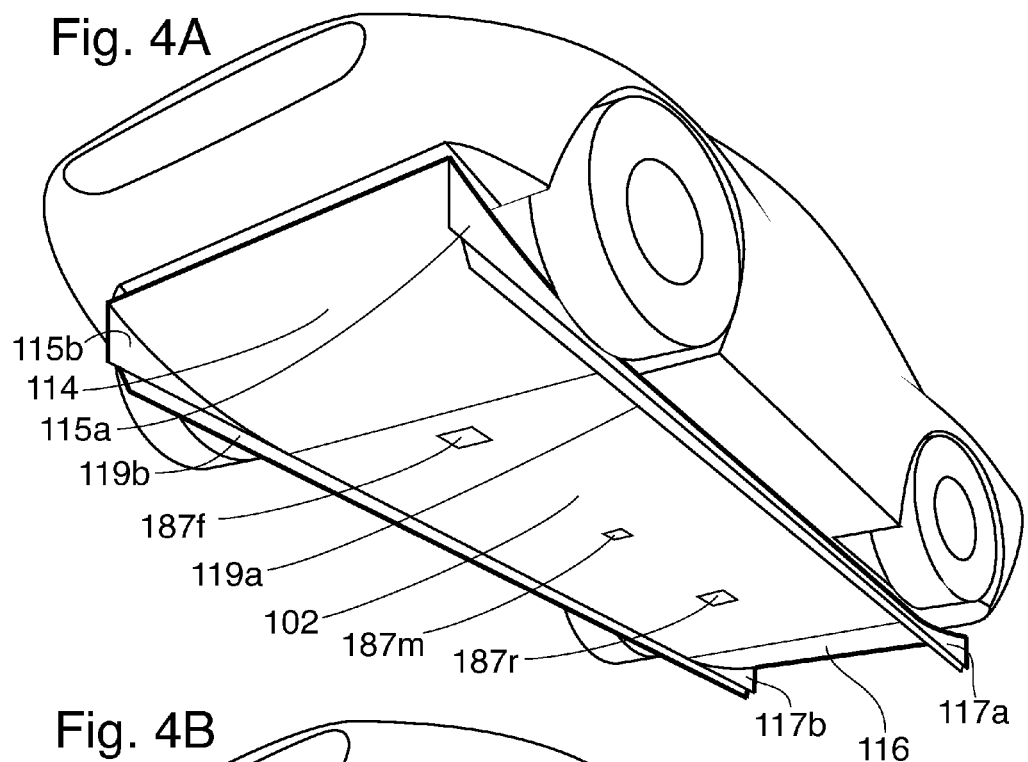
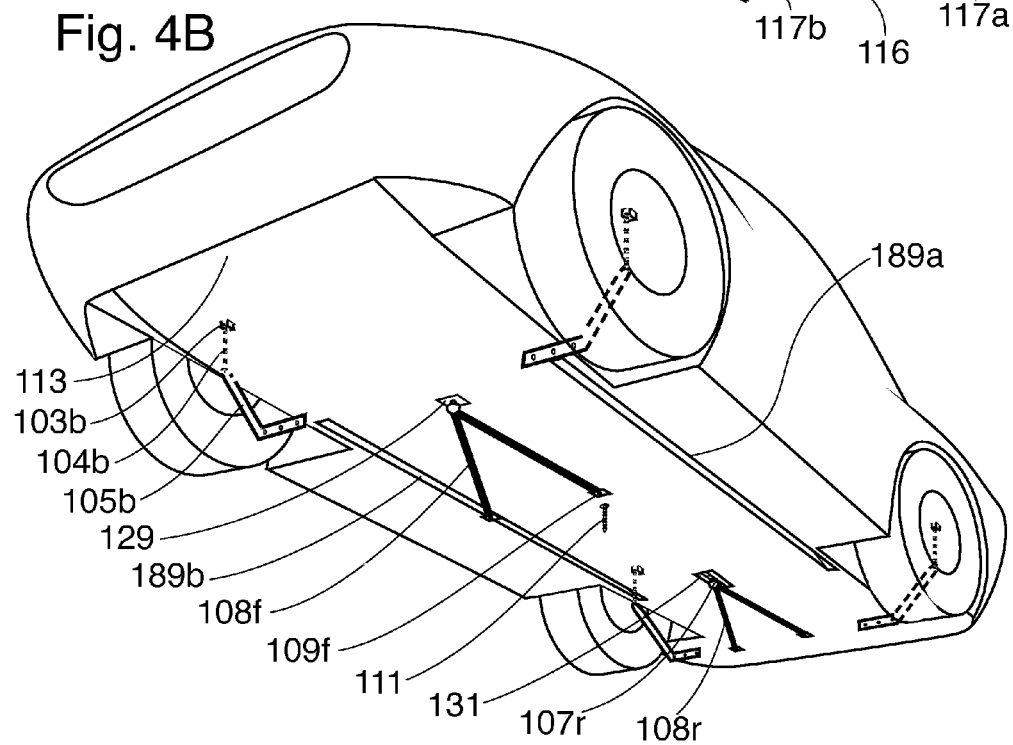

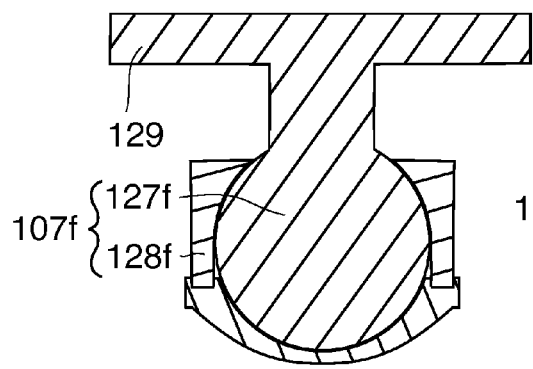
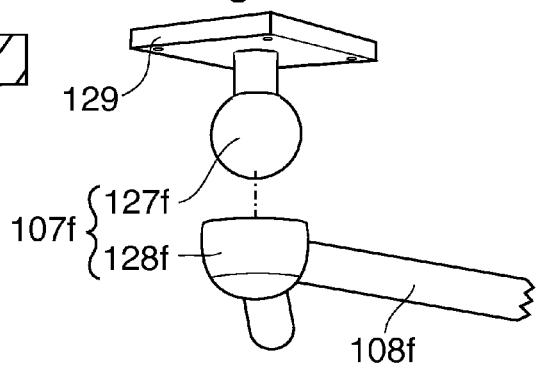
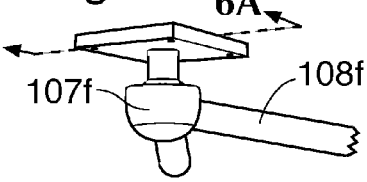
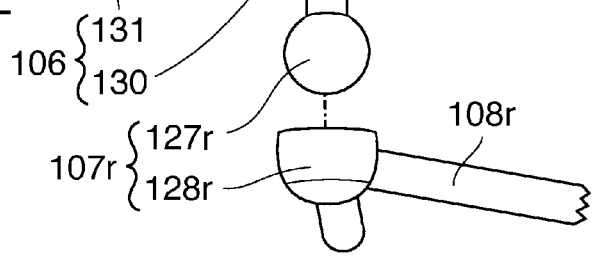
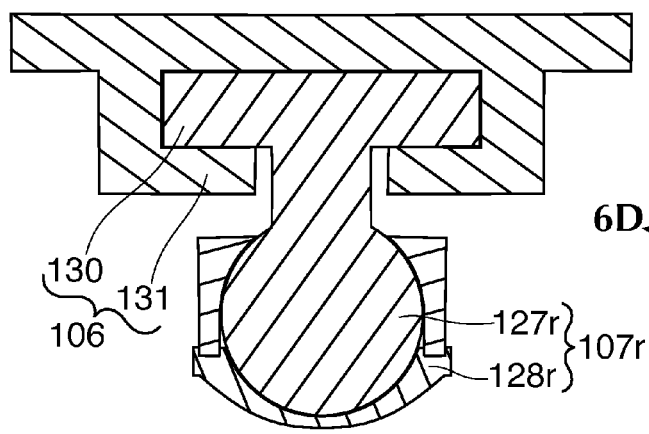
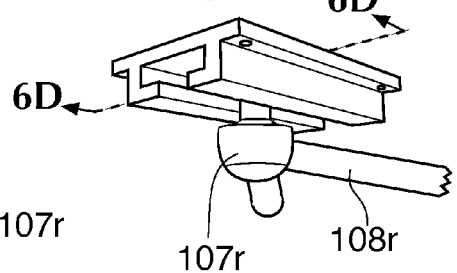

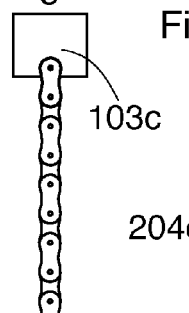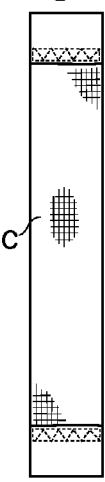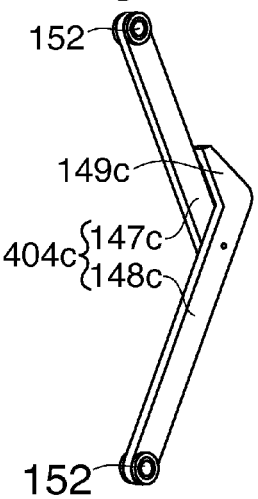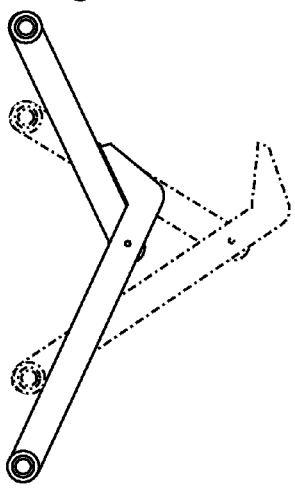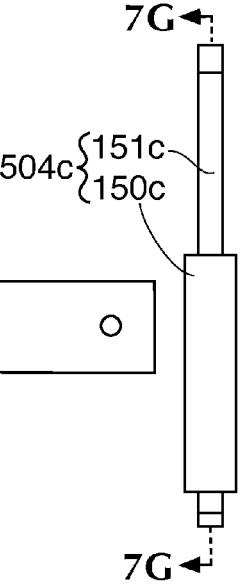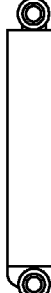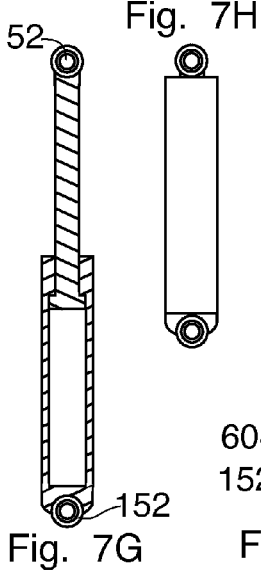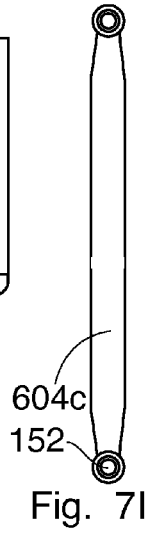

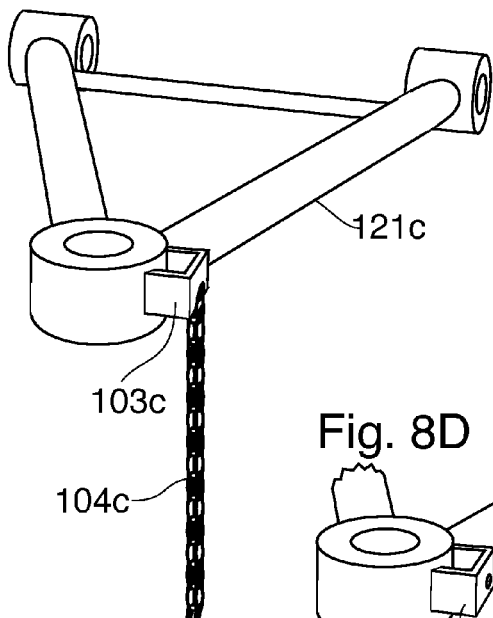
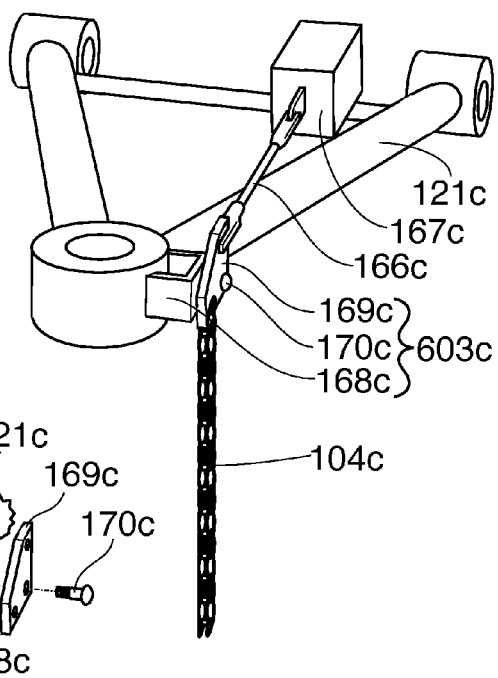
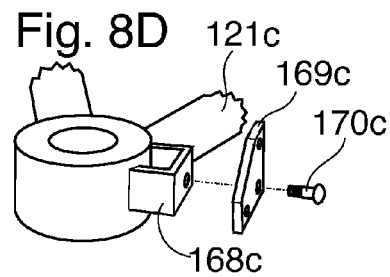
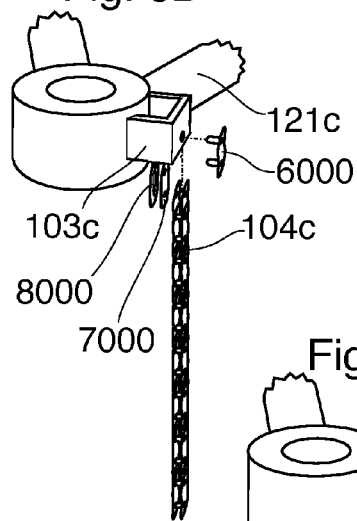
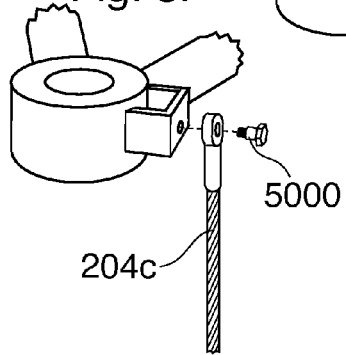
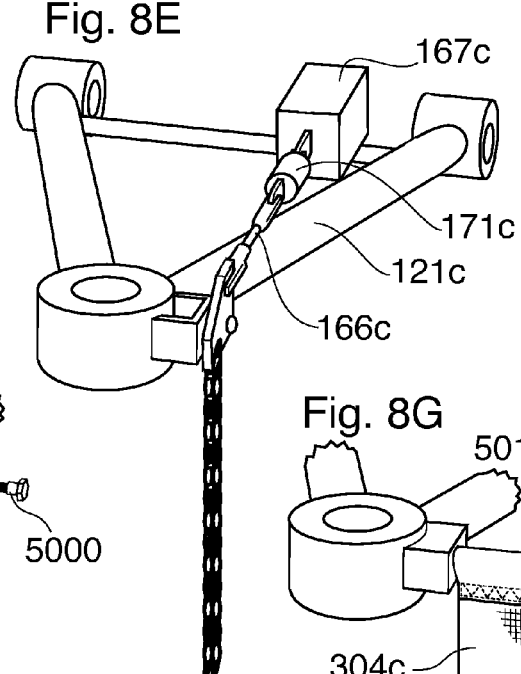
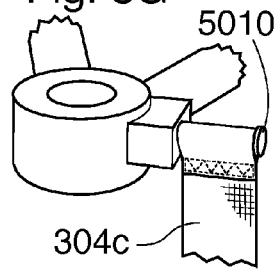

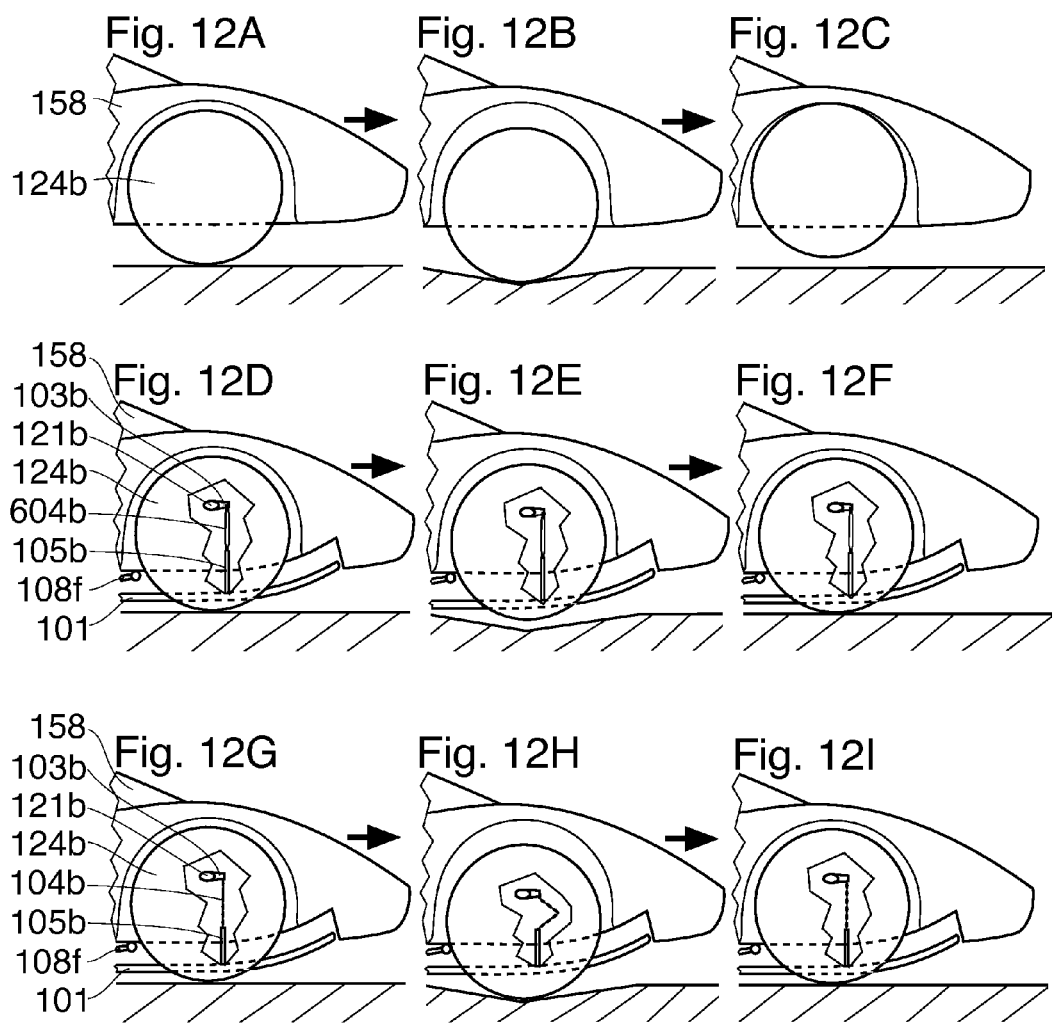

107f  108f  101  106  107r  108r

107f/107r  101

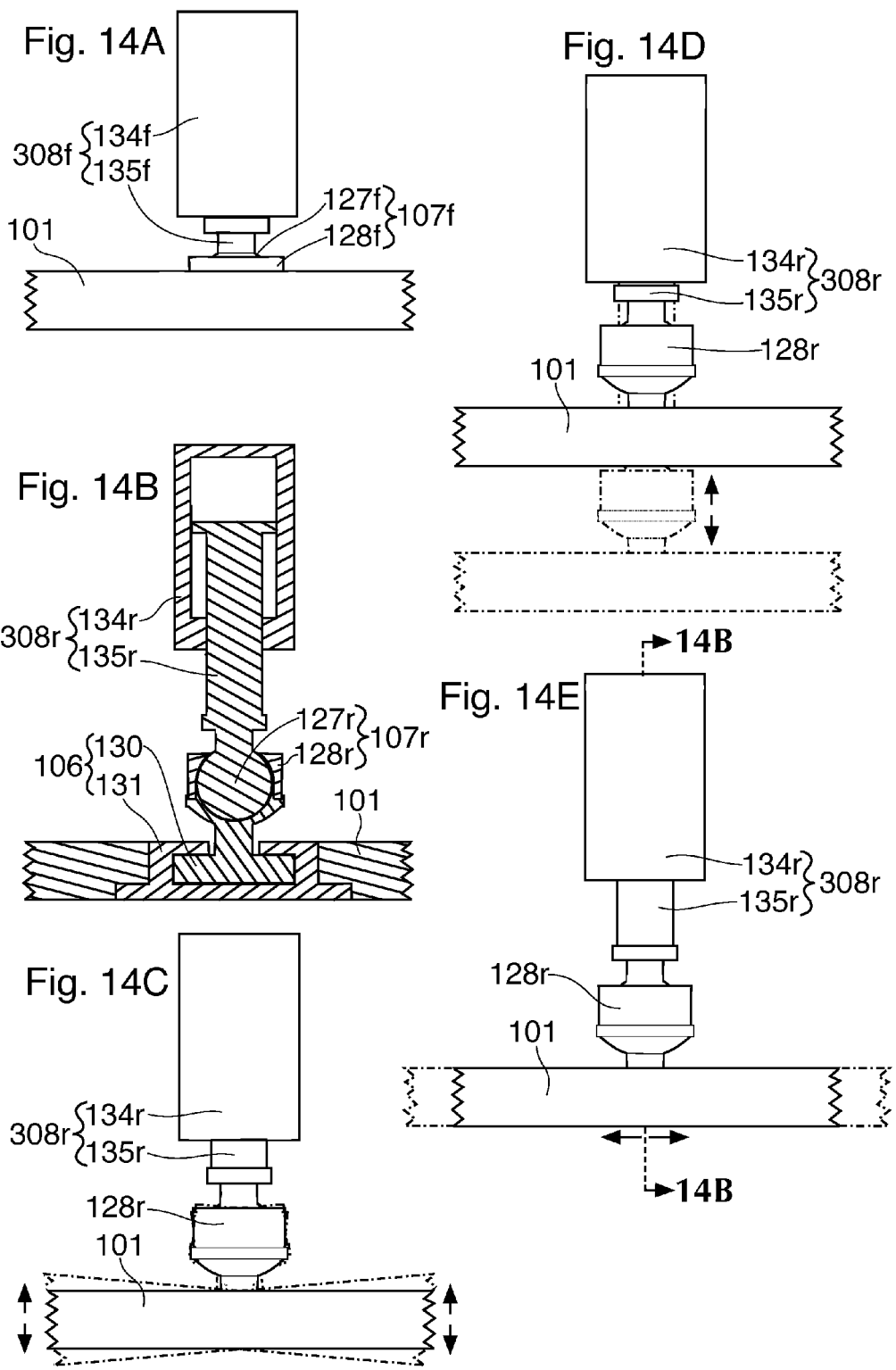

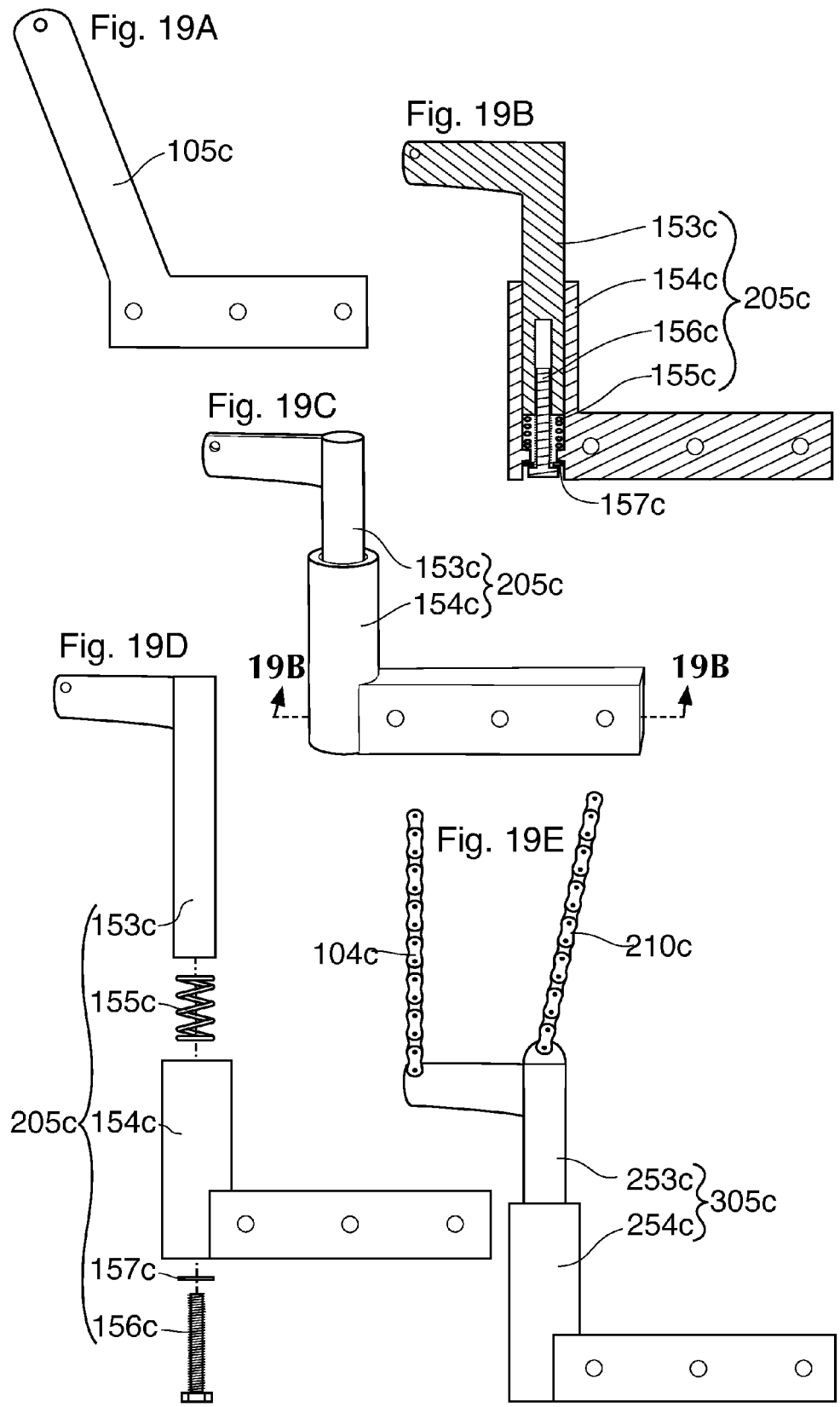

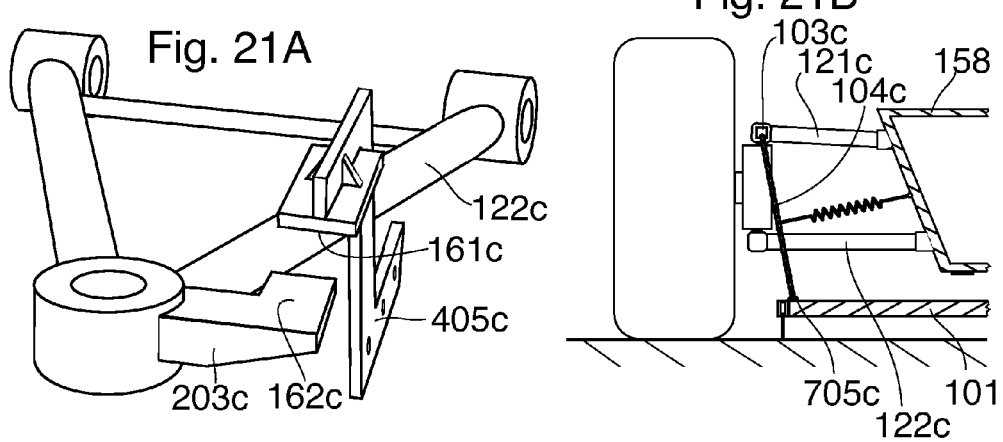
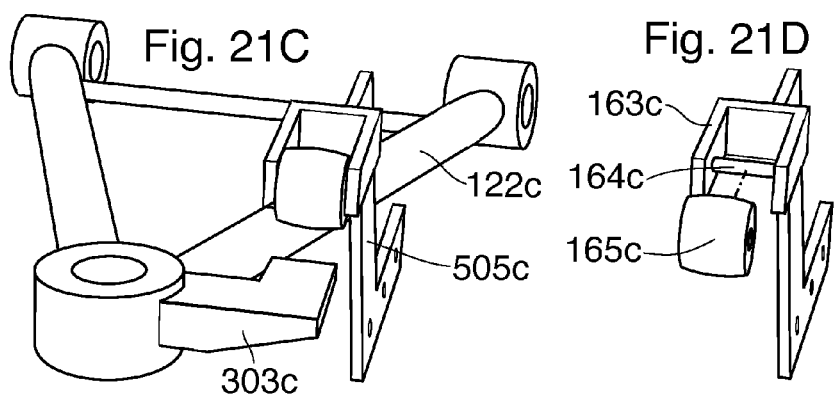
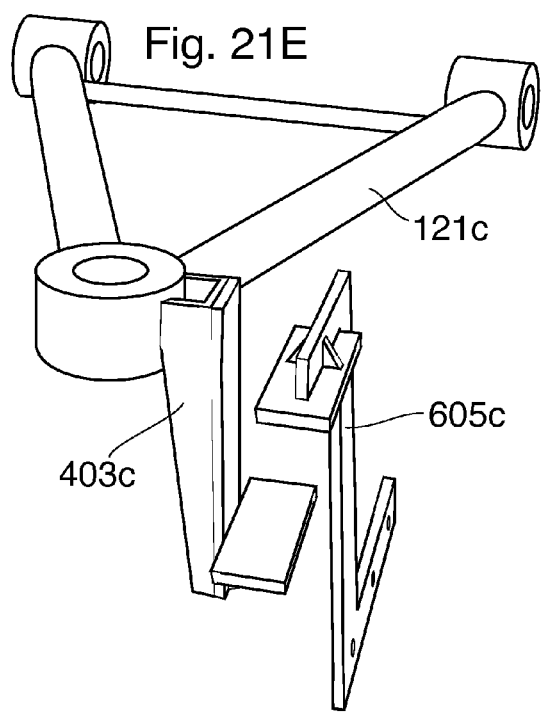

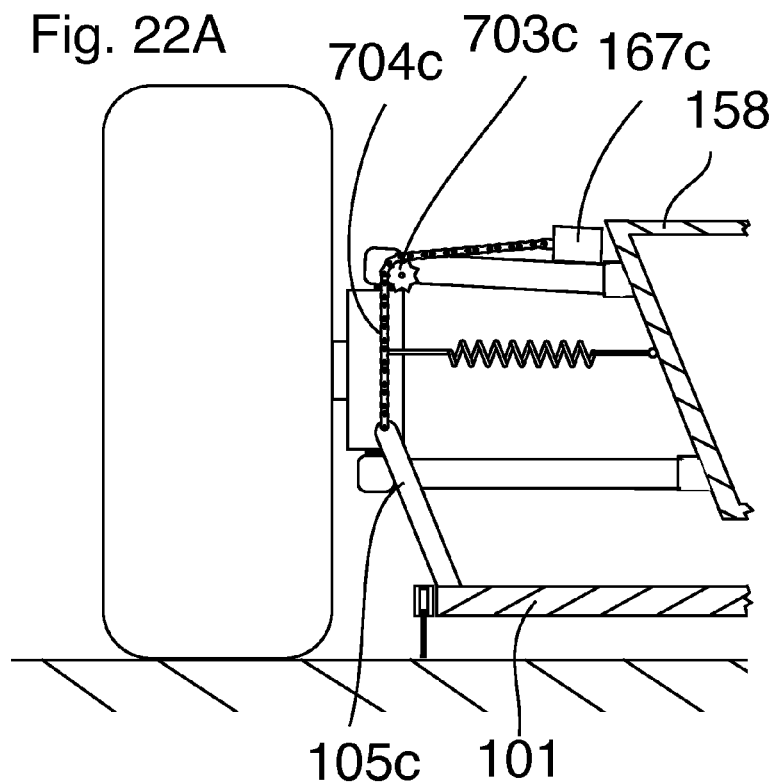
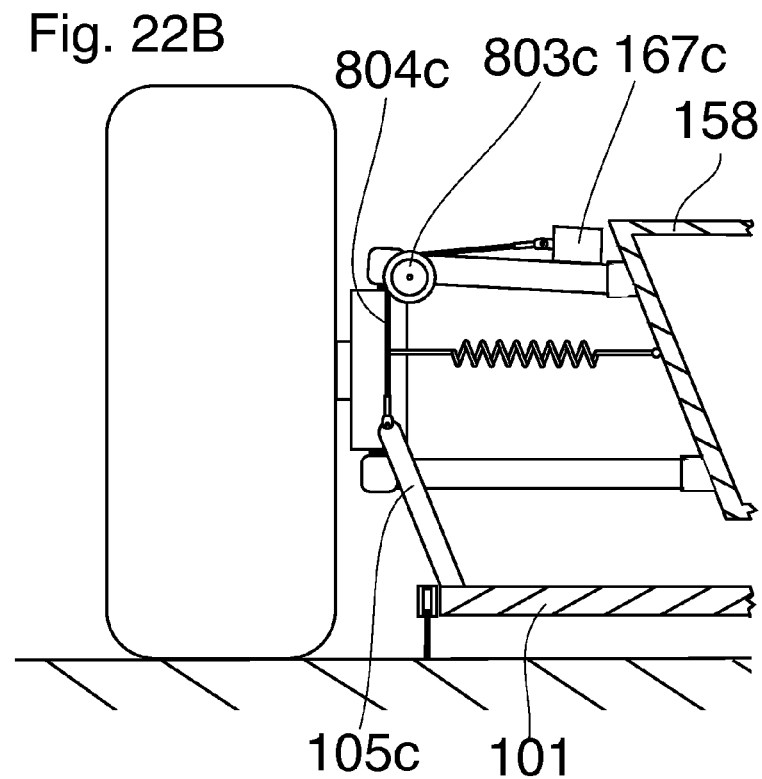

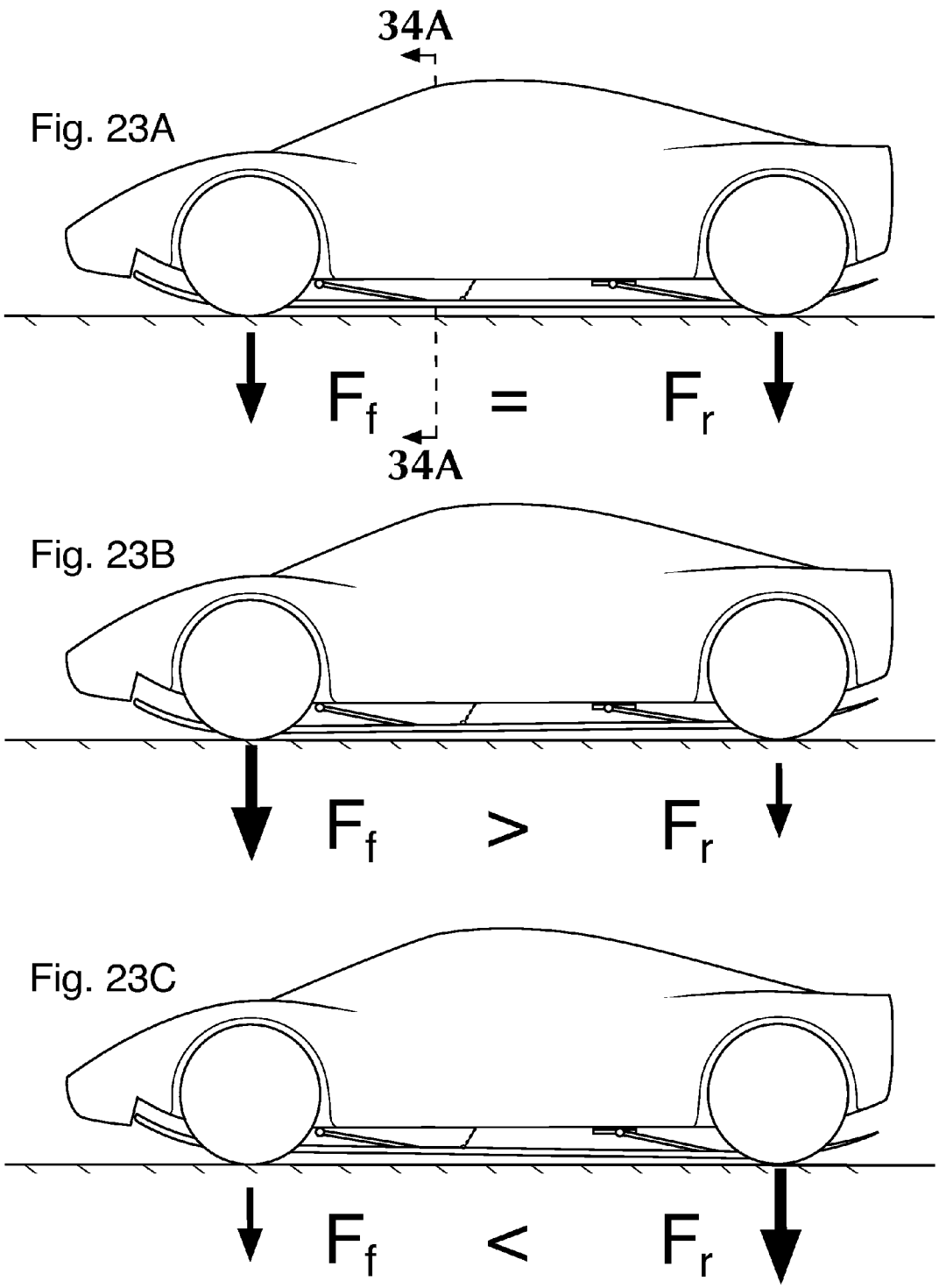

701

195  194
182
181a  181b

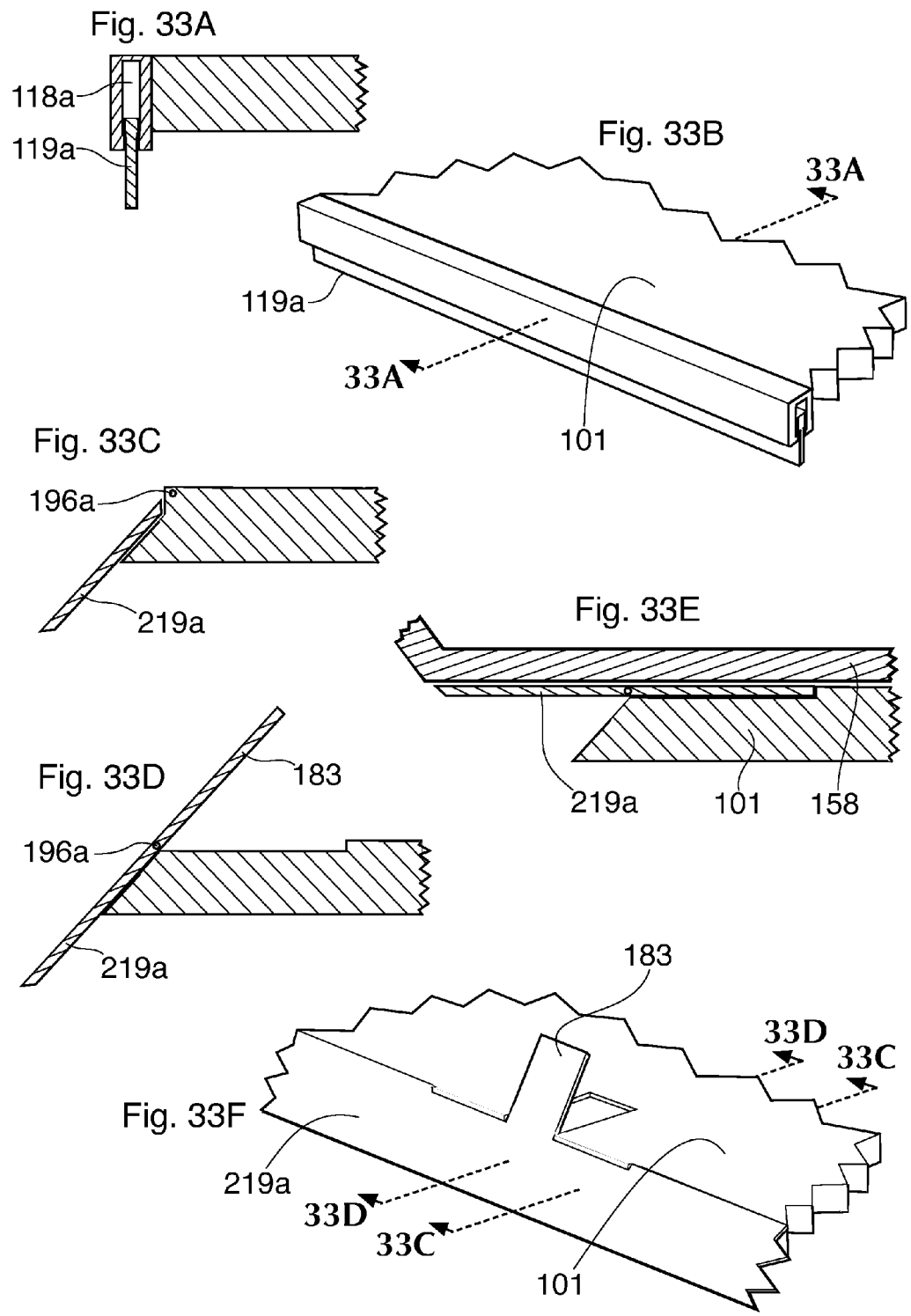

116
1100
1200

2100  2400
  2200  2500

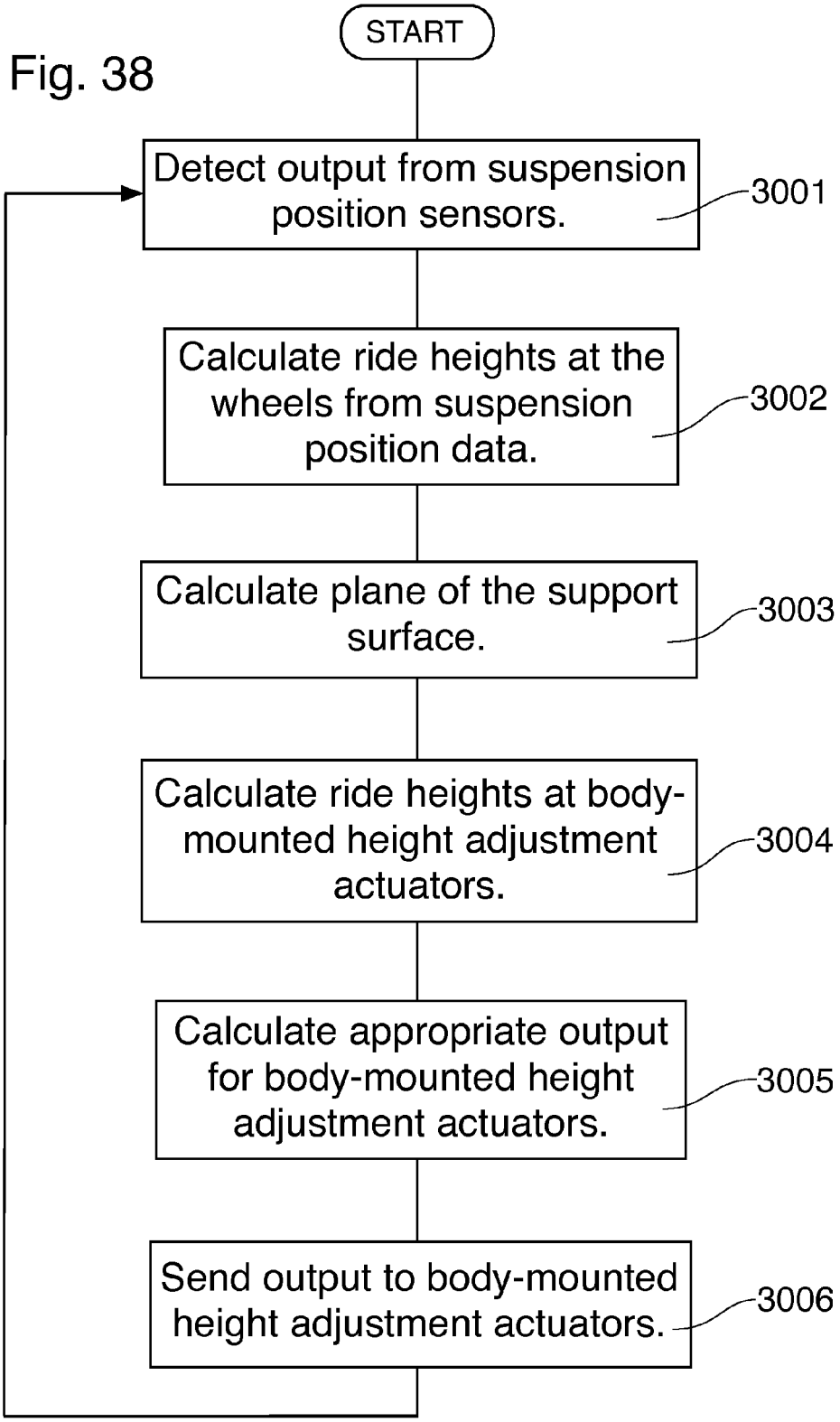

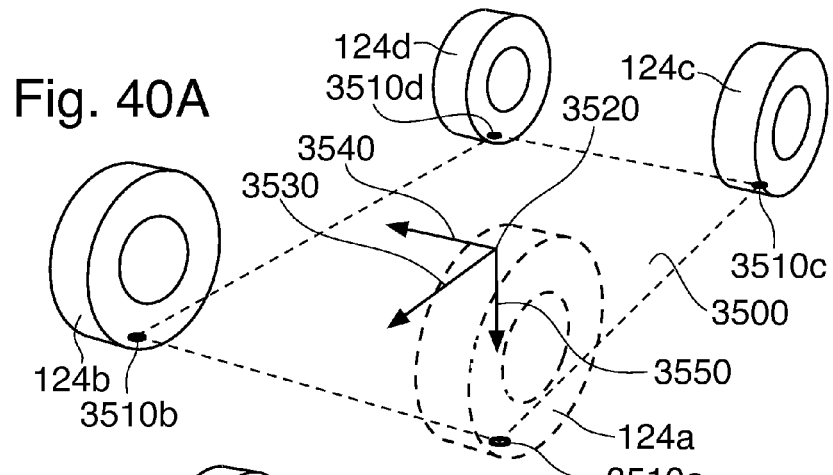
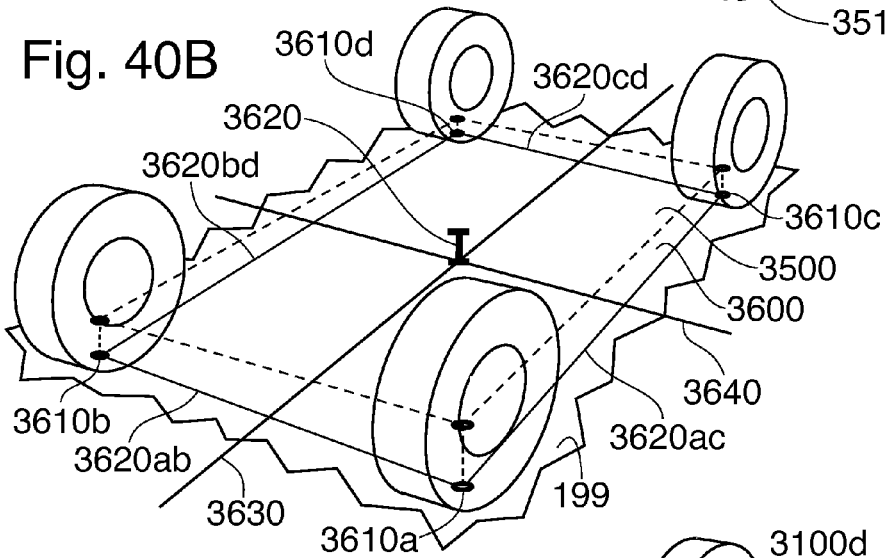
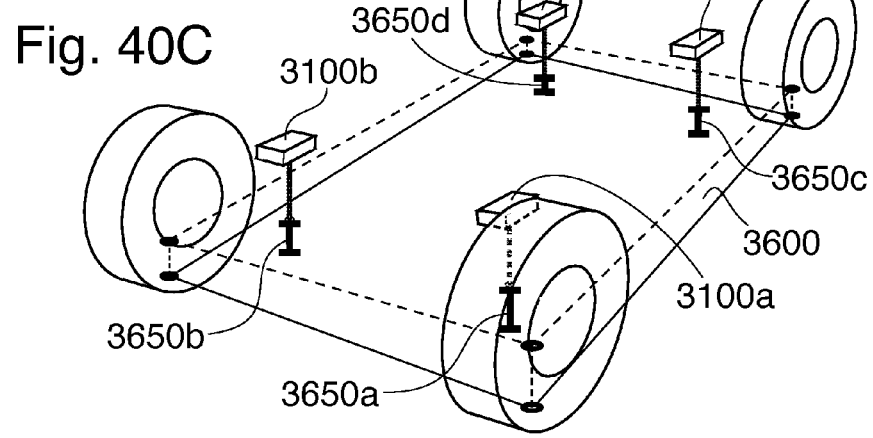

DYNAMICALLY-SUPPORTED MOVABLE DOWNFORCE-GENERATING UNDERBODY IN A MOTOR VEHICLE

BACKGROUND

Field of Invention

This application concerns motor vehicle aerodynamics, specifically a downforce-generating device that functions through ground effect.

SUMMARY

The present invention includes a movable underbody for a motor vehicle. The present invention further includes support systems that allow for two modes of operation of the movable underbody. In a first mode, the movable underbody is deployed and occupies a comparatively low position. In this deployed mode, the movable underbody is connected with the suspension of the vehicle in such manner that the movable underbody maintains a more constant distance and orientation above the road, street, ground, track, or other support surface (hereinafter "roadway") being traversed by the vehicle than maintained by the vehicle body. By "traversing" I mean starting, stopping, and/or traveling at a constant or varying speed along the roadway. In this mode, the movable underbody may, at various times, generate high levels of downforce through ground effect. In this mode, the movable underbody transfers downforce load directly to the substantially unsprung components of the suspension of the vehicle so that the suspension of the vehicle is not substantially compressed by the load generated by the movable underbody. In the second mode of operation, the movable underbody is retracted and occupies an elevated position. In this retracted mode, the movable underbody is functionally disengaged from the suspension and moves with, and transfers load to, the fully sprung body of the vehicle. In the retracted mode the movable underbody may be largely hidden from normal view.

In the present invention, the ability to switch between the deployed mode of operation and the retracted mode of operation is partly accomplished by use of two systems for supporting the movable underbody. An exemplary first support system includes, at each corner of the vehicle, a linkage attached to the substantially unsprung portion of the suspension that extends to the corresponding corner area of the movable underbody. An exemplary second support system includes a linkage (or set of linkages) that extends from the movable underbody to the fully sprung body of the vehicle. Additionally, the horizontal position of the movable underbody is stabilized throughout its range of motion by linkages that extend from the movable underbody to the vehicle body.

Embodiments of the movable underbody thus allow an otherwise normal road car to have both a high downforce, low ground clearance mode, and a low downforce, high ground clearance mode. This duality of function enables such a road car to be driven both rapidly on a closed-course racetrack and with practicality on public roads. Embodiments of the movable underbody in accordance with the present invention may also be used on public roads for traction enhancement in situations where emergency braking or turning are required. Other objects, advantages, and novel features of the present invention are described in the following detailed description of the basic embodiment of the movable underbody of the invention, along with descriptions of several additional and alternative embodiments.

A first aspect of the invention is a motor vehicle, including a body, a motor adapted to propel said motor vehicle, a set of wheels for supporting said motor vehicle on a roadway, said set of wheels comprising a pair of front wheels and a pair of rear wheels, wherein said set of wheels defines a set of corner areas of said motor vehicle, a suspension system connecting said body with each of said wheels, said suspension system being adapted to permit relative displacement between said wheels and said body, a movable underbody adapted to produce downforce, said movable underbody including a corresponding set of corner areas, wherein said movable underbody is not fixed to said body, a suspension-mounted support means for dynamically supporting said movable underbody such that said movable underbody maintains a more constant distance and orientation above a roadway being traversed than maintained by said body, and a retraction means for elevating and lowering said movable underbody relative to said body wherein elevation of said movable underbody to said body functionally disengages said movable underbody from said suspension system so that said movable underbody is no longer supported from said suspension-mounted support means and does not substantially displace vertically with said set of wheels relative to said body.

A second aspect of the invention is the motor vehicle in accordance with the first aspect of the invention, further comprising a retraction control means adapted to be actuated by a driver of said motor vehicle and operatively connected to said retraction means.

A third aspect of the invention is the motor vehicle in accordance with the first aspect of the invention, further comprising a retraction control means, comprising sensor means for sensing one or more of the following inputs: (a) current position of said movable underbody, (b) current movements of said suspension system, (c) a state of a vehicle electronic stability control system, and (d) a signal from a driver-operated retraction switch; and a retraction actuator adapted to activate said retraction means responsive to said sensor means.

A fourth aspect of the invention is the motor vehicle in accordance with the first aspect of the invention, wherein said suspension-mounted support means includes a tensile support linkage extending between said suspension system and said movable underbody at each of said corner areas of said motor vehicle, each said tensile support linkage being adapted to constrain in the downward direction, through tension thereon, movement of the movable underbody.

A fifth aspect of the invention is the motor vehicle in accordance with the first aspect of the invention, wherein said suspension-mounted support means includes a portion of each of said corner areas of said movable underbody, or a structure attached to each of said corner areas of said movable underbody, said portion or structure being adapted to sit upon a portion of said suspension system, or a structure attached to said suspension system, such that movement of said movable underbody is constrained in the downward direction.

A sixth aspect of the invention is the motor vehicle in accordance with the first aspect of the invention, further including a stabilization linkage means adapted to limit horizontal movements of said movable underbody relative to said body as said motor vehicle traverses a roadway.

A seventh aspect of the invention is the motor vehicle in accordance with the first aspect of the invention, further including a movable underbody height-adjustment means for varying the height and/or orientation of said movable underbody when said movable underbody is supported by said suspension-mounted support means.

An eighth aspect of the invention is the motor vehicle in accordance with the first aspect of the invention, further including at least one fan mounted to said movable underbody, said at least one fan being adapted to accelerate or evacuate air below said movable underbody.

A ninth aspect of the invention is the motor vehicle in accordance with the first aspect of the invention, wherein said movable underbody includes a lower surface having an orifice, said motor vehicle further including a vacuum generator adapted to generate negative pressure, and a vacuum hose connected to transmit negative pressure generated by said vacuum generator to said orifice, whereby negative pressure is transmitted to said lower surface of said movable underbody.

A tenth aspect of the invention is the motor vehicle in accordance with the ninth aspect of the invention, further including a skirt extending about and depending from a periphery of said movable underbody, said skirt being adapted to help maintain negative pressure below said movable underbody.

An eleventh aspect of the invention is the motor vehicle in accordance with the first aspect of the invention, wherein said movable underbody includes an adjustable aerodynamic surface, said motor vehicle further including an adjustable aerodynamic surface actuator adapted to move said adjustable aerodynamic surface during travel of said motor vehicle.

A twelfth aspect of the invention is the motor vehicle in accordance with the first aspect of the invention, further including at least one aerodynamic fence attached to said movable underbody and located between said movable underbody and said body, thereby influencing the airflow between and around said movable underbody and said body to promote the generation of downforce.

A thirteenth aspect of the invention is a motor vehicle including a body, a motor adapted to propel said motor vehicle, a set of wheels for supporting said motor vehicle on a roadway, said set of wheels comprising: a pair of front wheels, and a pair of rear wheels, wherein said set of wheels defines a set of corner areas of said motor vehicle, a suspension system connecting said body with each of said wheels, said suspension system being adapted to permit relative displacement between said wheels and said body, a movable underbody adapted to produce downforce, said movable underbody including a corresponding set of corner areas, wherein said movable underbody is not fixed to said body, a suspension-mounted support means for dynamically supporting said movable underbody such that said movable underbody maintains a more constant distance and orientation above a roadway being traversed than maintained by said body, and a movable underbody height-adjustment means for varying the height and/or orientation of said movable underbody with respect to the roadway during travel of said motor vehicle.

A fourteenth aspect of the invention is the motor vehicle in accordance with the thirteenth aspect of the invention, further comprising a movable underbody height-adjustment control means adapted to be actuated by a driver of said motor vehicle and operatively connected to said movable underbody height-adjustment means.

A fifteenth aspect of the invention is the motor vehicle in accordance with the thirteenth aspect of the invention, further comprising one or more sensors, and a movable underbody height-adjustment control means which is responsive to said one or more sensors and/or a driver of said motor vehicle, and operatively connected to said movable underbody height-adjustment means.

A sixteenth aspect of the invention is a motor vehicle including a body, a motor adapted to propel said motor vehicle, a set of wheels for supporting said motor vehicle on a roadway, said set of wheels comprising a pair of front wheels and a pair of rear wheels, wherein said set of wheels defines a set of corner areas of said motor vehicle, a suspension system connecting said body with each of said wheels, said suspension system being adapted to permit relative displacement between said wheels and said body, a movable underbody adapted to produce downforce, said movable underbody including a corresponding set of corner areas, wherein said movable underbody is not fixed to said body, a suspension-mounted support means for dynamically supporting said movable underbody such that said movable underbody maintains a more constant distance and orientation above a roadway being traversed than maintained by said body, and a stabilization linkage means adapted to limit the horizontal movements of said movable underbody relative to said body as said motor vehicle traverses a roadway.

A seventeenth aspect of the invention is the motor vehicle in accordance with the sixteenth aspect of the invention, wherein said suspension-mounted support means includes a support linkage extending between said suspension system and said movable underbody at each of said corner areas of said motor vehicle, each support linkage being adapted to at least constrain in the downward direction, through tension thereon, movement of the movable underbody.

An eighteenth aspect of the invention is a motor vehicle, including a body, a motor adapted to propel said motor vehicle, a set of wheels for supporting said motor vehicle on a roadway, said set of wheels comprising a pair of front wheels and a pair of rear wheels, wherein said set of wheels defines a set of corner areas of said motor vehicle, a suspension system connecting said body with each of said wheels, said suspension system being adapted to permit relative displacement between said wheels and said body, a movable underbody adapted to reduce aerodynamic drag, said movable underbody including a corresponding set of corner areas, wherein said movable underbody is not fixed to said body, a suspension-mounted support means for dynamically supporting said movable underbody such that said movable underbody maintains a more constant distance and orientation above a roadway being traversed than maintained by said body, and a retraction means for elevating and lowering said movable underbody relative to said body wherein elevation of said movable underbody to said body functionally disengages said movable underbody from said suspension system so that said movable underbody is no longer supported from said suspension-mounted support means and does not substantially displace vertically with said set of wheels relative to said body.

A nineteenth aspect of the invention is the motor vehicle in accordance with the eighteenth aspect of the invention, further including at least one aerodynamic fence attached to said movable underbody and located between said movable underbody and said body, thereby influencing the airflow between and around said movable underbody and said body to reduce aerodynamic drag.

A twentieth aspect of the invention is the motor vehicle in accordance with the eighteenth aspect of the invention, further including at least one wheel fairing attached to said movable underbody.

A twenty-first aspect of the invention is a motor vehicle including a body, a motor adapted to propel said motor vehicle, a set of wheels for supporting said motor vehicle on a roadway, said set of wheels comprising a pair of front wheels and a pair of rear wheels, wherein said set of wheels defines a set of corner areas of said motor vehicle, a suspension system connecting said body with each of said wheels, said suspension system being adapted to permit relative displacement between said wheels and said body, a movable underbody adapted to produce downforce, wherein said movable underbody is not fixed to said body, body-mounted movable underbody height-adjustment actuators adapted to support and move said movable underbody thereby allowing said movable underbody to maintain a more constant distance and orientation above a roadway being traversed than maintained by said body, ride-height sensors adapted to produce output pertaining to the ride height and orientation of said movable underbody, and a body-mounted movable underbody height-adjustment electronic control unit which is responsive to said output from said ride-height sensors and adapted to generate output to said body-mounted movable underbody height-adjustment actuators such that said movable underbody maintains a more constant distance and orientation above a roadway being traversed than maintained by said body.

A twenty-second aspect of the invention is the motor vehicle according to the twenty-first aspect of the invention further including a stabilization linkage means adapted to limit horizontal movements of said movable underbody relative to said body as said motor vehicle traverses a roadway.

A twenty-third aspect of the invention is a method of using a vehicle having a body, a motor adapted to propel said motor vehicle along a roadway, and a movable underbody adapted to be moved, in response to an action of a driver of the vehicle, between a deployed condition and a retracted condition, and adapted to produce aerodynamic downforce when in a deployed condition, the method comprising causing said movable underbody to move from to the retracted condition to the deployed condition while said motor vehicle is traversing a roadway, thereby producing aerodynamic downforce.

A twenty-fourth aspect of the invention is a method of using a vehicle having a body, a motor adapted to propel said motor vehicle along a roadway, and a movable underbody adapted to be moved, in response to an action of a driver of the vehicle, between a deployed condition and a retracted condition, and adapted to produce aerodynamic downforce when in the deployed condition and adapted to provide greater ground clearance when in the retracted condition, the method comprising causing the movable underbody to move from the deployed condition to the retracted condition while said motor vehicle is traversing a roadway, thereby providing greater ground clearance.

A twenty-fifth aspect of the invention is a movable underbody adapted for use in conjunction with a motor vehicle, a body, a motor adapted to propel said motor vehicle, a set of wheels for supporting said motor vehicle on a roadway, said set of wheels comprising a pair of front wheels and a pair of rear wheels, wherein said set of wheels define a set of corner areas of said motor vehicle, a suspension system connecting said body with each of said wheels, said suspension system being adapted to permit relative displacement between said wheels and said body, said movable underbody being adapted to produce downforce, said movable underbody including a corresponding set of corner areas, and said movable underbody not being fixed to said body.

A twenty-sixth aspect of the invention is a movable underbody in accordance with the twenty-fifth aspect of the invention, wherein said motor vehicle further includes a suspension-mounted support means for dynamically supporting said movable underbody, such that said movable underbody maintains a more constant distance and orientation above a roadway being traversed than maintained by said body, and a retraction means for elevating and lowering said movable underbody relative to said body wherein elevation of said movable underbody to said body functionally disengages said movable underbody from said suspension system so that said movable underbody is no longer supported from said suspension-mounted support means and does not substantially displace vertically with said set of wheels relative to said body.

A twenty-seventh aspect of the invention is a movable underbody in accordance with the twenty-fifth aspect of the invention, wherein said motor vehicle further includes a suspension-mounted support means for dynamically supporting said movable underbody such that said movable underbody maintains a more constant distance and orientation above a roadway being traversed than maintained by said body, and a movable underbody height-adjustment means for varying the height and/or orientation of said movable underbody with respect to the roadway during travel of said motor vehicle.

A twenty-eighth aspect of the invention is a movable underbody in accordance with the twenty-fifth aspect of the invention, wherein said motor vehicle further includes a suspension-mounted support means for dynamically supporting said movable underbody such that said movable underbody maintains a more constant distance and orientation above a roadway being traversed than maintained by said body, and a stabilization linkage means adapted to limit horizontal movements of said movable underbody relative to said body as said motor vehicle traverses a roadway.

A twenty-ninth aspect of the invention is a movable underbody in accordance with the twenty-fifth aspect of the invention, wherein said motor vehicle further includes body-mounted movable underbody height-adjustment actuators adapted to support and move said movable underbody thereby allowing said movable underbody to maintain a more constant distance and orientation above a roadway being traversed than maintained by said body, ride-height sensors adapted to produce output pertaining to the ride height and orientation of said movable underbody, and a body-mounted movable underbody height-adjustment electronic control unit which is responsive to said output from said ride-height sensors and adapted to generate output to said body-mounted movable underbody height-adjustment actuators such that said movable underbody maintains a more constant distance and orientation above a roadway being traversed than maintained by said body.

A thirtieth aspect of the invention is a movable underbody adapted for use in conjunction with a motor vehicle, a body, a motor adapted to propel said motor vehicle, a set of wheels for supporting said motor vehicle on a roadway, said set of wheels comprising a pair of front wheels and a pair of rear wheels, wherein said set of wheels define a set of corner areas of said motor vehicle, a suspension system connecting said body with each of said wheels, said suspension system being adapted to permit relative displacement between said wheels and said body, said movable underbody being adapted to reduce aerodynamic drag, said movable underbody including a corresponding set of corner areas, and said movable underbody not being fixed to said body.

A thirty-first aspect of the invention is a movable underbody in accordance with the twenty-sixth aspect of the invention, wherein the motor vehicle further includes a suspension-mounted support means for dynamically supporting said movable underbody, such that said movable underbody maintains a more constant distance and orientation above a roadway being traversed than maintained by said body, and a retraction means for elevating and lowering said movable underbody relative to said body, wherein elevation of said movable underbody to said body functionally disengages said movable underbody from said suspension system so that said movable underbody is no longer supported from said suspension-mounted support means and does not substantially displace vertically with said set of wheels relative to said body.

DRAWINGS

Figures

In the following discussion of the figures, any particular label which does not appear in a particular figure of immediate discussion is nevertheless present elsewhere in the figures. Accordingly, the figures should be considered as a whole.

FIGS. 1A-B are elevation views of the basic embodiment of the present invention with movable underbody 101 deployed (1A) and retracted (1B).

FIGS. 2A-B are cross-sectional views of the basic embodiment of the present invention with movable underbody 101 deployed (2A) and retracted (2B). These views are in accordance with line 2A-2A of FIG. 1A.

FIGS. 4A-B are perspective front three-quarter views from below of a vehicle fitted with the basic embodiment of the present invention (4A) and with movable underbody 101 removed (4B).

FIGS. 5A-D are underside views of the basic embodiment 108$f$, 108$r$ (5A-B) and an additional embodiment 208$f$, 208$r$ (5C-D) of the front and rear stabilization linkages.

FIGS. 6A-C are cross-sectional (6A), exploded (6B), and perspective front three-quarter (6C) views of the basic embodiment of a ball joint 107$f$ that attaches to the front stabilization linkage 108$f$.

FIGS. 6D-F are cross-sectional (6D), exploded (6E), and perspective front three-quarter (6F) views of the basic embodiment of a ball joint 107$r$ and sliding mechanism 106 that attach to the rear stabilization linkage 108$r$.

FIGS. 7A-I are views of the basic embodiment 104$c$ (7A) and additional embodiments (7B-I), including 204$c$, 304$c$, 404$c$, 504$c$, 604$c$ of support linkages.

FIG. 8A is a perspective left side view and FIG. 8B is an exploded view of the left rear upper control arm 121$c$ with a basic upper support bracket 103$c$ showing means of attachment to a roller chain support linkage 104$c$.

FIG. 8C is a perspective left side view and FIG. 8D an exploded view of the left rear upper control arm 121$c$ with a bellcrank upper support bracket 603$c$ and height-adjustment actuator 167$c$.

FIG. 8E is a perspective left side view of the left rear upper control arm 121$c$ with an upper support bracket with bellcrank 603$c$, strain gauge 171$c$, and height-adjustment actuator 167$c$.

FIG. 8F is an exploded perspective left side view of a portion of the left rear upper control arm 121$c$ with a basic upper support bracket 103$c$ and attachment system to a cable support linkage 204$c$.

FIG. 8G is a perspective left side view of a portion of the left rear upper control arm 121$c$ with a basic upper support bracket 103$c$ attached to a Kevlar webbing support linkage 304$c$.

Figure 9A:
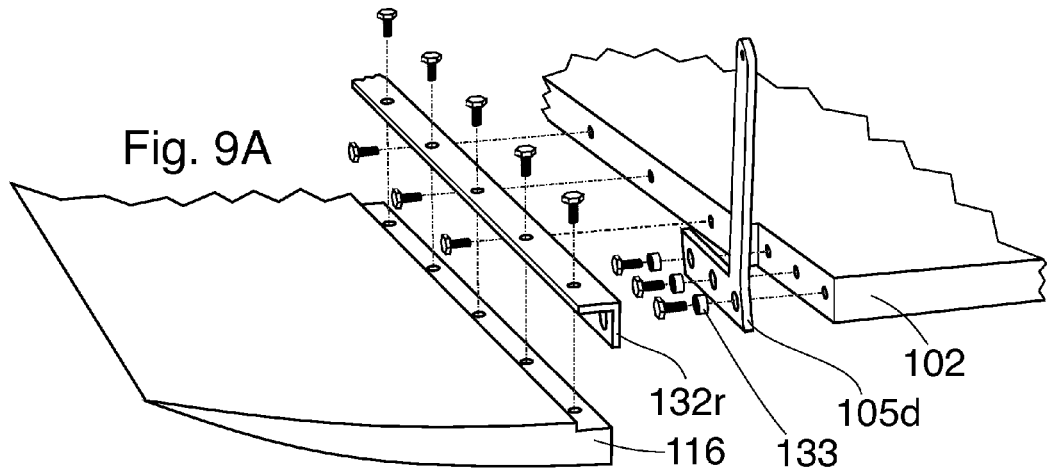
Figure 9B:
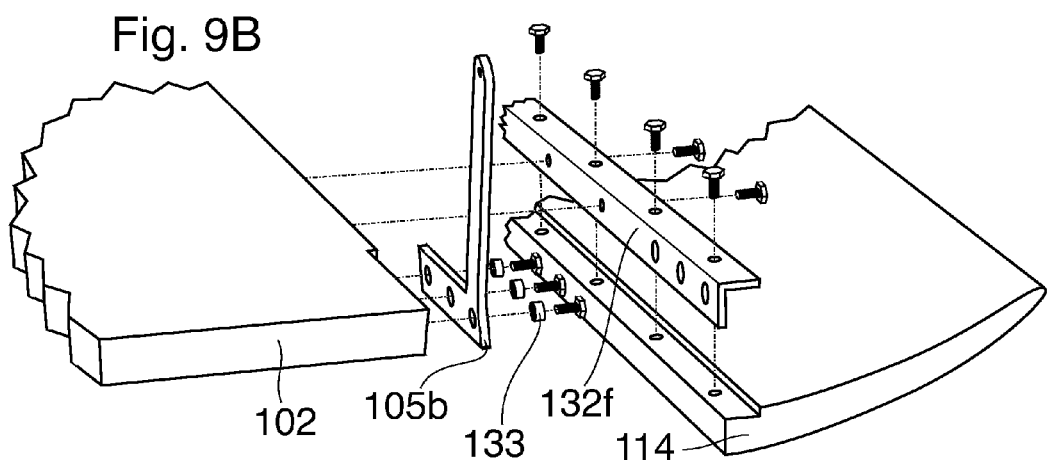

FIGS. 9A-B are perspective right side exploded views of an attachment means for the inlet 114 (9B), movable underbody diffuser 116 (9A), and lower support brackets 105$b$, 105$d$.

FIGS. 9C-H are elevation views of three different diffuser embodiments 216, 116, and 316 (9C-E) and three different inlet embodiments 114, 214, and 314 (9F-H) without inlet fence or diffuser fence shown.

Figure 1A:
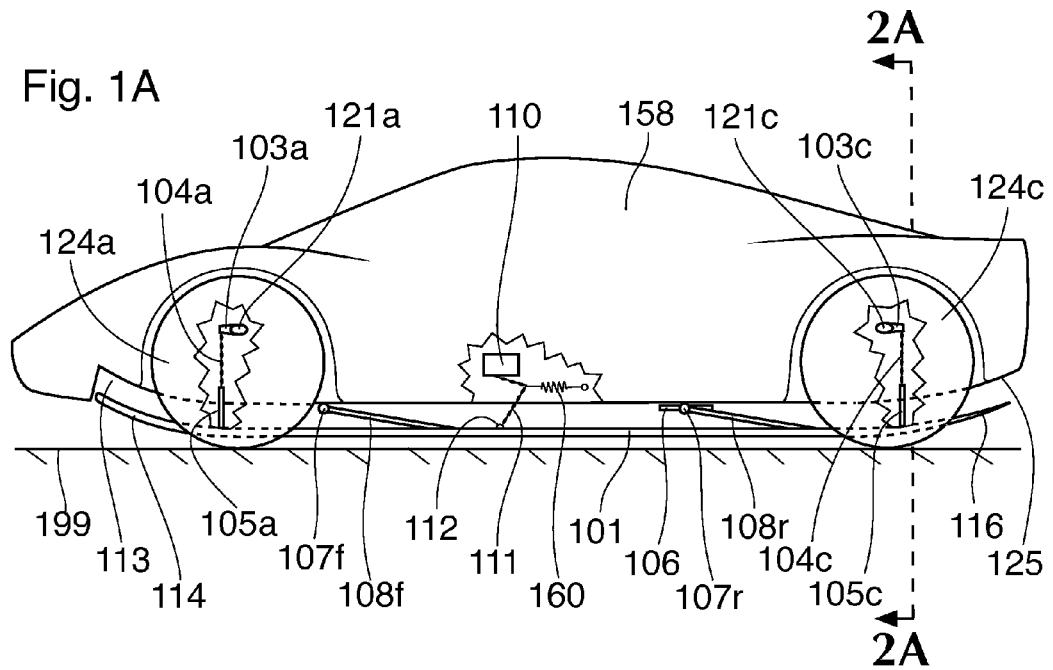

FIGS. 10A-D are cross-sectional views of a vehicle fitted with the basic embodiment of the present invention at different body positions, in accordance with cross-sectional line 2A-2A of FIG. 1A.

Figure 11A:
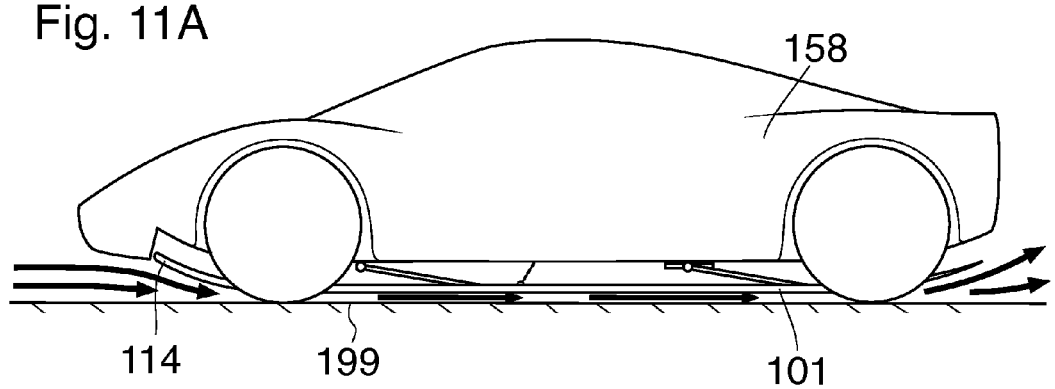
Figure 11B:
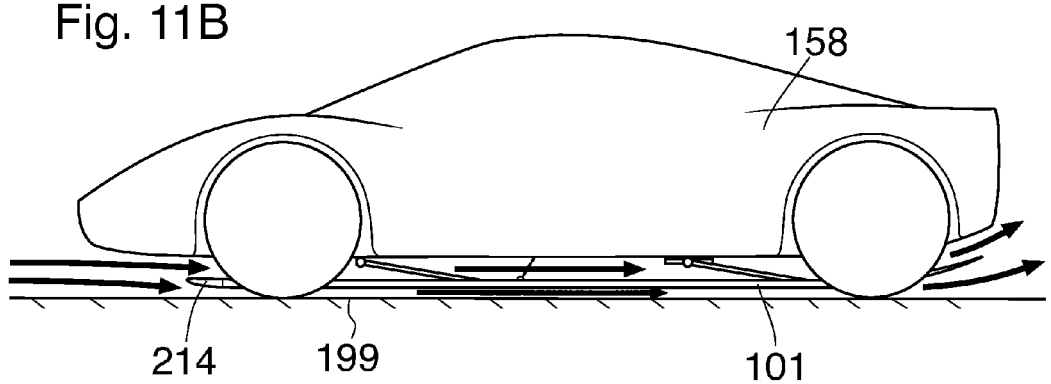

FIGS. 11A-B are elevation views of two vehicles fitted either with the basic embodiment of the present invention (11A) or an embodiment with a minimal inlet 214 (11B) showing the path of airflow under the vehicle body 158.

FIGS. 12A-I are elevation views of the front of three vehicles fitted without a movable underbody (12A-C), with a rigidly supported movable underbody 101 (12D-F), and fitted with a movable underbody 101 supported by tensile support linkages, exemplified by 104$b$ (12G-I).

Figure 13A:
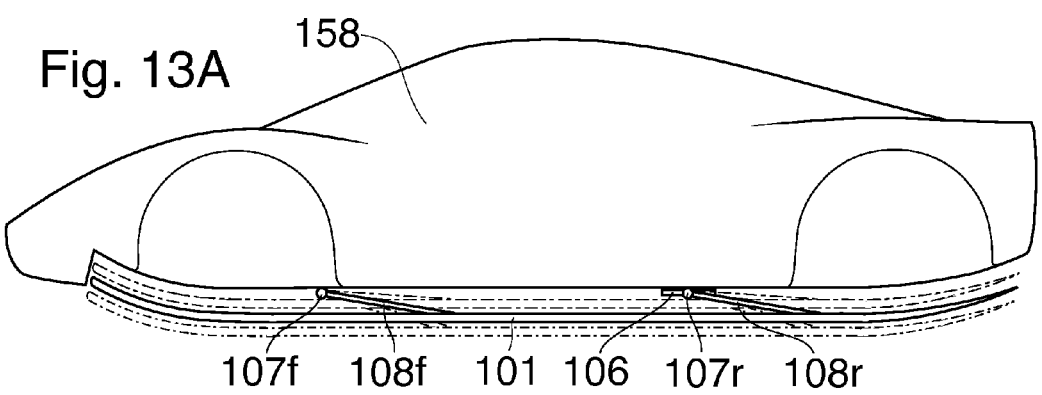
Figure 13B:
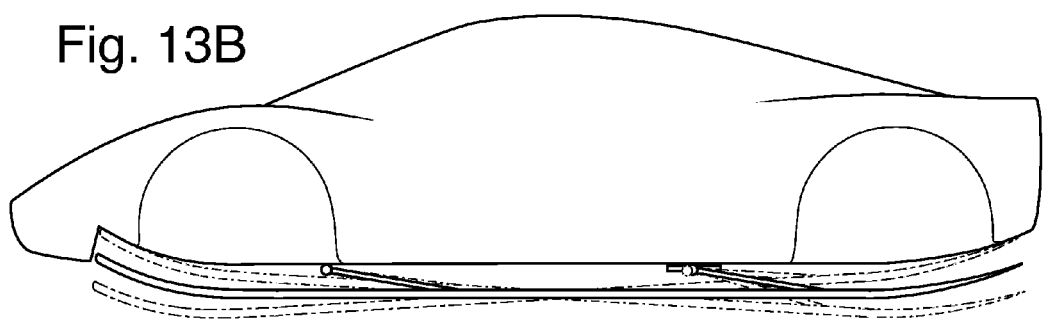
Figure 13C:
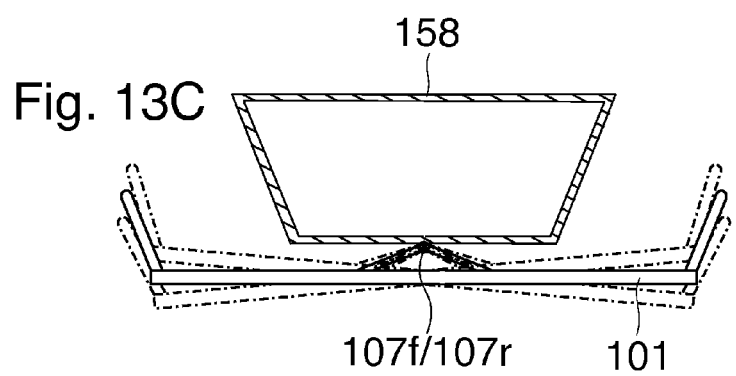

FIGS. 13A-C are elevation views (13A-B) and a cross-section view (13C) of a vehicle fitted with the basic embodiment of the present invention showing relative movement of the movable underbody 101. The view of FIG. 13C is in accordance with cross-sectional line 2A-2A of FIG. 1A.

FIG. 14A is an elevation view of a front telescoping stabilization linkage 308$f$ and movable underbody 101.

FIGS. 14B-E are transverse cross-sectional (14B) and elevation views (14C-E) of a rear telescoping stabilization linkage 308$r$, sliding mechanism 106, and movable underbody 101.

Figure 15A:
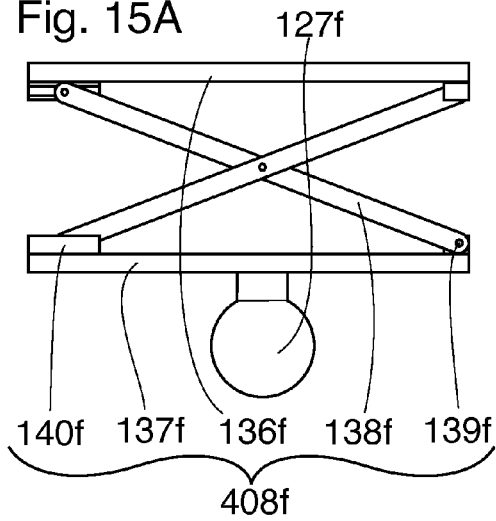
Figure 15D:
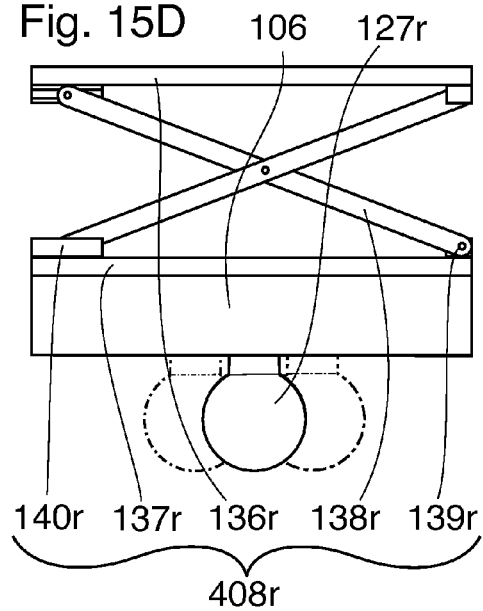
Figure 15B:
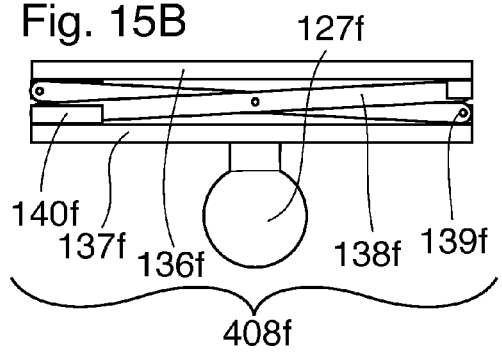
Figure 15C:
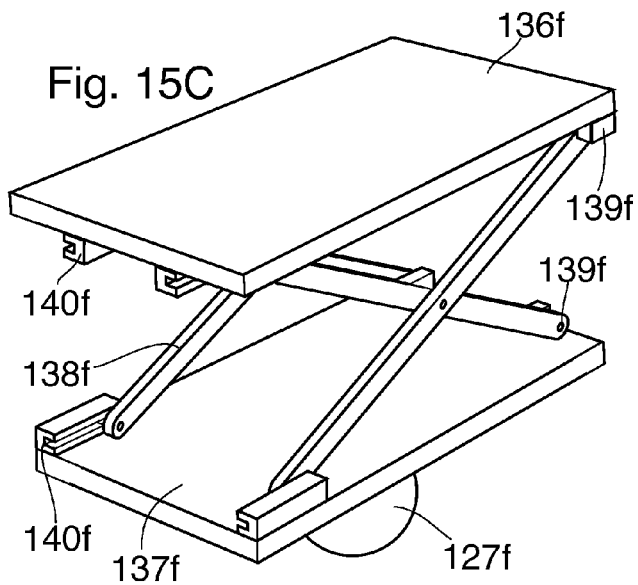

FIGS. 15A-C are elevation views (15A-B) and a perspective view (15C) of a front pantographic stabilization linkage 408$f$.

Figure 15E:
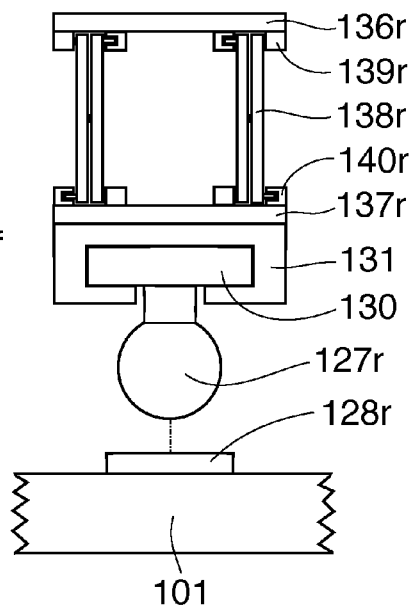

FIGS. 15D-E are elevation (15D) and front (15E) views of a rear pantographic stabilization linkage 408$r$ with sliding mechanism 106.

Figure 16A:
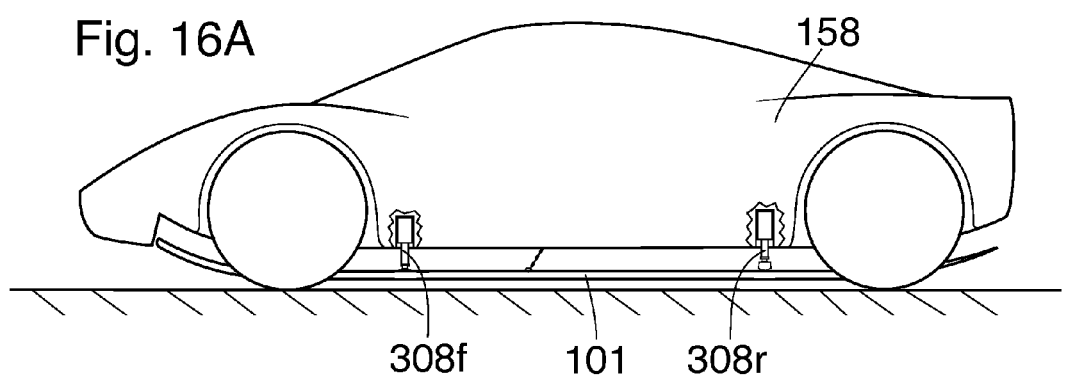
Figure 16B:
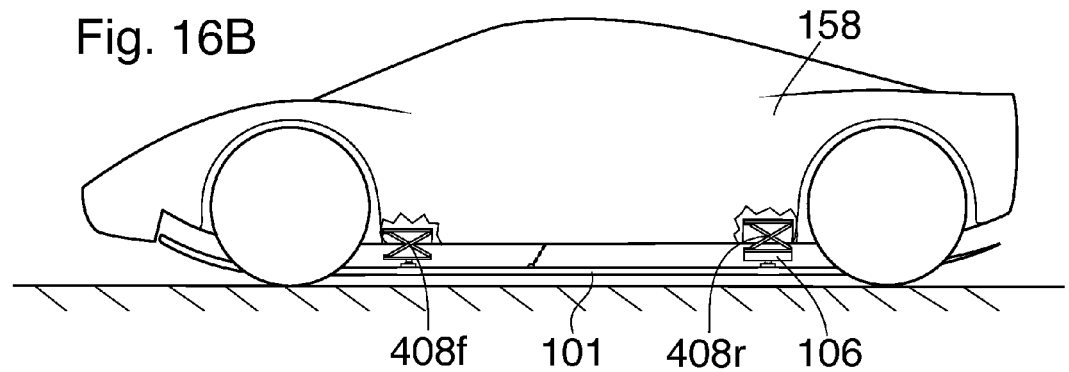

FIGS. 16A-B are elevation views of vehicles fitted with either front and rear telescoping stabilization linkages 308$f$-308$r$ (16A) or front and rear pantographic stabilization linkages 408$f$-408$r$ (16B).

Figure 17A:
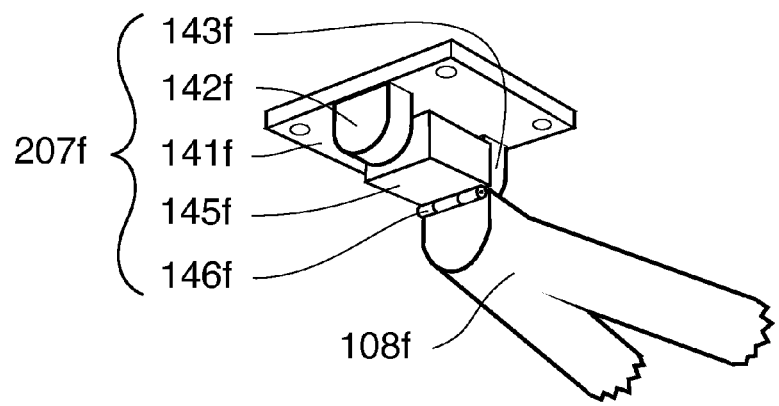
Figure 17B:
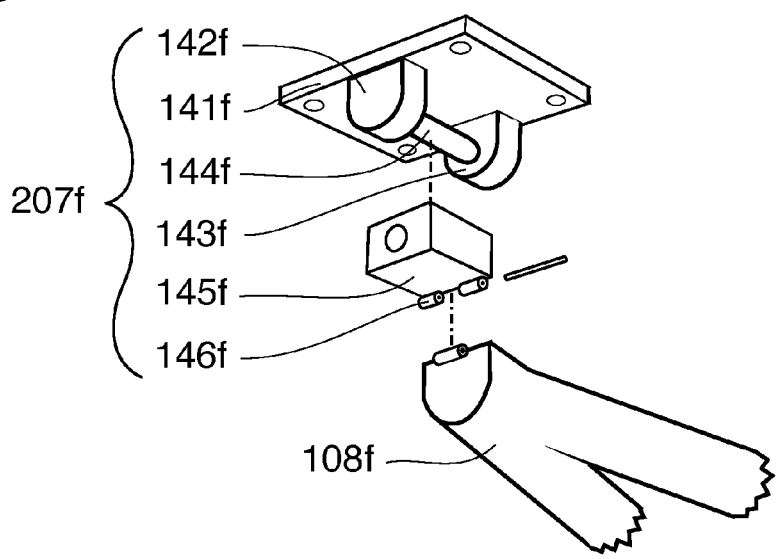
Figure 17C:
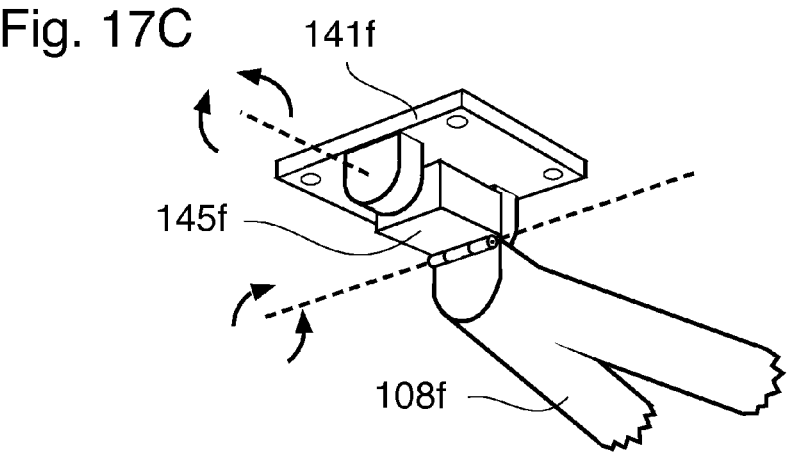

FIGS. 17A-C are perspective front three-quarter views from below (17A and C) and an exploded view (17B) of a front universal joint 207$f$ attached to a front stabilization linkage 108$f$.

Figure 18A:
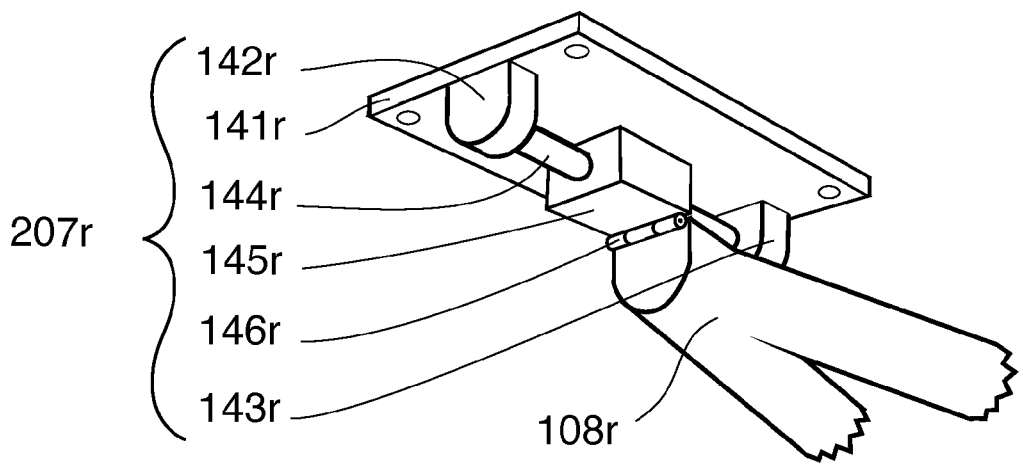
Figure 18B:
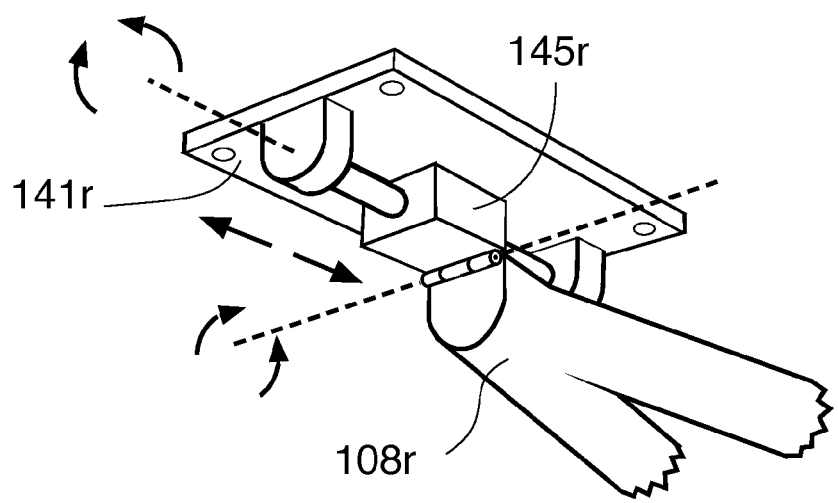

FIGS. 18A-B are perspective front three-quarter views from below of a rear universal joint with integral slider 207$r$ attached to a rear stabilization linkage 108$r$.

FIG. 19A is a rear view of a basic left rear lower support bracket 105$c$.

FIGS. 19B-D are a cross-sectional (19B), perspective (19C), and exploded (19D) views of a left rear adjustable lower support bracket 205$c$.

FIG. 19E is an elevation view of a left rear adjustable lower support bracket with retraction linkage attachment point 305$c$.

Figure 20A:
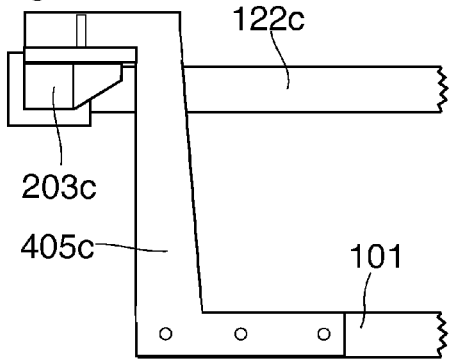
Figure 20B:
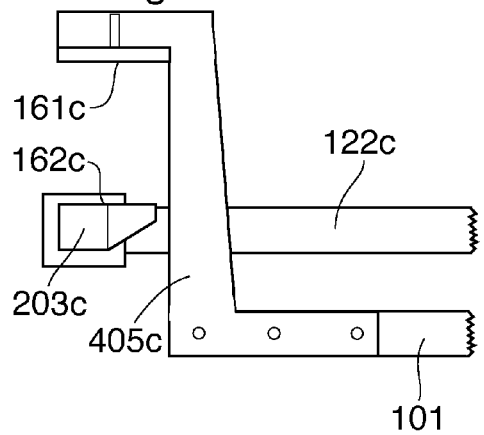

FIGS. 20A-B are rear views of a left rear lower control arm 122$c$ with free upper support bracket 203$c$ and free lower support bracket 405$c$ in engaged, deployed position (20A) and separated, retracted position (20B).

Figure 20C:
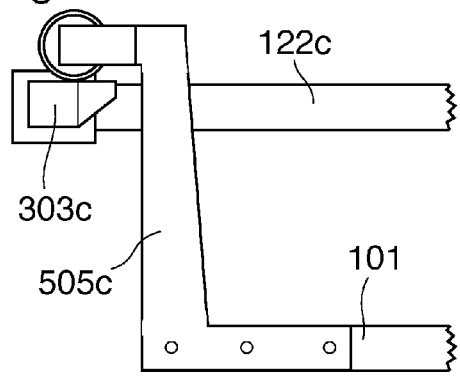

FIG. 20C is a rear view of a left rear lower control arm 122$c$ with free upper support bracket for roller 303$c$ and free lower support bracket with roller 505$c$ in engaged, deployed position.

Figure 20D:
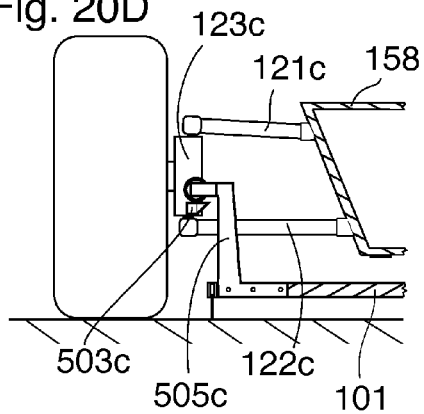

FIG. 20D is a cross-sectional view of the left rear suspension showing an upright-mounted free upper support bracket for roller 503$c$ and a free lower support bracket with roller 505$c$ in engaged, deployed position.

Figure 20E:
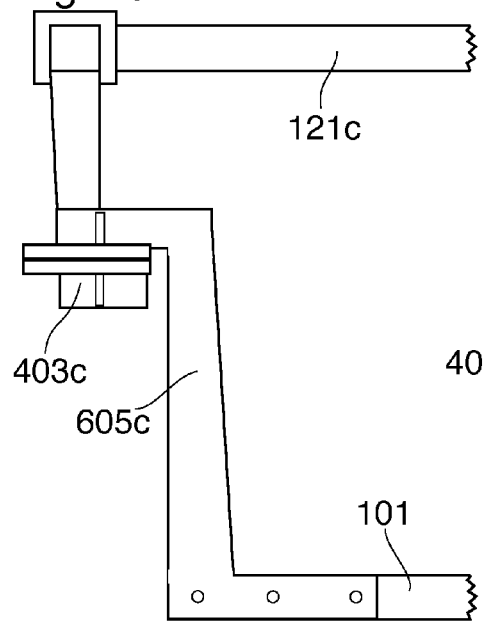
Figure 20F:
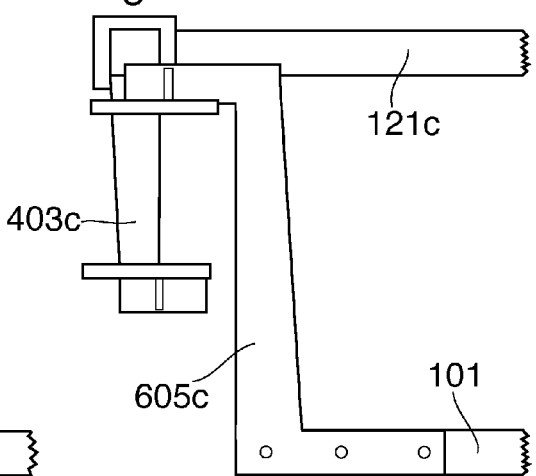

FIGS. 20E-F are rear views of a left rear upper control arm 121$c$ with free upper support bracket 403$c$ and free lower support bracket 605c in engaged, deployed position (20E) and separated, retracted position (20F).

FIG. 21A is a perspective left side view of a left rear lower control arm 122c with free upper support bracket 203c and free lower support bracket 405c in separated, retracted position.

FIG. 21B is a cross-sectional rear view of the left rear suspension with support linkage 104c directly attached to the movable underbody 101. The view in FIG. 21B is in accordance with line 2A-2A in FIG. 1A.

FIG. 21C is a perspective left side view of a left rear lower control arm 122c with free upper support bracket for roller 303c and free lower support bracket with roller 505c in separated, retracted position.

FIG. 21D is an exploded view of a left rear free lower support bracket with roller 505c (shown in FIG. 21C).

FIG. 21E is a perspective left side view of a left rear upper control arm 121c with free upper support bracket 403c and free lower support bracket 605c in separated, retracted position.

FIGS. 22A-B are cross-sectional rear views of the left rear suspension of two vehicles with left rear upper support bracket with sprocket 703c (22A) and left rear upper support bracket with pulley 803c (22B). The direction of sight in these two Figures is in accordance with the direction of sight indicated by cross-sectional line 2A-2A of FIG. 1A.

FIGS. 23A-C are elevation views of a vehicle with a movable underbody 101 with downforce distributions to the wheels at neutral (23A), forward pitch (23B), and rear pitch (23C) orientations.

Figure 24A:
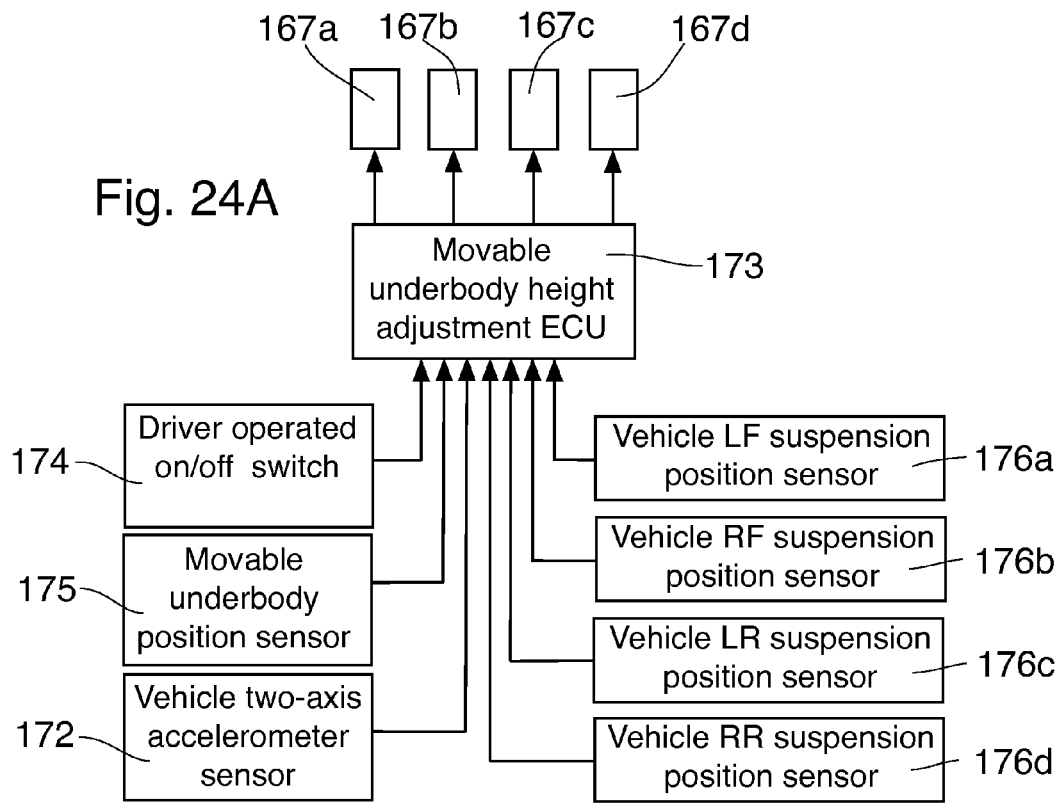
Figure 24B:
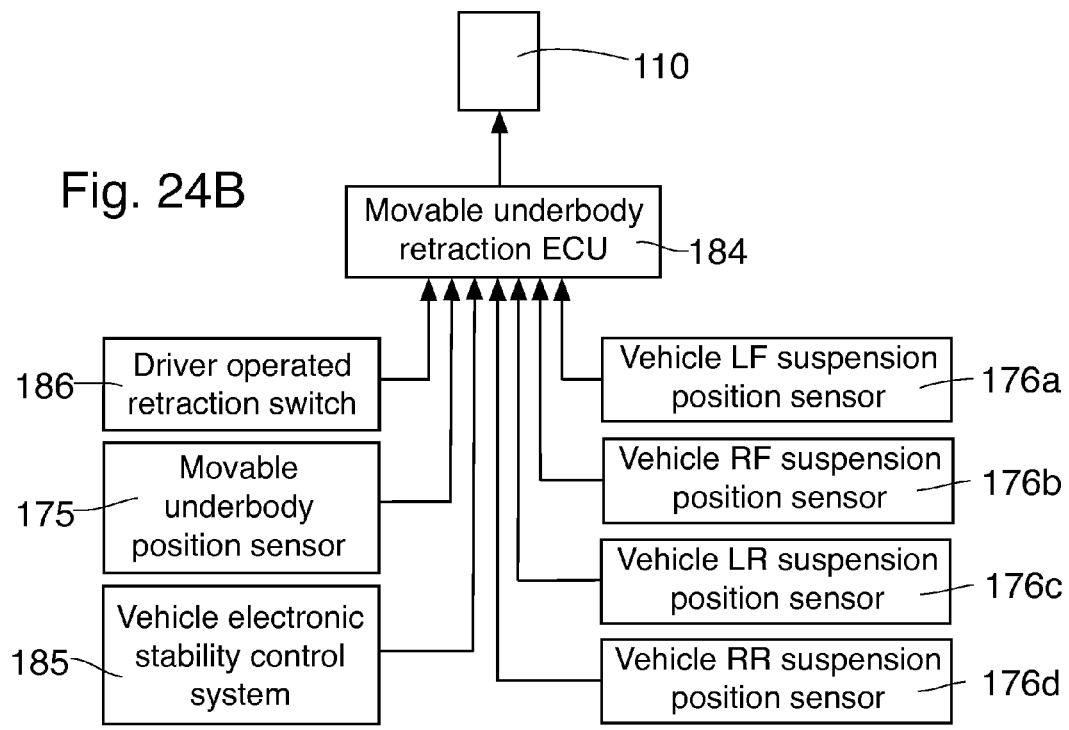

FIGS. 24A-B are block diagrams of a movable underbody height-adjustment control means (24A) and a movable underbody retraction control means (24B).

Figure 25:
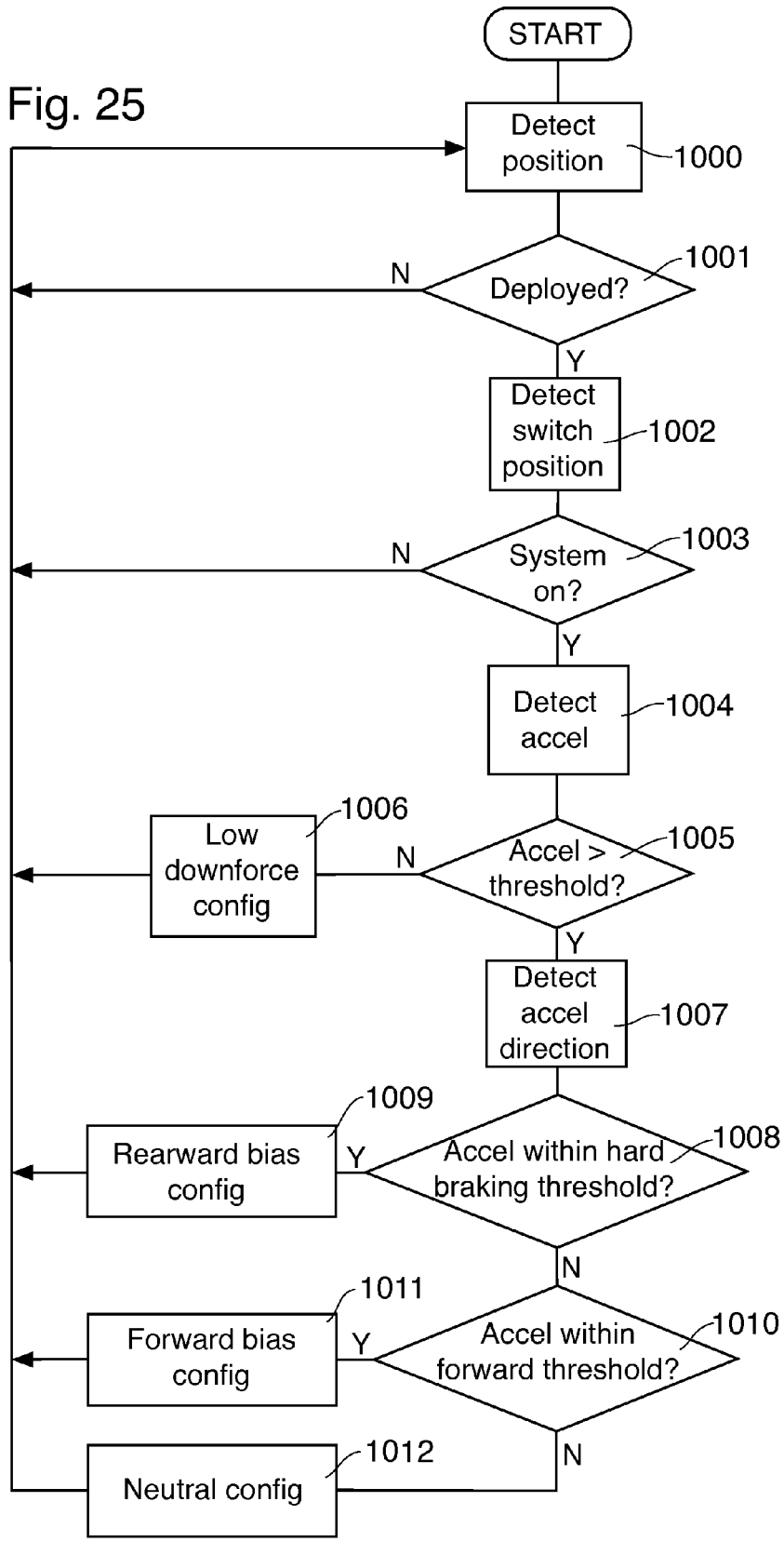

FIG. 25 is a flowchart for a movable underbody height-adjustment electronic control unit ("ECU") 173.

Figure 26A:
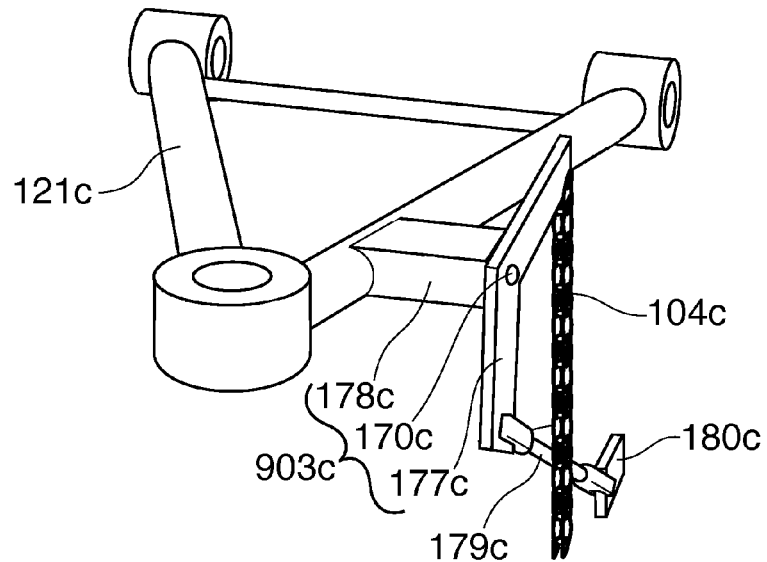

FIG. 26A is a perspective left side view of a left rear upper control arm 121c with an upper support bracket with basal bellcrank 903c and pushrod 179c.

Figure 26B:
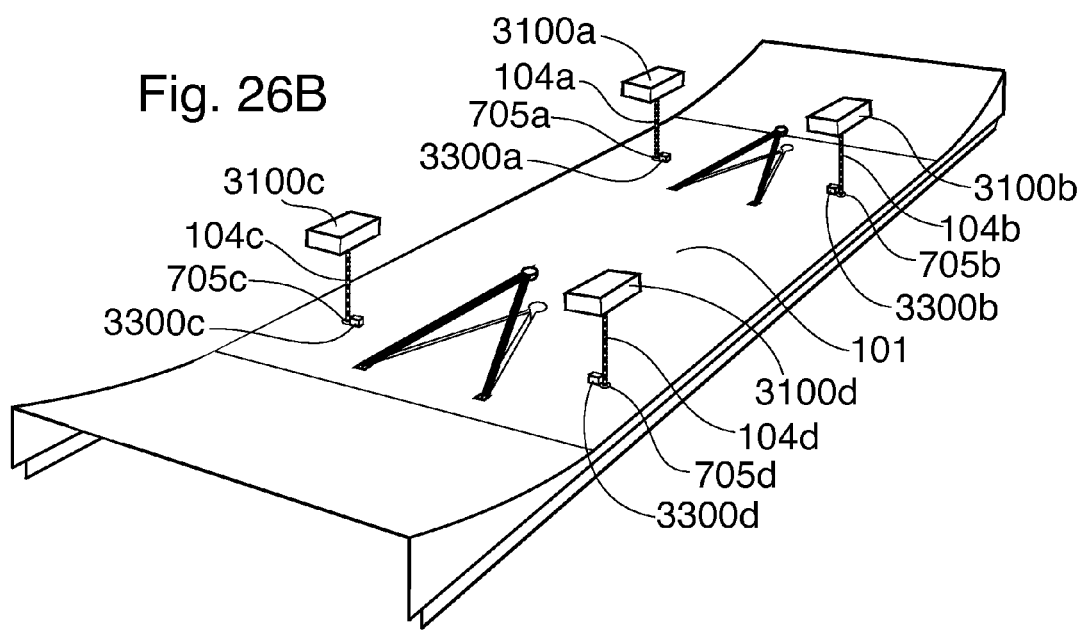

FIG. 26B is a perspective rear three-quarter view of a movable underbody device of a third alternative embodiment in accordance with the present invention.

FIGS. 27A-D are cross-sectional views of a vehicle fitted with an upper support bracket with basal bellcrank 903c and pushrod 179c at different body positions. The direction of sight in these two Figures is in accordance with the direction of sight indicated by cross-sectional line 2A-2A of FIG. 1A.

Figure 28A:
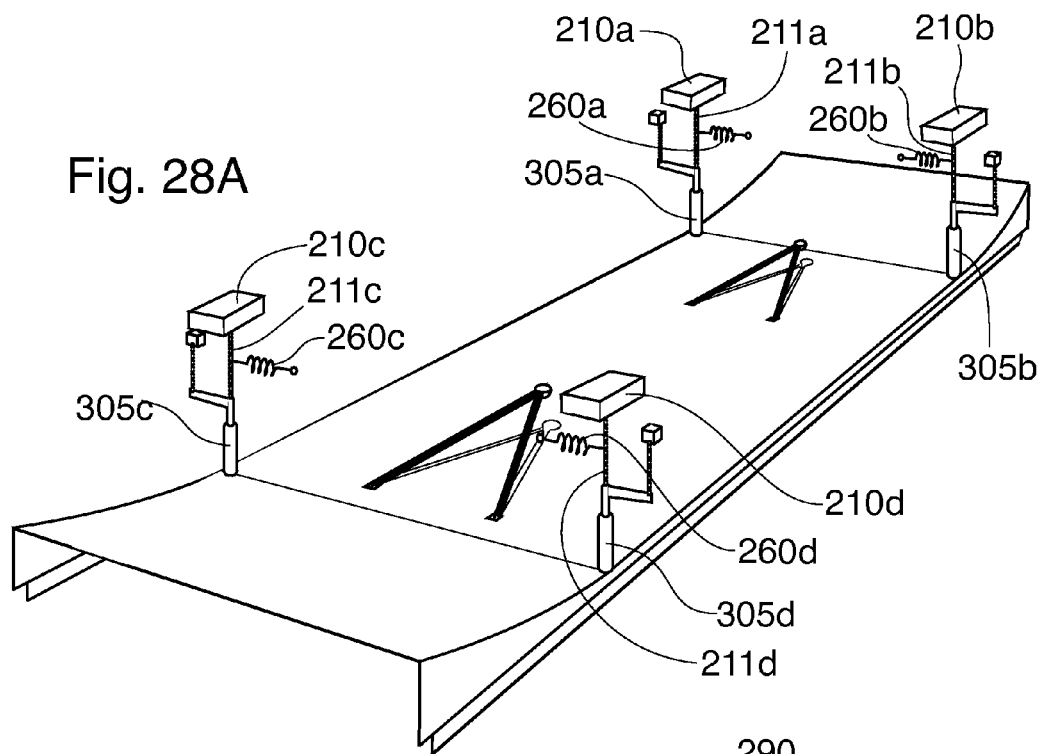

FIG. 28A is a perspective rear three-quarter view of a movable underbody 101 with adjustable lower support brackets with retraction linkage attachment points 305a-305d and associated retraction linkages 211a-211d and retraction actuators 210a-210d.

Figure 28B:
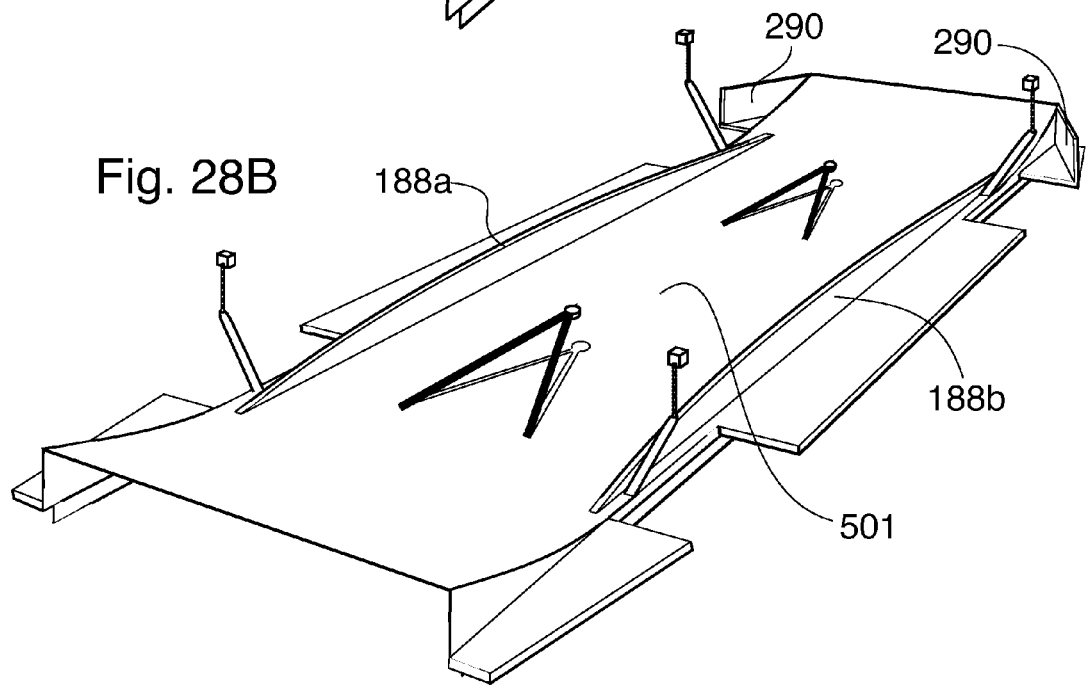

FIG. 28B is a perspective rear three-quarter view of a movable underbody 501 with side, front, and rear extensions, as well as support braces 188a-188b, and rigid aerodynamic fences 290.

Figure 29:
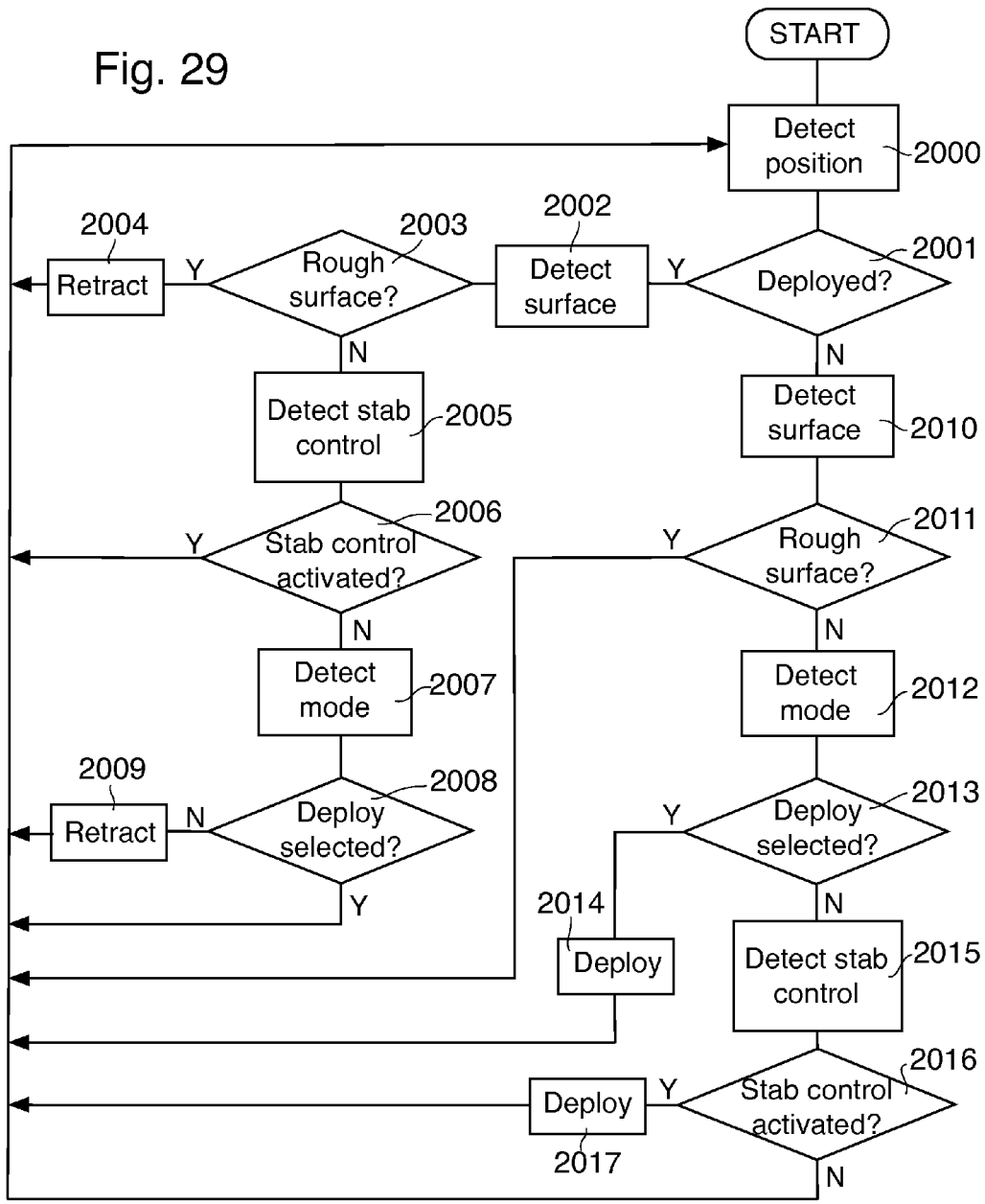

FIG. 29 is a flowchart for a movable underbody retraction ECU 184.

FIGS. 30A-E are plan views of several movable underbody embodiments.

Figure 31A:
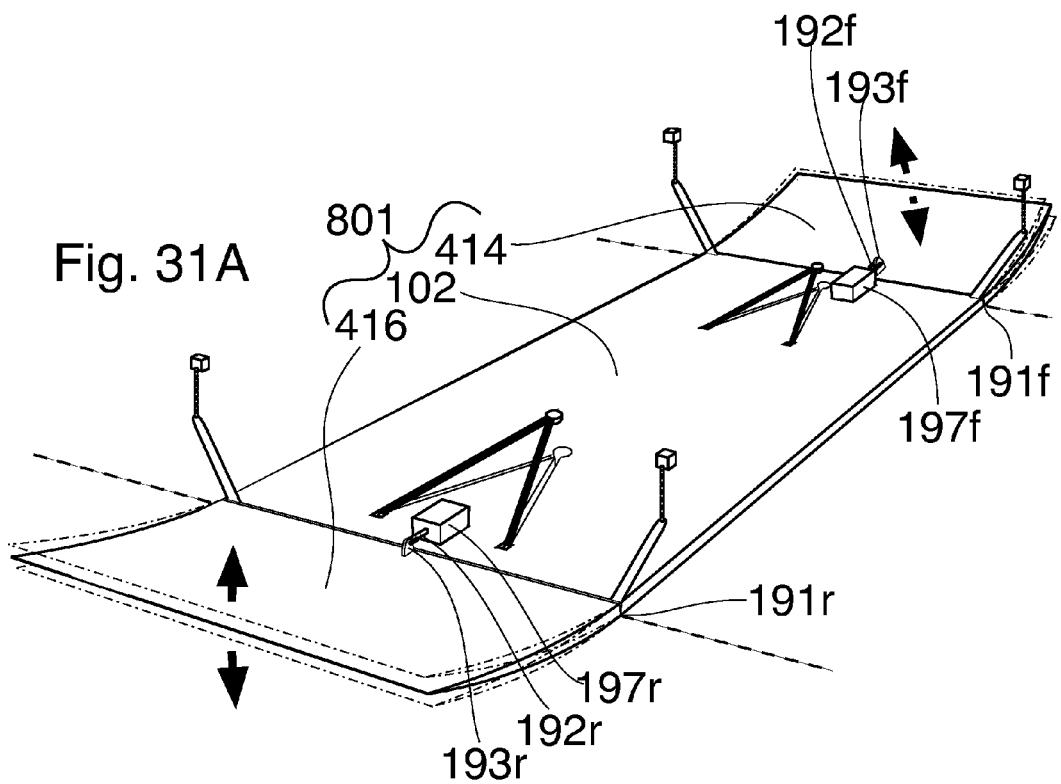
Figure 31B:
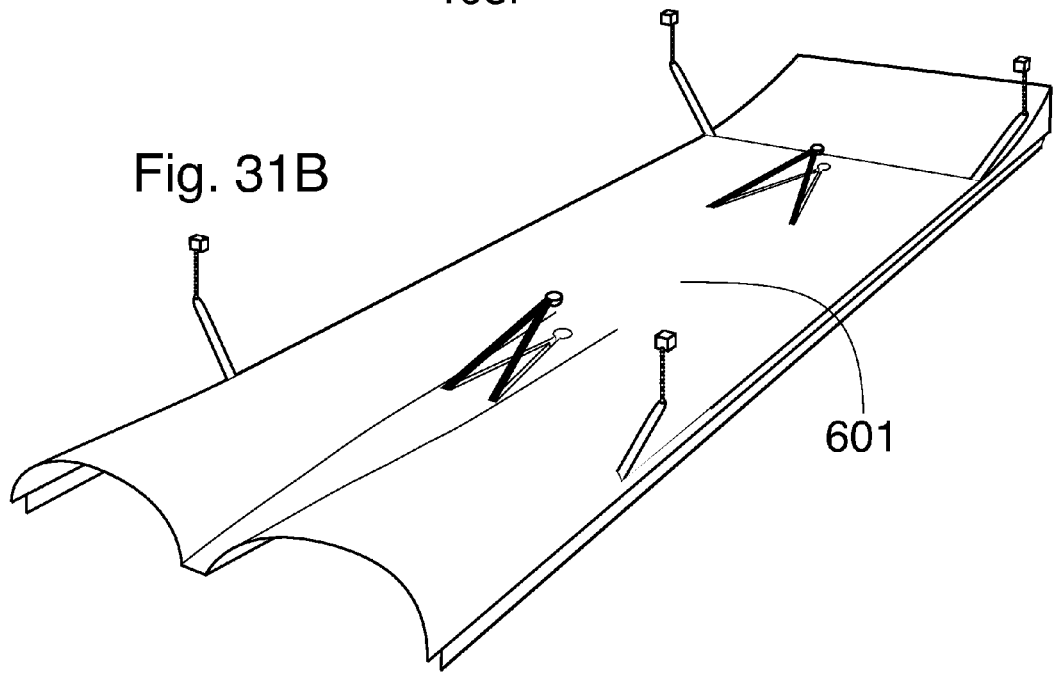

FIGS. 31A-B are perspective rear three-quarter views of a movable underbody 801 with adjustable inlet and adjustable diffuser (31A) and a movable underbody with tunnels 601 (31B).

Figure 32A:
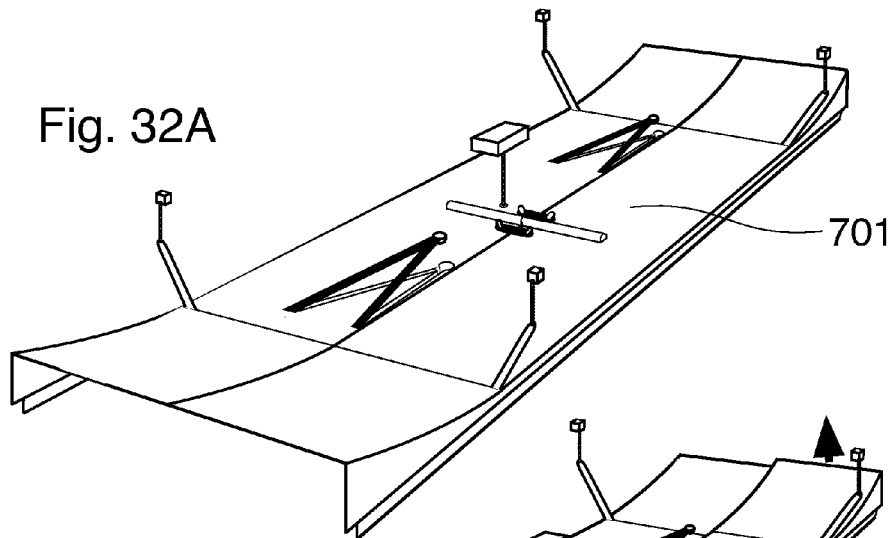
Figure 32B:
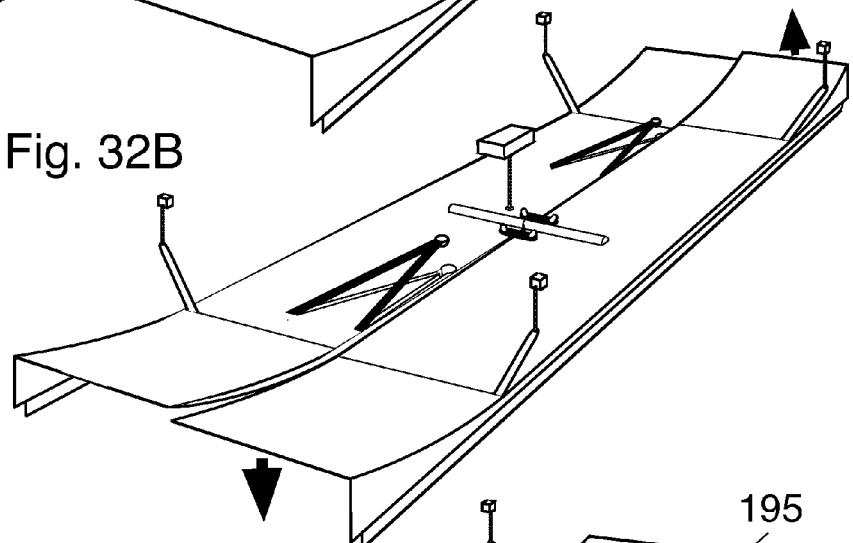
Figure 32C:
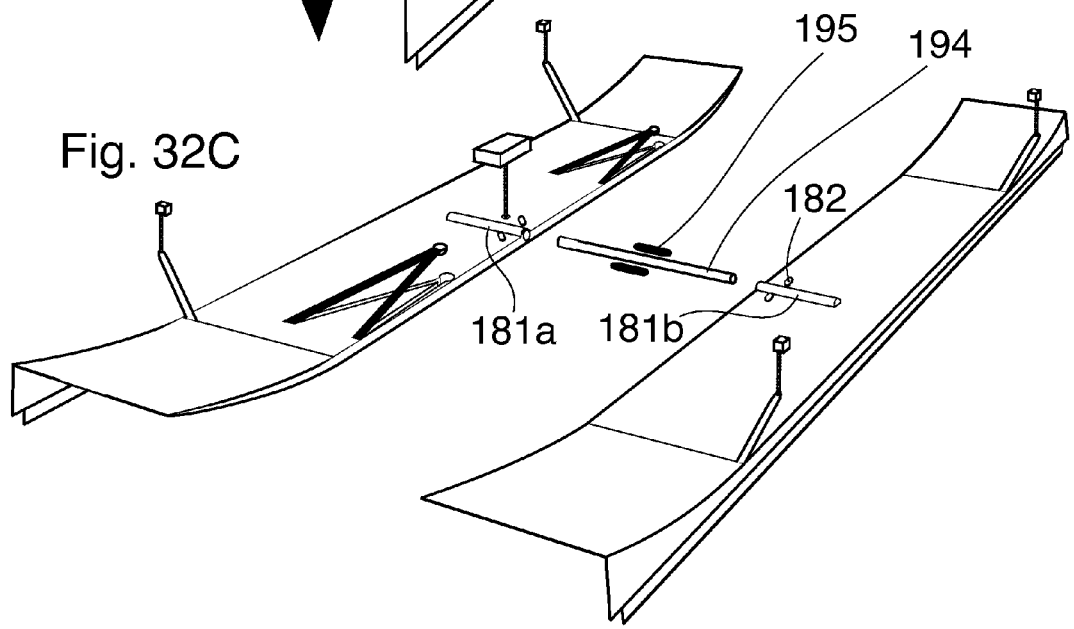

FIGS. 32A-C are perspective rear three-quarter views (32A-B) and exploded view (32C) of an articulating two-element movable underbody 701.

FIG. 33A is a cross-sectional view of a left sliding skirt 119a in deployed position.

FIG. 33B is a perspective rear three-quarter view of a portion of a movable underbody 101 with left siding skirt 119a in deployed position.

FIG. 33C is a cross-sectional view of a left hinged skirt 219a in deployed position and in accordance with line 33C-33C of FIG. 33F.

FIG. 33D is a cross-sectional view of a left hinged skirt 219a in deployed position and in accordance with line 33D-33D of FIG. 33F.

FIG. 33E is a cross-sectional view of a left hinged skirt 219a in retracted position against the lower surface of a vehicle body 158. The view is in accordance with line 33D-33D in FIG. 33F.

FIG. 33F is a perspective rear three-quarter view of a portion of a movable underbody 101 with left hinged skirt 219a in deployed position.

Figure 34A:
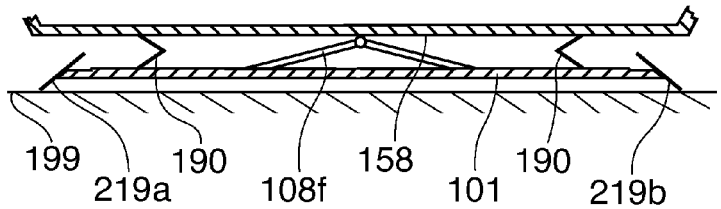
Figure 34B:
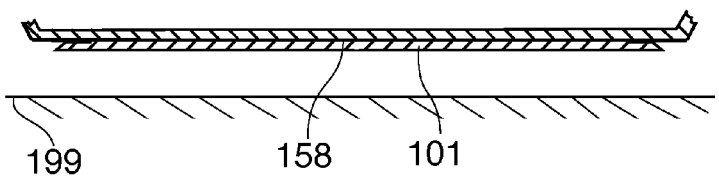

FIGS. 34A-B are cross-sectional views of the lower surface of a vehicle body 158 with folding aerodynamic fences 190 and a movable underbody 101 in a deployed position (34A) and in a retracted position (34B). The views in these Figures are in accordance with line 34A-34A of FIG. 23A FIGS. 34C-L are plan views of a movable underbody 501 with side, front, and rear extensions, and with various arrangements of folding aerodynamic fences 190 (34C, E-H) and with the same arrangements of folding aerodynamic fences 190 showing airflow patterns (34D, I-L).

Figure 35A:
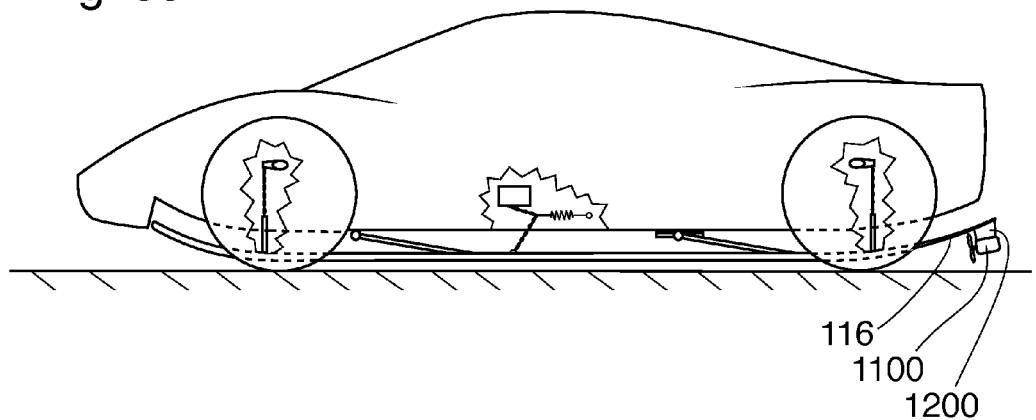

FIG. 35A is an elevation view of a vehicle fitted with the first alternative embodiment in accordance with the present invention.

Figure 35B:
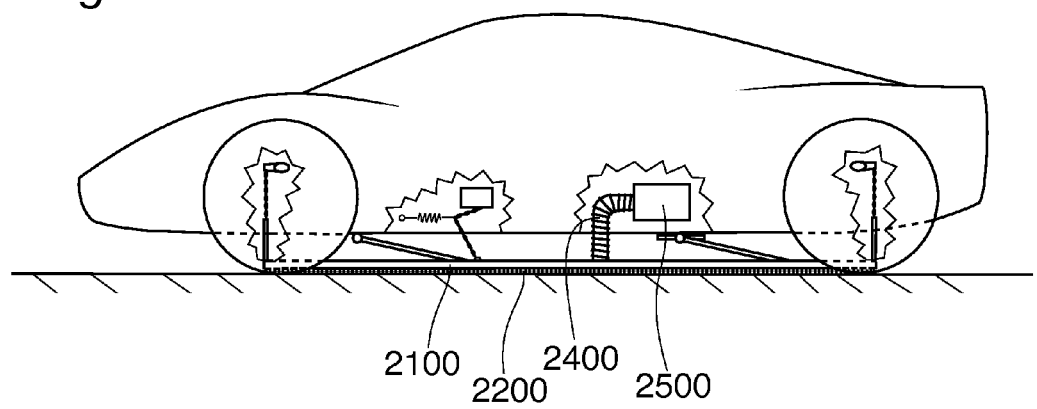

FIG. 35B is an elevation view of a vehicle fitted with the second alternative embodiment in accordance with the present invention.

Figure 36A:
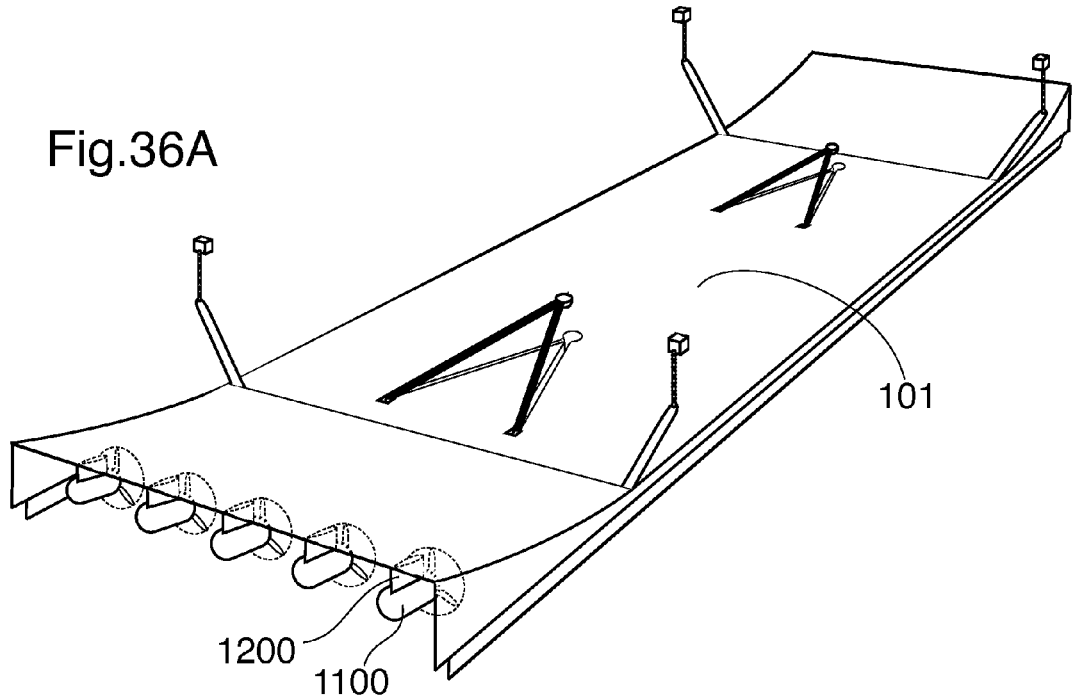

FIG. 36A is a rear three-quarter view of a movable underbody device of the first alternative embodiment in accordance with the present invention.

Figure 36B:
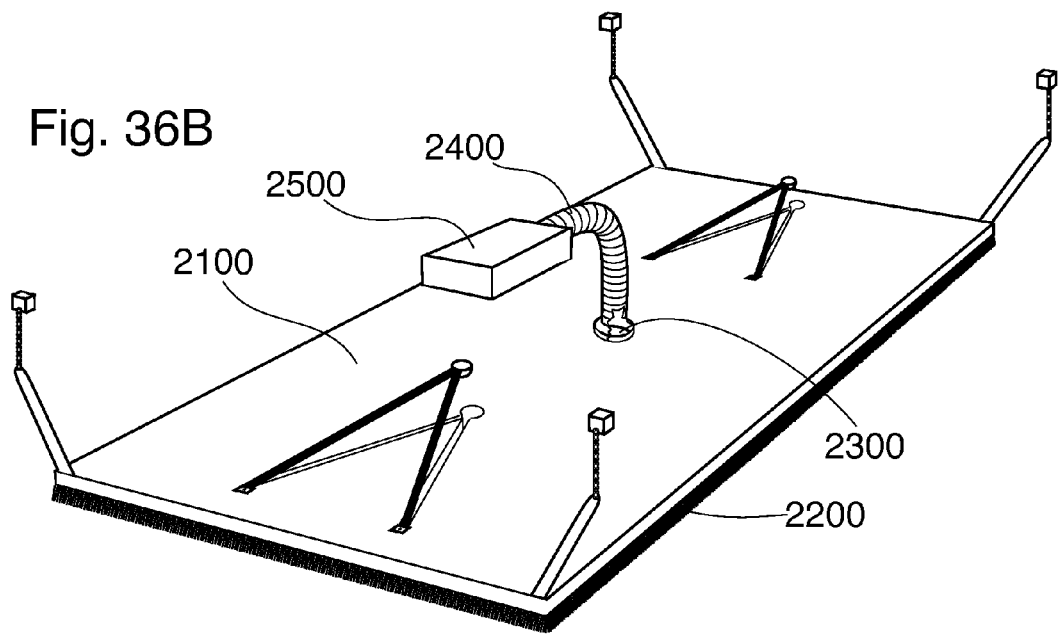

FIG. 36B is a rear three-quarter view of a vacuum plate device of the second alternative embodiment in accordance with the present invention. The lower end of the vacuum hose 2400 is partially removed to show the vacuum plate orifice 2300.

Figure 37:
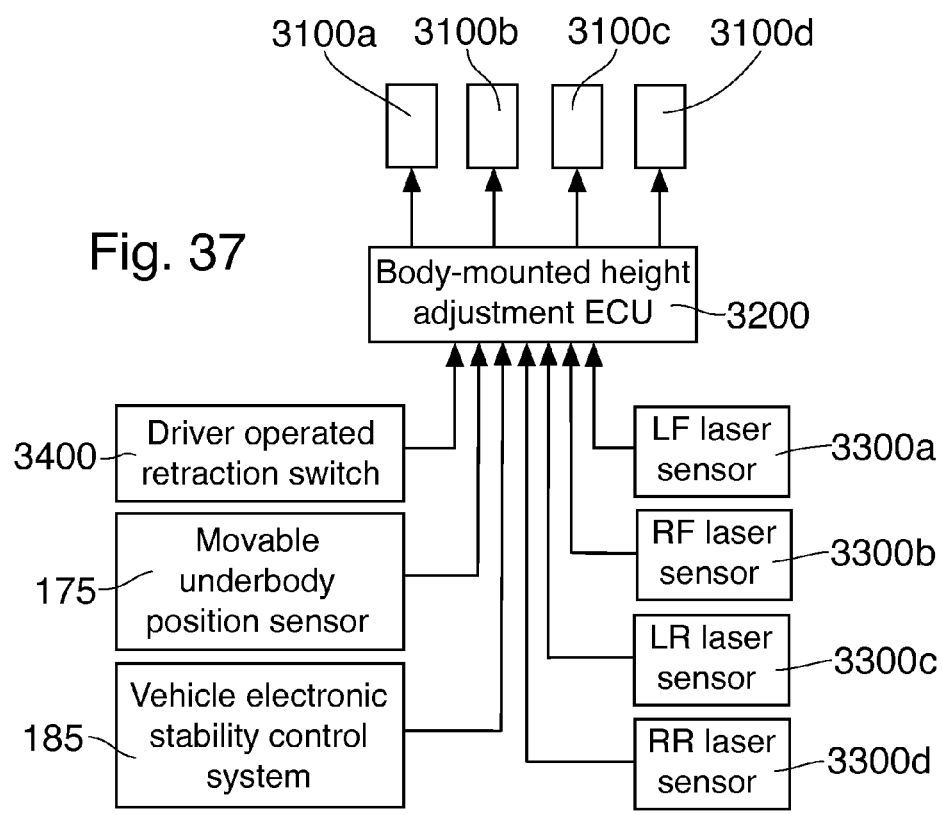

FIG. 37 is a block diagram of a body-mounted movable underbody height-adjustment and retraction control means.

FIG. 38 is a flowchart for a body-mounted movable underbody height-adjustment ECU 3200.

Figure 39A:
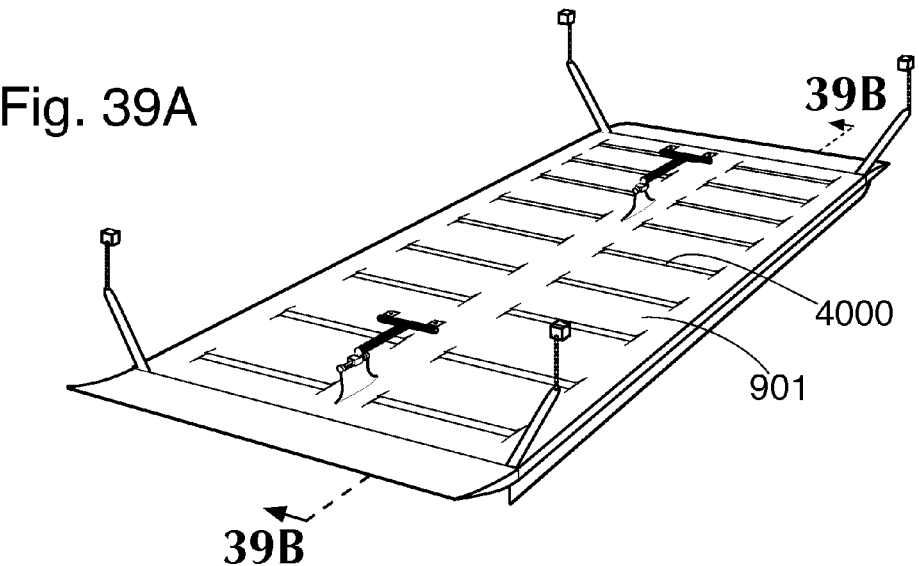

FIG. 39A is a perspective rear three-quarter view of a slotted movable underbody 901.

Figure 39B:
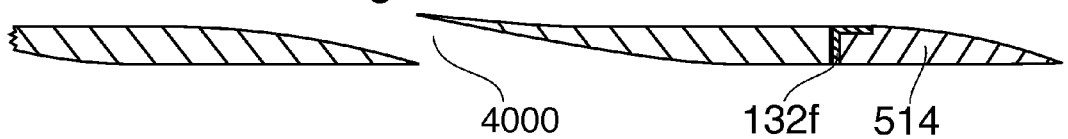

FIG. 39B is a longitudinal section of a portion of a slotted movable underbody 901 showing the shape of a slot 4000 and intervening spaces.

Figure 39C:
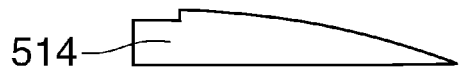
Figure 39D:
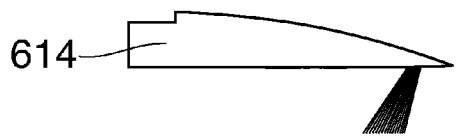
Figure 39F:
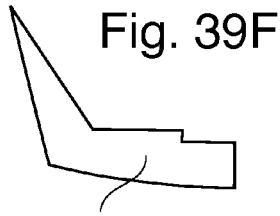
Figure 39E:
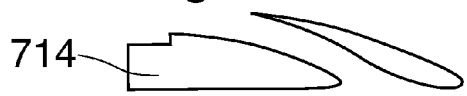

FIG. 39C-E are elevation views of additional inlet embodiments.

FIG. 39F is an elevation view of a movable underbody spoiler 516.

FIG. 40A is a perspective front three-quarter view of a vehicle's wheels 124a-124d at full suspension compression.

FIG. 40B is a perspective front three-quarter view of a vehicle's wheels 124a-124d at example positions as they rest upon a roadway 199.

FIG. 40C is a perspective front three-quarter view of a vehicle's wheels 124a-124d at the example positions shown in FIG. 40B, along with body-mounted height-adjustment actuators 3100a-3100d.

Figure 41A:
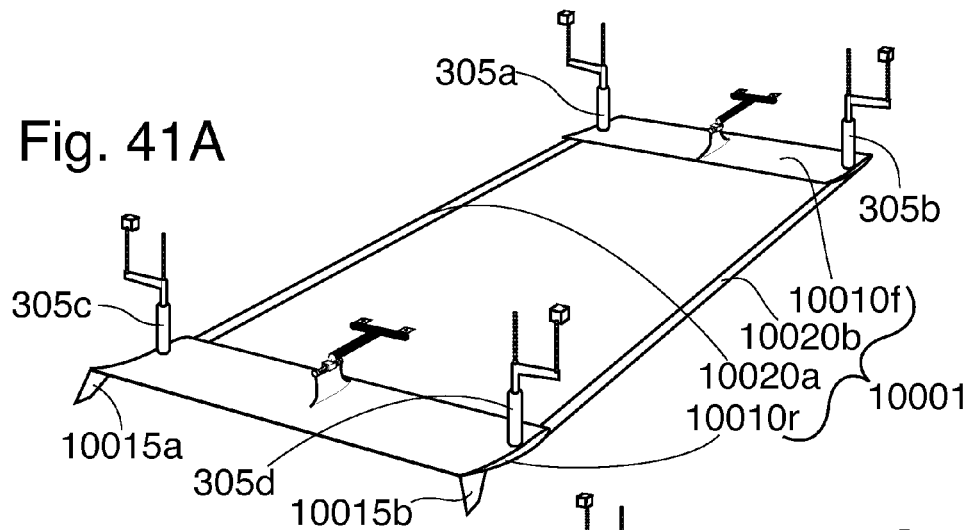

FIG. 41A is a perspective rear three-quarter view of a winged movable underbody 10001.

Figure 41B:
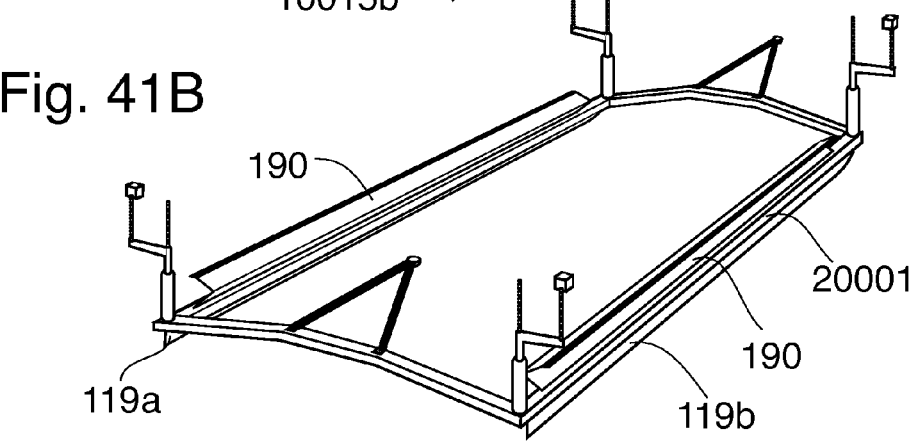

FIG. 41B is a perspective rear three-quarter view of a frame-like movable underbody 20001.

Figure 41C:
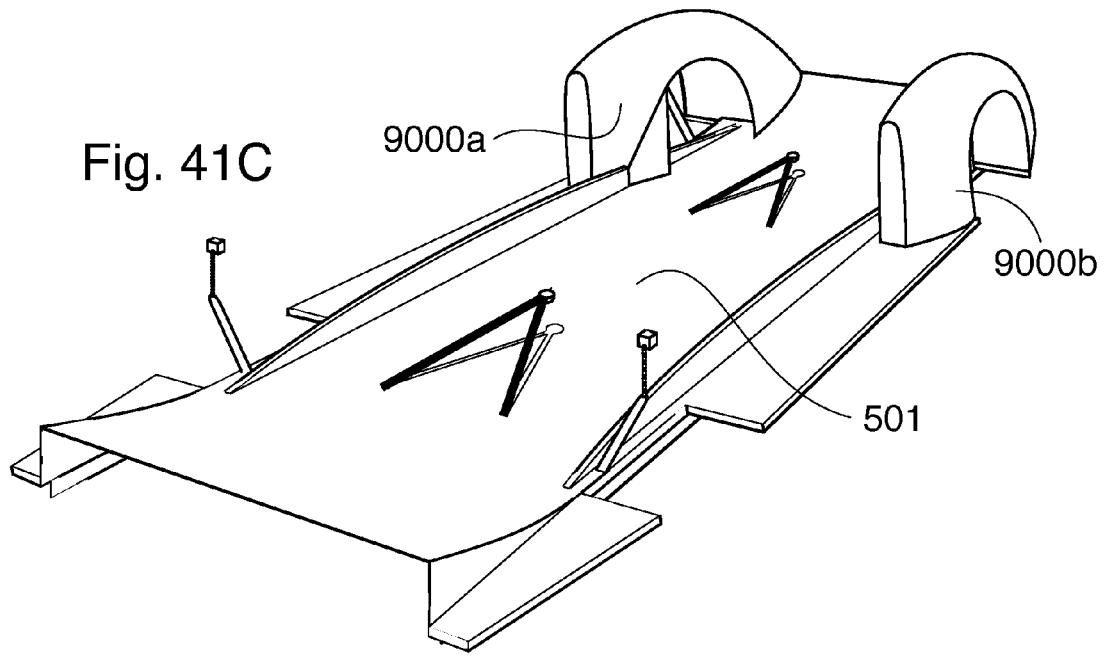

FIG. 41C is a perspective rear three-quarter view of a movable underbody 501 with side, front, and rear extensions, and a pair of complete front wheel fairings, 9000a-9000b.

DRAWINGS

Reference Numerals 101 movable underbody
102 movable underbody plate
103a-103d upper support brackets
104a-104d roller chain support linkages
105a-105d lower support brackets
106 sliding mechanism
107f front ball joint
107r rear ball joint
108f front stabilization linkage
108r rear stabilization linkage
109f front stabilization hinge
109r rear stabilization hinge
110 retraction actuator
111 retraction linkage
112 retraction linkage fitting
113 inlet depression
114 inlet
115a left inlet fence
115b right inlet fence
116 movable underbody diffuser
117a left movable underbody diffuser fence
117b right movable underbody diffuser fence
118a left skirt groove
118b right skirt groove
119a left sliding skirt
119b right sliding skirt
120 cushioning pad
121a-121d upper control arms
122c-122d lower control arms
123c-123d suspension uprights
124a-124d vehicle wheels
125 vehicle body diffuser
126f recess of the front stabilization linkage
126r recess of the rear stabilization linkage
127f ball of front ball joint
127r ball of rear ball joint
128f socket of front ball joint
128r socket of rear ball joint
129 mounting plate of front ball joint
130 sliding ball base of sliding mechanism
131 mounting track of sliding mechanism
132f inlet mounting bracket
132r diffuser mounting bracket
133 bushing of the lower support bracket
134f cylinder of front telescoping stabilization linkage
134r cylinder of rear telescoping stabilization linkage
135f piston of front telescoping stabilization linkage
135r piston of rear telescoping stabilization linkage
136f base plate of front pantographic stabilization linkage
136r base plate of rear pantographic stabilization linkage
137f ball plate of front pantographic stabilization linkage
137r ball plate of rear pantographic stabilization linkage
138f folding support rods of front pantographic stabilization linkage
138r folding support rods of rear pantographic stabilization linkage
139f support rod hinge of front pantographic stabilization linkage
139r support rod hinge of rear pantographic stabilization linkage
140f support rod slider of front pantographic stabilization linkage
140r support rod slider of rear pantographic stabilization linkage
141f base of front universal joint
141r base of rear universal joint
142f first bracket of front universal joint
142r first bracket of rear universal joint
143f second bracket of front universal joint
143r second bracket of rear universal joint
144f support rod of front universal joint
144r support rod of rear universal joint
145f spider of front universal joint
145r spider of rear universal joint
146f hinge of front universal joint
146r hinge of rear universal joint
147c upper arm of left rear articulating support linkage
148c lower arm of left rear articulating support linkage
149c stop of lower arm of left rear articulating support linkage
150c cylinder of left rear telescoping support linkage
151c piston of left rear telescoping support linkage
152 rod end bearing of support linkage
153c inner bracket piece of left rear adjustable lower support bracket
154c outer bracket piece of left rear adjustable lower support bracket
155c spring of left rear adjustable lower support bracket
156c adjustment bolt of left rear adjustable lower support bracket
157c washer of left rear adjustable lower support bracket
158 vehicle body
159c-159d left rear and right rear support linkage tensioner springs
160 retraction linkage tensioner spring
161c load bearing surface of the left rear free lower support bracket
162c load bearing surface of the left rear free upper support bracket
163c wheel fork of left rear lower support bracket with roller
164c bearing axle of left rear lower support bracket with roller
165c bearing wheel of left rear lower support bracket with roller
166c left rear upper support bracket pushrod
167c left rear movable underbody height-adjustment actuator
168c mounting bracket of left rear upper support bracket with bellcrank
169c crank of left rear upper support bracket with bellcrank
170c crank mounting pivot bolt of left rear upper support bracket with bellcrank
171c left rear downforce-measuring strain gauge
172 two-axis accelerometer sensor
173 movable underbody height-adjustment ECU
174 movable underbody height-adjustment on/off switch
175 movable underbody position sensor
176a-176d suspension position sensors
177c crank of left rear basal upper support bracket with bellcrank
178c mounting bracket of left rear basal upper support bracket with bellcrank 179c-179d pushrods of left rear and right rear basal upper support brackets with bellcrank
180c-180d pushrod mounts of left rear and right rear basal upper support brackets with bellcrank
181a left articular cylinder
181b right articular cylinder
182 peg
183 hinged skirt lever
184 movable underbody retraction ECU
185 electronic stability control system
186 retraction switch
187f front access panel
187m middle access panel
187r rear access panel
188a left support brace
188b right support brace
189a left support brace groove
189b right support brace groove
190 folding aerodynamic fence
191f front hinge of movable underbody
191r rear hinge of movable underbody
192f pushrod of adjustable inlet
192r pushrod of adjustable diffuser
193f control horn of adjustable inlet
193r control horn of adjustable diffuser
194 articular rod
195 retention band
196a left skirt hinge
197f adjustable inlet actuator
197r adjustable diffuser actuator
198f front pylon
198r rear pylon
199 roadway
201 movable underbody with minimal inlet and diffuser
203c left rear free upper support bracket for lower control arm
204c left rear cable support linkage
205a-205d adjustable lower support brackets
207f front universal joint
207r rear universal joint with integral slider
208f front T-shaped stabilization linkage
208r rear T-shaped stabilization linkage
210a-210d corner retraction actuators
211a-211d corner retraction linkages
214 upturned minimal inlet
216 minimal movable underbody diffuser
219a left hinged skirt
219b right hinged skirt
253c inner bracket piece of left rear lower support bracket with retraction linkage
254c outer bracket piece of left rear lower support bracket with retraction linkage
260a-260d corner retraction linkage tensioner springs
290 Rigid aerodynamic fence
301 movable underbody with front side cutouts
303c left rear free upper support bracket for roller
304c left rear Kevlar webbing support linkage
305a-305d adjustable lower support brackets with retraction linkage point
308f front telescoping stabilization linkage
308r rear telescoping stabilization linkage
314 symmetrical minimal inlet
316 two-element movable underbody diffuser
401 movable underbody with side extensions
403c left rear free upper support bracket for upper control arm
404c left rear articulating support linkage
405c left rear free lower support bracket
408f front pantographic stabilization linkage
408r rear pantographic stabilization linkage
414 adjustable inlet
416 adjustable diffuser
501 movable underbody with side, front, and rear extensions
503c left rear upright-mounted free upper support bracket
504c left rear telescoping support linkage
505c left rear free lower support bracket with roller
514 downturned minimal inlet
516 movable underbody spoiler
601 movable underbody with tunnels
603c left rear upper support bracket with bellcrank
604c left rear rigid support linkage
605c left rear free lower support bracket for upper control arm
614 downturned minimal inlet with brush
701 two-element movable underbody
703c left rear upper support bracket with sprocket
704c left rear elongated roller chain support linkage
705a-705d support linkage fittings
714 two-element inlet
801 adjustable movable underbody
803c left rear upper support bracket with pulley
804c left rear elongated cable support linkage
805c-805d medially situated lower support brackets
901 slotted movable underbody
903c-903d left rear and right rear upper support brackets with basal bellcrank
1100 electric fan
1200 mounting pylon for electric fan
2100 vacuum plate
2200 vacuum skirt
2300 vacuum plate orifice
2400 vacuum hose
2500 vacuum generator
3100a-3100d body-mounted height-adjustment actuators
3200 body-mounted movable underbody height-adjustment ECU
3300a-3300d laser sensors
3400 driver-operated retraction switch
3500 reference plane
3510a-3510d wheel support points at full suspension compression
3520 reference plane origin
3530 X-axis of reference plane
3540 Y-axis of reference plane
3550 Z-axis orthogonal to reference plane
3600 estimated support plane
3610a-3610d wheel support points relative to reference plane
3620 Z-intercept of longitudinal and transverse lines of estimated support plane
3630 longitudinal line of estimated support plane that intercepts Z-axis
3640 transverse line of estimated support plane that intercepts Z-axis
3650a-3650d estimated actuator ride heights
4000 movable underbody slot
5000 pivot bolt
5010 large pivot bolt for Kevlar webbing support linkage
6000 master link
7000 side plate
8000 retaining clip
9000a left front complete wheel fairing
9000b right front complete wheel fairing 10001 winged movable underbody
10010f front movable underbody wing
10010r rear movable underbody wing
10015a left winglet of rear movable underbody wing
10015b right winglet of rear movable underbody wing
10020a left connecting rod
10020b right connecting rod
20001 frame-like movable underbody
20002 motor

DETAILED DESCRIPTION

FIGS. 1, 2, 3A, 4, 5A-B, 6, 7A, 8A-B, 9A-B, D, F, 12G, 30A, 33A-B—Basic Embodiment The basic embodiment of the present invention includes a movable underbody 101 (FIG. 1A) below a body 158 (FIG. 1A) of a vehicle with four wheels 124a-124d (FIG. 30A) and a motor 20002 (FIG. 2A) adapted to propel the vehicle. FIG. 1A is an elevation view of the left side of the basic embodiment of a vehicle with a movable underbody 101 in its deployed position, in accordance with the present invention. FIG. 1B shows the vehicle with the movable underbody 101 in its retracted position. As shown in FIG. 1A, the movable underbody 101 is connected to the vehicle body 158 through a pair of stabilization linkages, front 108f and rear 108r. The movable underbody 101 is suspended below the vehicle body 158 by four support linkages 104a-104d, each associated with a corresponding vehicle wheel 124a-124d and attached near or on a corresponding one of the four corner areas of the movable underbody 101. The support linkages 104a-104d (see FIG. 3A) are comprised of a left front support linkage 104a associated with the left front wheel 124a, a right front support linkage 104b associated with the right front wheel 124b (see FIG. 12G), a left rear support linkage 104c associated with the left rear wheel 124c, and a right rear support linkage 104d associated with the right rear wheel 124d (see FIG. 2A). For purposes of this disclosure, the four corner areas of the vehicle and four corner areas of the movable underbody 101, refer to portions of these components located near the four wheels 124a-124d of the vehicle. In this disclosure, components that are located in the four corner areas of embodiments of the present invention are designated with the following suffixes: "a" for one in the left front corner area, "b" for one in the right front corner area, "c" for one in the left rear corner area, and the suffix "d" for one in the right rear corner area. Throughout much of this disclosure, only the left rear suspension of the vehicle, left rear corner area of the vehicle body 158, and left rear corner area of the movable underbody 101 and associated structures of the present invention are shown. The other corner areas of the present invention not shown have the same form as the left rear corner area shown, except that the components are reversed on the right side of the vehicle from that shown for the left rear corner area of the vehicle.

Each of the four support linkages 104a-104d (see FIG. 3A) is attached via a corresponding upper support bracket 103a-103d (see FIG. 3A), designated left front 103a, right front 103b, left rear 103c, and right rear 103d, to the corresponding end of one of the vehicle's four upper control arms 121a-121d (see FIGS. 1A, 2A, and 12G), designated left front 121a, right front 121b, left rear 121c, and right rear 121d. Each support linkage 104a-104d (see FIG. 3A) extends downward from the corresponding upper support bracket 103a-103d (see FIG. 3A) to a lower support bracket 105a-105d (see FIG. 3A), designated left front 105a, right front 105b, left rear 105c, and right rear 105d, attached to the corresponding corner area of the movable underbody 101. Although the lower support brackets 105a-105d (or their variations) are herein described separately from the movable underbody 101, they are each effectively a part of the corresponding corner area of the movable underbody 101 (or its variations). A vehicle with double wishbone suspension is shown throughout this disclosure, but it is in accordance with the present invention to mount the device of the present invention to vehicles fitted with other types of suspension system, including McPherson/Chapman strut suspensions (see below under additional embodiments of the upper support brackets).

Both the front stabilization linkage 108f and rear stabilization linkage 108r are articulated with the vehicle body 158 through a ball joint, labeled 107f for the front ball joint and 107r for the rear ball joint. The ball joint 107r connected to the rear stabilization linkage 108r is attached through a longitudinally oriented sliding mechanism 106 (or "slider") to the undersurface of the vehicle body 158. At the opposite end of both the front stabilization linkage 108f and rear stabilization linkage 108r is a divided, transversely oriented hinge, labeled 109f (see FIG. 3A) for the front hinge and 109r (see FIG. 3A) for the rear hinge. The front hinge 109f and rear hinge 109r are each articulated to the upper side of the movable underbody 101.

Near its midpoint the movable underbody 101 is connected via a fitting 112 to a retraction linkage 111 that extends to a retraction actuator 110 within the vehicle body 158. A retraction tensioner spring 160 extends from the retraction linkage 111 to the vehicle body 158. The retraction actuator 110 may be one of several different types, including, for example, an electric, pneumatic, or hydraulic actuator. The retraction linkage 111, retraction actuator 110, and retraction tensioner spring 160 are components of an exemplary "retraction means." Other embodiments of the retraction means are disclosed herein and may be used instead.

The front portion of the movable underbody 101 is curved upward to form an underbody inlet 114 that is accommodated by an inlet depression 113 on the vehicle body 158. The rear portion of the movable underbody 101 is gradually bent upward to form a movable underbody diffuser 116 (see FIG. 1B) that is accommodated by a corresponding vehicle body diffuser 125 at the rear of the vehicle body 158. Other embodiments of a movable underbody inlet 114 and movable underbody diffuser 116 are disclosed herein and may be used instead. Between the inlet 114 and underbody diffuser 116 is the movable underbody plate 102 (see FIG. 3A). The inlet 114, movable underbody plate 102, and movable underbody diffuser 116 (FIG. 1B) comprise the movable underbody 101. While the movable underbody 101 is herein described as comprising three parts (viz. inlet 114, movable underbody plate 102, and movable underbody diffuser 116), the movable underbody 101 may be considered and constructed as one indivisible structure or as a structure with alternative subdivisions. For example, the inlet 114 and/or movable underbody diffuser 116 may be completely continuous with the rest of the movable underbody 101. Because the lower support brackets 105a-105d (FIG. 3A) are rigidly fixed to the movable underbody 101, they may also be constructed as integral, inseparable parts of the movable underbody 101.

For purposes of this disclosure, the vehicle body 158 includes all of the fully-sprung components of the vehicle that are isolated from the movements of the wheels 124a-124d and end of the suspension by the shock-damping system of the vehicle's suspension system. For purposes of this disclosure, "suspension system" refers to those components of the vehicle that connect each of the wheels 124a-124d to the fully-sprung body 158 and that permit relative vertical displacement of the wheel 124a-124d and the vehicle body 158. The unsprung components of the vehicle's suspension are those components of the suspension that substantially reciprocate with one or more of the wheels 124a-124d of the vehicle.

Figure 2A:
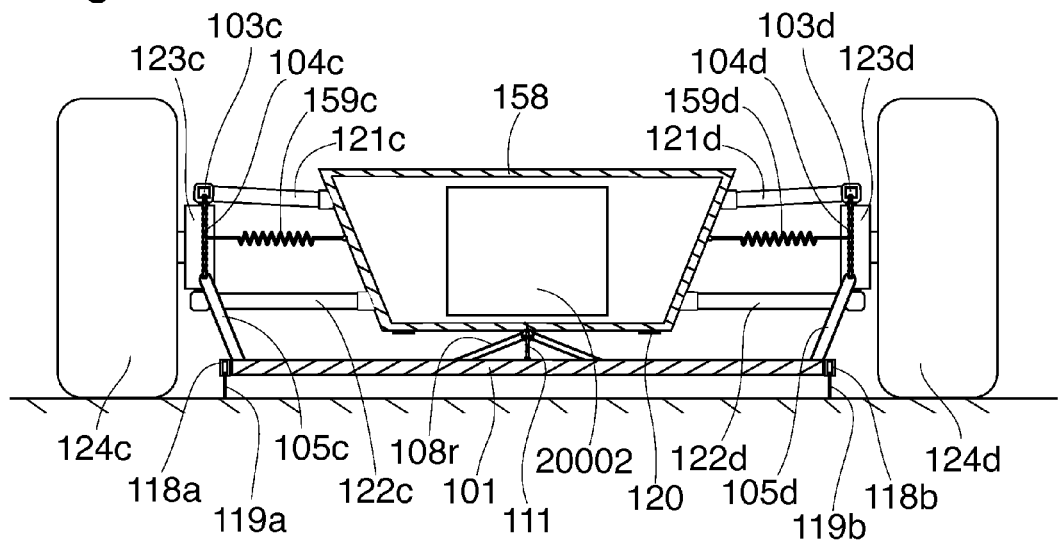
Figure 2B:
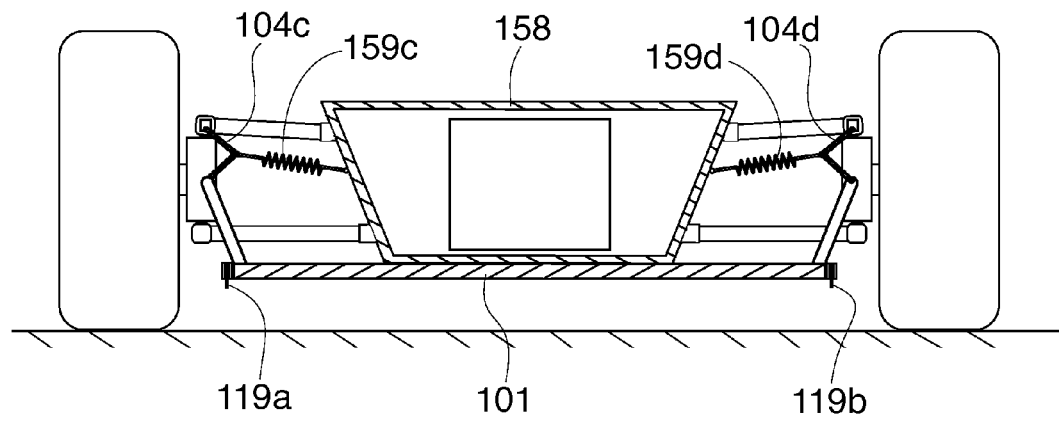

FIG. 2A is a cross-sectional rear view immediately behind the rear wheels 124c-124d of the basic embodiment of a vehicle in accordance with the present invention and in accordance with line 2A-2A of FIG. 1A. The rear wheels 124c-124d and the suspension of the vehicle are shown in FIG. 2A, along with the movable underbody 101 in its deployed position. FIG. 2B shows the same, with the movable underbody 101 in its retracted position. In addition to the elements illustrated in FIG. 1A and listed in the preceding paragraphs, FIGS. 2A and 2B show the rear support linkage tensioner springs 159c and 159d. Also shown are several components of the vehicle's suspension system, including lower control arms 122c and 122d, upper control arms 121c and 121d, and suspension uprights 123c and 123d of the rear suspension of the vehicle. Not shown are the front support linkage tensioner springs, front lower control arms, front upper control arms, and front suspension uprights. Other suspension components of the vehicle, including springs, dampers, toe links, steering arms, and driveshafts, are not shown. Additionally, the upper portion of the vehicle body 158 is not shown and the rear wheels 124c-124d are shown only in outline rather than cross-section. The same convention is maintained in all cross-sectional rear views taken from immediately behind the rear wheels 124c-124d in accordance with line 2A-2A of FIG. 1A.

The sides of the movable underbody 101 bear abrasion-resistant aerodynamic skirts, designated 119a for the left sliding skirt and 119b for the right sliding skirt. The aerodynamic skirts 119a-119b are slidingly recessed into corresponding skirt grooves, left 118a and right 118b, at the sides of the movable underbody 101. FIG. 33B is a perspective rear three-quarter view from above of the left side portion of a movable underbody 101 with a left sliding skirt 119a in deployed position. FIG. 33A is a cross-sectional view of a left sliding skirt 119a in deployed position in accordance with line 33A-33A of FIG. 33B. The sliding skirts 119a-119b may be constructed from a low friction, abrasion-resistant material, such as, for example, glass-reinforced plastic ("GRP") strips. Alternatively, the sliding skirts 119a-119b may be deleted altogether from the design.

Another embodiment of an aerodynamic skirt is disclosed herein and may be used instead. For purposes of clarity, the aerodynamic skirts are not shown in FIGS. 1A and 1B and in the other side views of the vehicle. Additionally, aerodynamic fences 190, as described under additional embodiments of the movable underbody and appearing, for example, in FIGS. 34A through 34L, are not shown in any side views of the vehicle.

Figure 3A:
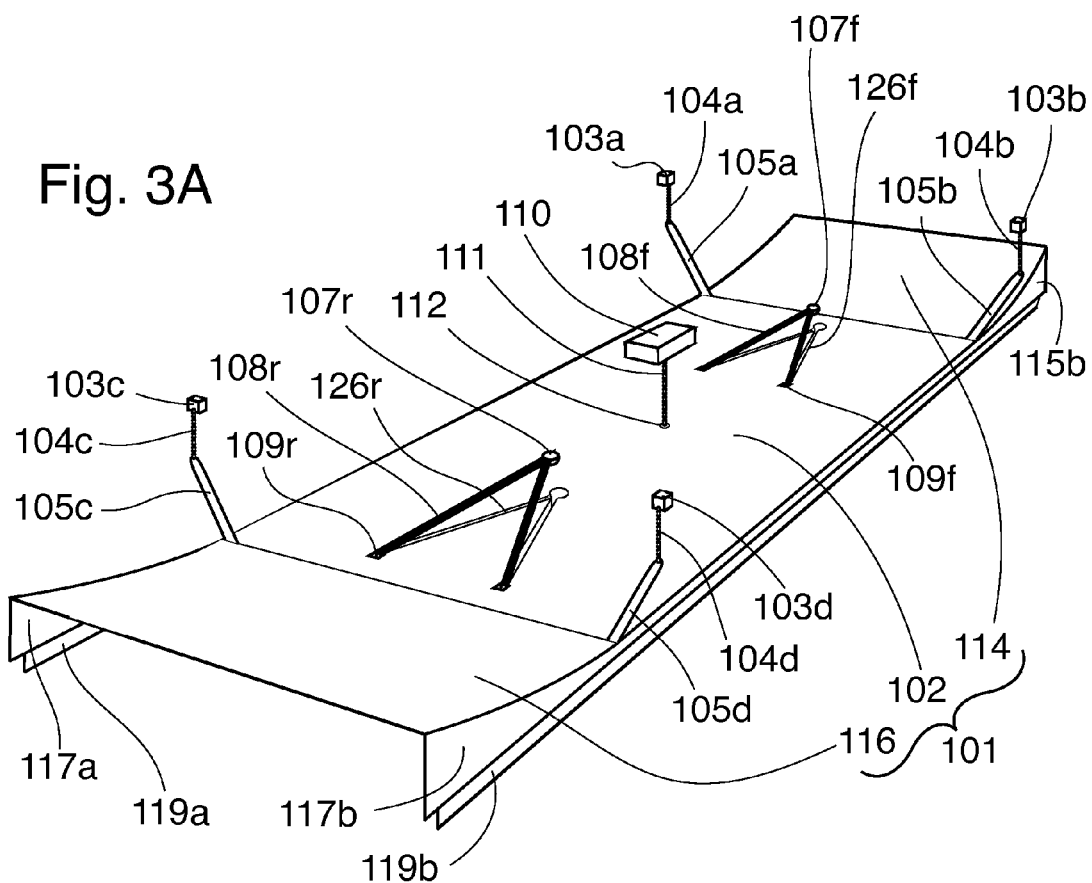
FIG. 3A is a perspective rear three-quarter view of a movable underbody of the basic embodiment of the present invention apart from the rest of the vehicle.

FIG. 3A is a perspective rear three-quarter view of the basic embodiment of a movable underbody 101 in accordance with the present invention, without the body, wheels, and suspension components of the vehicle shown. In addition to the elements illustrated in FIG. 1A and listed above, FIG. 3A shows recesses, front 126f and rear 126r, for the stabilization linkages 108f and 108r in the upper surface of the movable underbody 101 and the divided hinges, front 109f and rear 109r, connecting the stabilization linkages 108f and 108r to the movable underbody 101. In this basic embodiment, the movable underbody 101 is of substantially planar form with a raised inlet 114 and a raised diffuser 116, with the inlet 114 bounded on each side by a vertically-oriented lateral inlet fence, left 115a (shown in FIG. 4A) and right 115b, and the movable underbody diffuser 116 bounded on each side by a vertically-oriented lateral diffuser fence, left 117a and right 117b. Other embodiments of the movable underbody inlet 114 and movable underbody diffuser 116 are disclosed herein and may be used instead. For purposes of clarity, the lateral inlet fences 115a-115b and lateral diffuser fences 117a-117b are not shown in FIGS. 1A and 1B and in other side views of the vehicle. The lateral inlet fences 115a-115b and lateral diffuser fences 117a-117b may also be omitted from the design of a movable underbody.

Figure 30A:
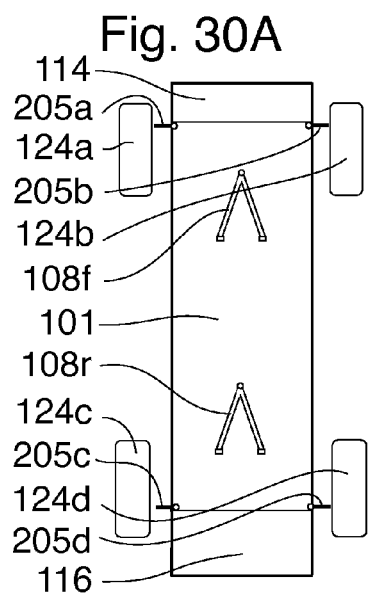

FIG. 30A is a plan view of the basic embodiment of a movable underbody 101 in accordance with the present invention, showing the relative position between the movable underbody 101 and the four wheels 124a-124d of the vehicle. FIG. 4A is a perspective front three-quarter view from below of the basic embodiment of a movable underbody 101 in accordance with the present invention. FIG. 4A shows the movable underbody 101 in its deployed position. This figure also shows the relative position between the movable underbody 101 and four wheels 124a-124d (see FIG. 30A) of the vehicle. FIG. 4B is the same view as FIG. 4A, but with the movable underbody 101 removed to show the mounting hardware connecting the movable underbody 101 to the vehicle. In this basic embodiment, the movable underbody 101 is rectangular and occupies most of the area between the four wheels 124a-124d (see FIG. 30A) of the vehicle. The movable underbody 101 may be constructed from a material that is both light and very stiff, such as honeycomb aluminum or a stressed-skin panel of carbon fiber laminate. Other materials may also be suitable. Other embodiments of the movable underbody 101 are disclosed herein and may be used instead.

Figure 5A:
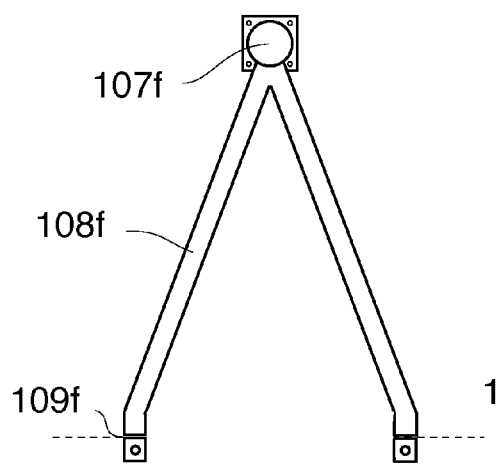
Figure 5B:
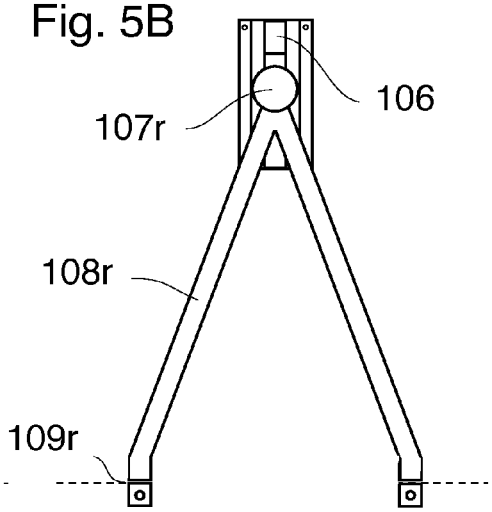
Figure 5C:
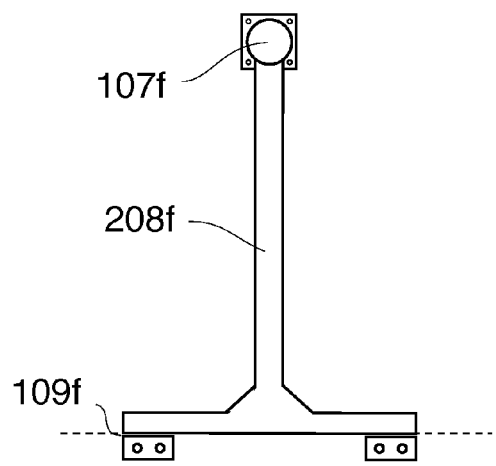
Figure 5D:
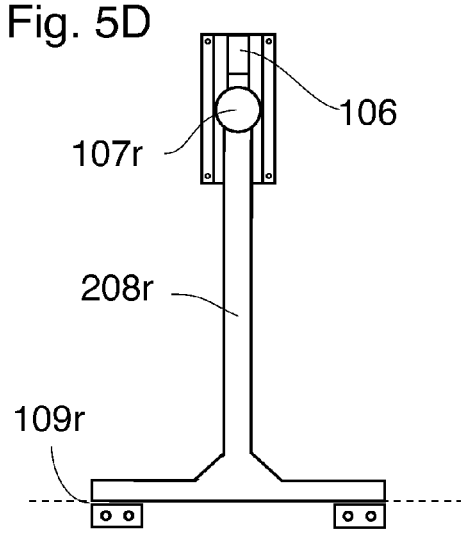

FIGS. 5A and 5B are underside views of the basic embodiment of the front and rear stabilization linkages 108f and 108r in accordance with the present invention. In this embodiment, the stabilization linkages 108f and 108r are V-shaped and equal in size. FIG. 5A shows the front stabilization linkage 108f, which is attached at its front end to a ball joint 107f that articulates directly to the undersurface of the vehicle body 158 (see FIG. 1A). The base of the front stabilization linkage 108f is attached to a divided hinge 109f that articulates through a transverse axis with the movable underbody 101 (see FIG. 1A). FIG. 5B shows the rear stabilization linkage 108r that is attached at its front end to a ball joint 107r that is mounted on a sliding mechanism 106 that attaches to the undersurface of the vehicle body 158 (see FIG. 1A). The base of the rear stabilization linkage 108r is attached to a divided hinge 109r that articulates through a transverse axis with the movable underbody 101 (see FIG. 1A). The stabilization linkages 108f and 108r may be made from any sufficiently rigid, preferably light material, such as aluminum or carbon fiber composite. Other materials may also be suitable. Other embodiments of stabilization linkages, such as those shown in FIGS. 5C and 5D, are discussed hereinbelow and may be used instead.

FIG. 6A is a cross-sectional view in accordance with line 6A-6A of FIG. 6C of a front ball joint 107f in accordance with the present invention. FIG. 6B is an exploded view of the front ball joint 107f in accordance with the present invention. The front ball joint 107f is connected to the front stabilization linkage 108f. The front ball joint 107f includes a ball 127f and socket 128f, and is attached to a mounting plate 129 that attaches to the undersurface of the vehicle body 158 (FIG. 1A). FIG. 6C is a perspective three-quarter front view of the front ball joint 107f and a portion of the front stabilization linkage 108f. FIG. 6D is a cross-sectional view in accordance with line 6D-6D of FIG. 6F of the sliding mechanism 106 and rear ball joint 107r in accordance with the present invention. FIG. 6E is an exploded view of the sliding mechanism 106 and rear ball joint 107r. The sliding mechanism 106 is comprised of a sliding ball base 130 that moves longitudinally within a mounting track 131. The rear ball joint is comprised of a ball 127r attached to the sliding ball base 130, and a socket 128r attached to the front end of the rear stabilization linkage 108r. FIG. 6F is a perspective three-quarter front view of the sliding mechanism 106, ball joint 107r, and a portion of the rear stabilization linkage 108r. Other embodiments of front and rear ball joints and sliding mechanisms are disclosed herein and may be used instead.

FIG. 7A is a rear view of the basic embodiment of a left rear support linkage 104c in accordance with the present invention with associated left rear upper support bracket 103c and left rear lower support bracket 105c. This basic embodiment of the support linkage 104c includes a length of roller chain. The other support linkages of this embodiment, 104a, 104b, and 104d (see FIG. 3A), are identical. Other embodiments of the support linkages are disclosed herein and may be used instead.

FIG. 8A is a side perspective view of the basic embodiment of a left rear upper support bracket 103c mounted to the rear side of the free end of the left rear upper control arm 121c along with the left rear support linkage 104c. FIG. 8B is an exploded view of the same showing how the support linkage 104c may simply link to the upper support bracket 103c using normal roller chain link hardware consisting of a master link 6000, side plate 7000, and retaining clip 8000.

The left and right front upper support brackets 103a and 103b (shown in FIG. 3A), may be positioned on the front upper control arms 121a and 121b (FIG. 1A) opposite to the steering arms of the front suspension uprights. Such a mounting point allows the front support linkages 104a and 104b (FIG. 3A) that hang from the front upper support brackets 103a and 103b (FIG. 3A) to not interfere with the movements of the vehicle's steering arms. Other mounting points and embodiments of the upper support brackets 103a-103d are in accordance with the invention, including those disclosed elsewhere herein, and may be used instead. The upper support brackets 103a-103d may be of a sufficiently strong, durable material, such as chromoly steel. Other materials may be used instead. For secure attachment they may be welded to the upper control arms 121a-121d (FIGS. 1A, 2A, and 12G) or completely integrated into the design of the upper control arms 121a-121d (FIGS. 1A, 2A, and 12G).

FIG. 9A is a side perspective view of the basic embodiment of a right rear lower support bracket 105d in accordance with the present invention and an example of how the bracket may be secured to the movable underbody 101 (FIG. 1A). FIG. 9A also shows how the movable underbody diffuser 116 may be secured to the rear edge of the movable underbody plate 102 through a diffuser mounting bracket 132r. FIG. 9B is a side perspective view of the basic embodiment of a right front lower support bracket 105b in accordance with the present invention. This figure illustrates an example of how the bracket 105b may be secured to the movable underbody plate 102 and how the inlet 114 may be attached to the front edge of the movable underbody plate 102 with an inlet mounting bracket 132f. The rubber bushings 133 that may be included with the lower support bracket mountings provide a slight amount of cushioning to the movable underbody 101 (FIG. 1A) against vehicle suspension vibrations. There are many other ways that such cushioning may be provided including a small spring and damper unit situated between either a) the lower support brackets 105a-105d (FIG. 3A) and corresponding support linkages 104a-104d (FIG. 3A) or b) between the upper support brackets 103a-103d (FIG. 3A) and corresponding support linkages 104a-104d (FIG. 3A). Alternatively, no cushioning may be provided between the movable underbody 101 (FIG. 1A) and suspension system. Other embodiments of the lower support brackets 105a-105d (FIG. 3A) are disclosed herein and may be used instead. The lower support brackets may be constructed from various materials, including a carbon fiber layup or chromoly steel.

Operation—FIGS. 1-2, and 10-13

In its deployed position, as shown in side view in FIG. 1A and rear cross-sectional view in FIG. 2A, the movable underbody 101 is supported below the vehicle body 158 by the four support linkages 104a-104d (FIG. 3A), each of which is connected to a corresponding end of one of the four upper control arms 121a-121d (FIGS. 1A, 2A, 12G) in a vehicle with double wishbone suspension. When deployed, the support linkages 104a-104d (FIG. 3A) are pulled taut by the weight and generated downforce of the movable underbody 101 (FIG. 1A). Because the end of each upper control arm 121a-121d substantially maintains a constant distance above the roadway 199, the movable underbody 101 in its deployed position correspondingly maintains a substantially constant positional relationship with respect to the roadway 199, regardless of the height and orientation of the vehicle body 158 above the roadway 199 (FIG. 10A).

Figure 10A:
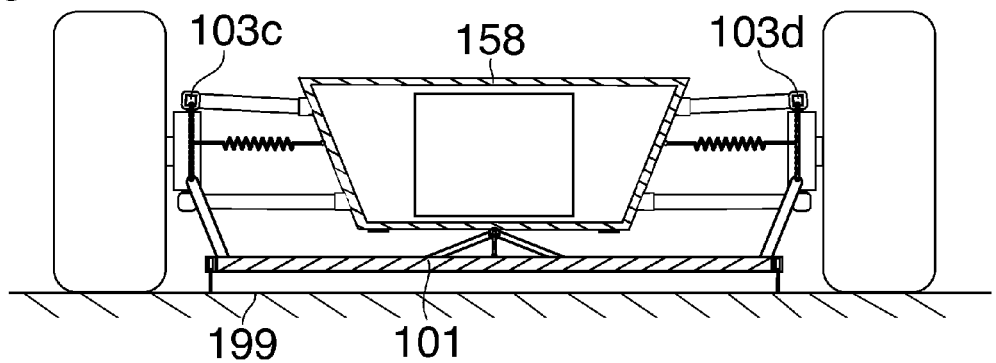
Figure 10B:
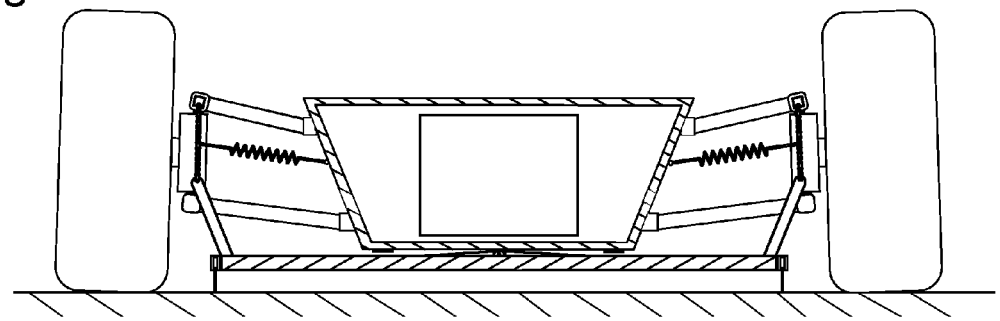
Figure 10C:
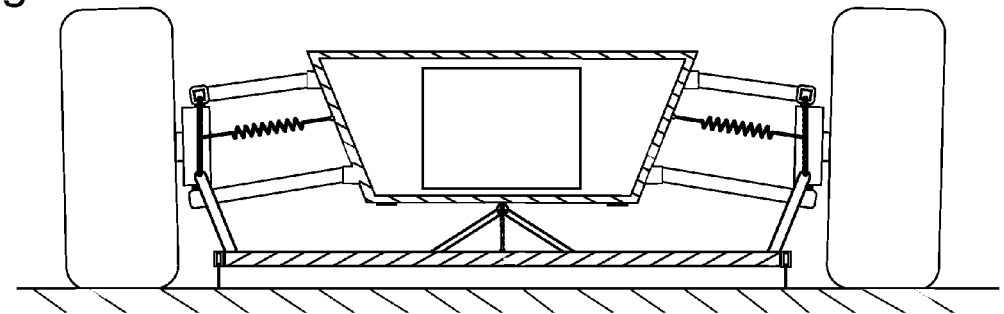
Figure 10D:
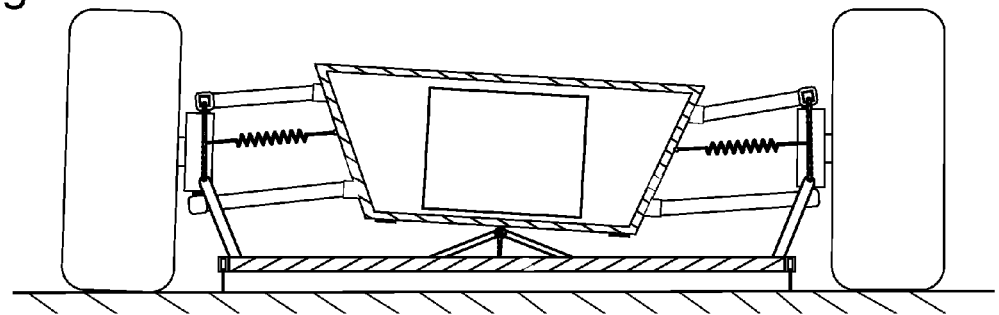

FIGS. 10A-D are cross-sectional views immediately behind the rear wheels of the basic embodiment of a vehicle in accordance with the present invention, in accordance with line 2A-2A of FIG. 1A. FIGS. 10A-C show the vehicle body 158 at normal, lowered, and elevated positions, respectively. As can be seen, there is a constant positional relationship between the movable underbody 101 and roadway 199 in these figures. FIG. 10D shows the vehicle body 158 during body roll. Again, the same positional relationship between the movable underbody 101 and roadway 199 exists here as well. The two stabilization linkages 108f (FIG. 1A) and 108r (FIG. 1A) serve to stabilize the position of the movable underbody 101 throughout its range of motion so that the movable underbody 101 may not swing back and forth from its points of support on the suspension of the vehicle.

FIG. 11A is an elevation view of the basic embodiment of a vehicle in accordance with the present invention with a movable underbody 101 in its deployed position. This figure indicates the path of airflow under the vehicle as the vehicle travels. The movable underbody 101 forms a venturi duct with the roadway 199 when the movable underbody 101 is deployed. As the vehicle travels, the airstream below the movable underbody 101 is accelerated in the narrow venturi throat that is formed by much of the area of the movable underbody 101. This accelerated air exhibits decreased pressure, creating downforce that is applied directly to the ends of the suspension through the support linkages 104a-104d (FIG. 3A). The production of downforce in this way may be termed aerodynamic ground effect. Because this airflow is at least partially isolated from the undersurface of the vehicle body 158 and may be partially isolated from the space surrounding the vehicle suspension and vehicle wheels 124a-124d (FIG. 30A), it may also generate less aerodynamic drag than is generated by the corresponding airflow in a vehicle not equipped with a movable underbody in accordance with the present invention.

The movable underbody 101 is retracted by activation of the retraction actuator 110 (FIG. 1A). When activated, the retraction actuator 110 pulls on the retraction linkage 111 (FIG. 1A) and, through that linkage, lifts the movable underbody 101 to the vehicle body 158. The movable underbody 101 is shown in its retracted position in side view in FIG. 1B and rear cross-sectional view in FIG. 2B. In the retracted position, the movable underbody 101 and stabilization linkages 108f and 108r are folded flat against the undersurface of the vehicle body 158 with the stabilization linkages 108f and 108r (FIG. 1A) recessed within their corresponding stabilization linkage recesses 126f and 126r (FIG. 3A). When in the retracted position, the movable underbody 101 no longer moves with the suspension, but is instead fixed against the undersurface of the vehicle by the retraction linkage 111 and stabilization linkages 108f and 108r (FIG. 1A). Cushioning pads 120 (shown in FIG. 2A) mounted to the undersurface of the vehicle body 158 cushion the movable underbody 101 in its retracted position against the vehicle body 158.

Figure 1B:
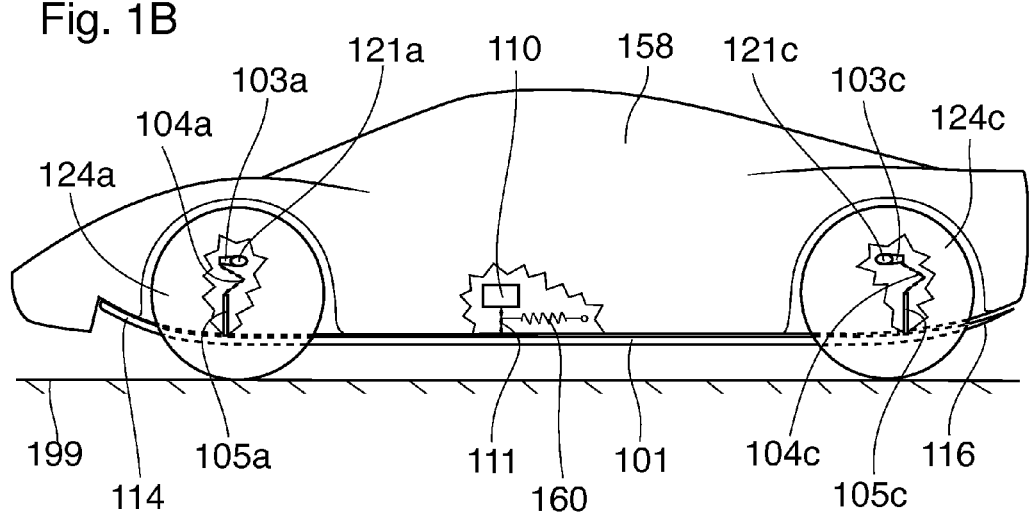

The support linkages 104a-104d (FIG. 3A) serve both to control the orientation of the movable underbody 101 and to support and transfer the vertical load from the movable underbody 101 to the suspension of the vehicle when the movable underbody 101 is deployed. By using roller chain for the support linkages 104a-104d, the linkages may transmit substantial force only through tension. When subjected to a compressive force, a roller chain linkage 104a-104d simply goes slack and becomes unable to transfer substantial force. Any support linkage that is compliant to compression in this way is herein termed a "tensile" support linkage. A tensile support linkage may be adapted to provide some degree of resistance to compression as long as that force of resistance is low enough to allow the movable underbody 101 to be retracted without substantial resistance and to move independently with respect to the vehicle wheels 124a-124d (FIG. 30A). In FIG. 1B, the support linkages, exemplified by 104a and 104c, are shown bent to the rear for illustrative purposes. Similarly, in FIG. 12H the support linkage, exemplified by 104b, is shown bent to the front for illustrative purposes. As shown in FIG. 2B, in the basic embodiment the support linkages are actually pulled toward the center of the vehicle by the support linkage tensioner springs, exemplified by 159c and 159d.

By using tensile support linkages 104a-104d (FIG. 3A), retraction of the movable underbody 101 by a separate retraction means functionally disengages the movable underbody 101 from the suspension by unloading and compressing the four support linkages 104a-104d. When retracted, the movable underbody 101 does not pull down on the suspension and does not influence suspension movements. In contrast, if retraction of the movable underbody 101 were to be achieved by elevation through the support linkages 104a-104d, there would be no functional disengagement of the movable underbody 101 from the vehicle's suspension (see additional embodiments of the retraction means). The ability to both retract and functionally disengage the movable underbody from the vehicle's suspension is a very significant advantage of the present invention over the prior art.

The ability to retract the movable underbody 101 allows ground clearance to be raised when the characteristics of the roadway 199 do not allow for the passage of a low-ground-clearance vehicle. Additionally, the movable underbody 101 may remain retracted when high levels of downforce are not required, as in most everyday driving. For example, deployment of the movable underbody 101 may be reserved for when the vehicle is to be driven at higher speeds on a closed-course racetrack. For regular road travel, the movable underbody 101 may be deployed only when high levels of downforce are needed for purposes of safety, as during emergency braking or for when a loss of vehicle traction is detected, as may occur when the roadway 199 becomes slippery with rain, snow, ice, oil, or other substances that may decrease vehicle traction.

Deployment of the movable underbody 101 is accomplished by reversing the retraction actuator 110 (FIG. 1A), thereby undoing the tension in the retraction linkage 111 (FIG. 1A). When the movable underbody 101 is deployed, slack in the retraction linkage 111 (FIG. 1A) is taken up by the retraction linkage tensioner spring 160 (FIG. 1A). Upon deployment, the movable underbody 101 comes to rest upon the support linkages 104a-104d (FIG. 3A), functionally reengaging the movable underbody 101 with the suspension. The force of gravity and aerodynamic forces may deploy the movable underbody 101 into its deployed position. An actuator system may also be included to push the movable underbody 101 into its deployed position and to potentially transfer load from the vehicle body 158 to the movable underbody 101.

Using tensile support linkages 104a-104d, the mass of the movable underbody 101 and associated structures is not fixed to the unsprung mass of the vehicle. This benefits vehicle handling because it allows the suspension to more rapidly adjust to irregularities in the roadway 199. The use of tensile support linkages 104a-104d also has the benefit in that it makes the movable underbody 101 compliant upon impact with the roadway 199 or objects thereon.

FIGS. 12A-I are elevation views of the right side of the front of three different vehicles as they travel over a depression in the roadway 199 (FIG. 10A). Typically, such depressions are merely slight negative undulations in the roadway 199 (FIG. 10A). FIGS. 12A-C show a vehicle that is not fitted with a movable underbody. FIGS. 12D-F show a vehicle that is fitted with a movable underbody 101 supported by an incompressible support linkage 604b (see FIG. 7I and additional embodiments of the support linkages below). FIGS. 12G-I show a vehicle that is fitted with the basic embodiment of the present invention that includes a movable underbody 101 supported by a tensile support linkage 104b.

As shown in FIG. 12H, when a wheel 124b (FIG. 12G) of a vehicle fitted with a movable underbody 101 supported by tensile support linkages, as exemplified by 104b (FIG. 12G), travels over a depression in the roadway 199, the wheel (front right wheel 124b shown) may drop to contact the surface of that depression without simultaneously dropping the movable underbody 101. This is because a tensile support linkage, as exemplified by 104b, is only capable of transmitting a downward pull from the movable underbody 101 to the vehicle suspension. That is, such a linkage arrangement cannot apply a compressive force to the vehicle suspension. As a result, the downward movement of the wheel 124b is unhindered by the mass and aerodynamic resistance of the movable underbody 101. This decoupling leads to greater contact between the wheel 124b (FIG. 12G) and the roadway 199 compared with the movement of a wheel 124b (FIG. 12G) of a vehicle fitted with a movable underbody 101 that is supported by a rigid, incompressible support linkage, exemplified by 604b (FIG. 12D). As shown in FIG. 12E, when such a wheel travels over a depression, the mass and vertical air resistance of the movable underbody 101 resist the downward movement of the wheel 124b (FIG. 12D), leading to less contact between the wheel 124b and the roadway 199. A physical separation between the wheel 124b and roadway 199 is shown in FIG. 12E for illustrative purposes. Under normal conditions, the wheel 124b is merely unweighted as the vehicle travels over depressions on the roadway 199. The point is that the wheel 124b of a vehicle equipped with a movable underbody 101 supported by freely—compressible support linkages 104a-104d (FIG. 3A) experiences less unweighting than the wheel 124b of a vehicle equipped with a movable underbody 101 supported by rigid support linkages, exemplified by 604b (FIG. 12D), traveling over the same depression.

Returning attention to the vehicle fitted with the tensile support linkage 104b, when the vehicle suspension subsequently compresses after the depression is passed, as shown in FIG. 12I, the movable underbody 101, through its connection to the suspension via the tensile support linkage 104b, helps to suppress excessive wheel jounce. This contrasts with a vehicle that is not fitted with a movable underbody 101 supported from the vehicle's suspension, such as shown in FIG. 12C. In FIG. 12C, the wheel 124b loses contact with the roadway due to excessive wheel jounce. While a physical separation between the wheel 124b and the roadway 199 is shown in FIG. 12C, the wheel 124b would normally be merely unweighted as the vehicle travels past a depression in the roadway 199. The point is that the wheel 124b of a vehicle equipped with a movable underbody 101 supported by tensile support linkages 104a-104d experiences less unweighting than the wheel 124b of a vehicle without a movable underbody.

The resistance to upward movement of the wheel 124b mentioned above is a consequence of more than simply the downforce generated aerodynamically by the movable underbody 101. It is also a consequence of the inertia of the movable underbody 101 and, importantly, the physical resistance of the system to changes in the separation distance between the movable underbody 101 and the roadway 199 (FIG. 10A) (i.e. the ride height of the movable underbody). Changes in this separation distance translate to changes in the volume of air between the movable underbody 101 and the roadway 199. When the movable underbody 101 moves away from the roadway 199 there is an increase in that volume of air, which forces air to rush in from the perimeter of the movable underbody 101. In a sense, the movable underbody 101 acts like an expansive diaphragm resisting changes in ride height from the roadway 199. Given the time scale associated with most suspension movements and the low ride height at which the movable underbody 101 may be supported, the airflow from the perimeter of the movable underbody 101 is severely limited, particularly airflow entering from the sides of the movable underbody 101 when sliding 119a-119b (FIG. 2A) or hinged aerodynamic skirts 219a-219b (FIGS. 33C and 34A) are employed. In particular, hinged aerodynamic skirts allow air to escape from under the movable underbody 101, but prevent air from entering that space. The result is that the force generated by the movable underbody 101 that resists an upward movement of the movable underbody 101 above its set ride height is greater than the sum of its inertia and the aerodynamic downforce generated by the structure. This means that, while the wheels of the vehicle may move downward without resistance to contact the roadway 199, there is considerable resistance generated against an upward movement away from the roadway 199. The wheels of the vehicle are effectively sandwiched between the roadway 199 below and the movable underbody 101 above. The advantage for a vehicle equipped in accordance with the basic embodiment of the present invention over the other vehicles shown in FIGS. 12A-F is increased contact between the tires and roadway 199 during vehicle travel. This increase in what is termed "mechanical grip" is in addition to the increased "aerodynamic grip" brought about by the generated downforce of the ground effect movable underbody 101 and is a further, significant advantage of the present invention over the prior art. Additionally, because upward movement of the wheels above the roadway 199 is counteracted by the movable underbody 101, there is less road bumpiness and vibration transmitted through the vehicle's suspension to the vehicle body 158, resulting in a somewhat smoother ride for the occupants of the vehicle when the movable underbody 101 is deployed.

The front and rear stabilization linkages 108f and 108r (FIG. 1A) serve to limit the movable underbody 101 to a single path of movement. For any given vertical position and orientation about a horizontal axis, the two stabilization linkages 108f and 108r fix the movable underbody 101 in terms of its longitudinal and lateral positions, as well as prevent rotation of the movable underbody 101 about a vertical axis (yaw). More specifically, longitudinal movements of the movable underbody 101 are prevented by the front stabilization linkage 108f because that linkage is connected to the vehicle body 158 at a fixed point, unlike the rear stabilization linkage 108r that connects to the vehicle body 158 through a sliding mechanism 106 (FIG. 1A). Lateral movements of the movable underbody 101 are prevented by the strength of the front and rear stabilization linkages 108f and 108r, in addition to the strength of the corresponding stabilization hinges 109f and 109r (FIG. 3A). Rotation of the movable underbody 101 about a vertical axis (yaw) is prevented by the physical separation between the two stabilization linkages 108f and 108r. The rear stabilization linkage 108r primarily serves to prevent such rotation of the movable underbody 101 about a vertical axis.

FIGS. 13A and 13B are elevation views of the basic embodiment of a vehicle in accordance with the present invention. FIG. 13C is a cross-sectional view immediately behind the rear wheels of the basic embodiment of a vehicle, in accordance with line 2A-2A of FIG. 1A. The degrees of freedom of movement of the movable underbody 101 relative to the vehicle body 158 are shown. While the stabilization linkages 108f and 108r fix the movement of the movable underbody 101, as described above, they allow the movable underbody 101 to move freely in several ways. As shown in FIG. 13A, the articulations (ball joints 107f and 107r shown, hinges 109f and 109r (FIG. 3A)) of the stabilization linkages 108f and 108r allow the movable underbody 101 to be raised and lowered relative to the vehicle body 158. This allows the movable underbody 101 to conform to changes in vehicle ride height (heave) during travel. This vertical movement is not perfectly linear, but describes a shallow curve with a radius equal to the length of the front stabilization linkage 108f because that linkage is not attached to a sliding mechanism. The absence of a sliding mechanism in the front is different from the configuration in the rear. Specifically, the rear stabilization linkage 108r is attached to sliding mechanism 106. As shown in FIG. 13B, the sliding mechanism 106 and articulations (ball joints 107f and 107r shown, hinges 109f and 109r shown in FIG. 3A) of the stabilization linkages 108f and 108r allow the movable underbody 101 to rotate about a transverse axis relative to the vehicle body 158. This allows the movable underbody 101 to conform to changes in vehicle pitch during travel. As shown in FIG. 13C, the ball joints 107f and 107r connected to the stabilization linkages 108f and 108r allow the movable underbody 101 to rotate about a longitudinal axis relative to the vehicle body 158. This allows the movable underbody 101 to conform to changes in vehicle roll during travel. The combination of these separate freedoms of movement (heave, pitch, and roll) allows the movable underbody 101 to follow any change in the positional relationship between the vehicle body 158 and roadway 199 during vehicle travel.

Additional Embodiments

Additional embodiments of certain components are described below.

FIGS. 5C-D, 14-16—Additional Embodiments of the Stabilization Linkages

FIGS. 5C-D are underside views of a first additional embodiment of the front and rear stabilization linkages in accordance with the present invention. These stabilization linkages, front 208f and rear 208r, are T-shaped rather than V-shaped. Both linkages are attached to an apical ball joint, front 107f and rear 107r, and a basal hinge, front 109f and rear 109r, the same as described for the basic embodiment. The ball joint 107r attached to the rear stabilization linkage 208r is coupled with a sliding mechanism 106 like that described for the basic embodiment. Both T-shaped 208f and 208r and V-shaped 108f and 108r (FIGS. 5A and 5B) stabilization linkages allow for a comparatively wide hinge articulation with the movable underbody 101 (FIG. 1A) that helps resist the horizontal loads caused by the acceleration, deceleration, and lateral acceleration of the vehicle. The stabilization linkages may be of other sizes and shapes and of unequal size and shape without departing from the present invention.

The front and rear stabilization linkages 108f and 108r (FIGS. 5A and 5B) of the basic embodiment and first additional embodiment 208f and 208r described above extend rearward and downward from their attachment points on the vehicle body 158 (FIG. 1A) to attach across the midline of the movable underbody 101. With this arrangement, the movable underbody 101 moves up and away relative to the vehicle body 158 upon forward impact with the roadway 199 (FIG. 10A) or objects thereon. It is also possible for the stabilization linkages to be mounted such that they extend forward from the vehicle body 158 to the movable underbody 101.

Figure 3B:
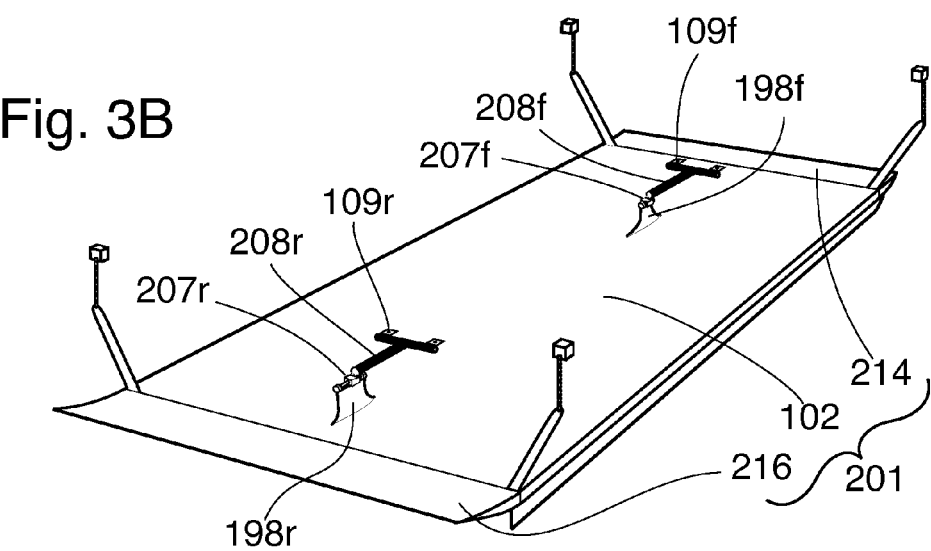
FIG. 3B is a perspective rear three-quarter view of a movable underbody of an additional embodiment of the present invention apart from the rest of the vehicle.

There are other arrangements of stabilization linkages that will achieve a similar result of substantially fixing the horizontal position of the movable underbody 101 (FIG. 1A) while allowing the movable underbody 101 to freely move vertically and orient about any horizontal axis. A single linkage may be used, but this arrangement does not well resist rotation of the movable underbody 101 about a vertical axis. More than two linkages may be used if they are aligned or nearly so. The linkages may also be located away from the midline of the movable underbody 101, even upon the base of the suspension, and aligned along other than a longitudinal axis. None of these variants, however, is as simple or effective as those of the embodiments described above. Additionally, the linkages may be reversed in orientation so that the stabilization hinges 109f and 109r are mounted on the vehicle body 158 (FIG. 1A) and the ball joints 107f and 107r mounted on the vehicle underbody 101. FIG. 3B shows this latter arrangement using T-shaped stabilization linkages 208f and 208r.

In addition to the various possible shapes and arrangements of simple stabilization linkages just discussed, additional, but somewhat more complex linkage embodiments in accordance with the present invention are illustrated in FIGS. 14-16. FIG. 14A is an elevation view of a front telescoping stabilization linkage 308f and movable underbody 101. The front telescoping stabilization linkage 308f is shown in its fully retracted position and attached to the movable underbody 101. The linkage consists of a front cylinder 134f that slidingly accommodates a front piston 135f. The front piston 135f is attached to a front ball joint 107f, as described for the preferred stabilization linkage embodiment, comprising a front ball 127f that articulates with a front socket 128f. The front socket 128f is attached within the movable underbody 101.

FIG. 14B shows a transverse cross-sectional view of a vertically oriented rear telescoping stabilization linkage 308r taken along line 14B-14B of FIG. 14E. The rear telescoping stabilization linkage 308r is shown in partially extended position. The linkage comprises a front cylinder 134r that slidingly accommodates a rear piston 135r. The front and rear pistons 135f (FIG. 14A) and 135r (FIG. 14B) include appropriately sized air holes on their upper surfaces (not shown) to allow air to freely move within the telescoping stabilization linkages 308f (FIG. 14A) and 308r (FIG. 14B). The rear piston 135r is attached to a rear ball joint 107r, as described for the preferred stabilization linkage embodiment, comprising a rear ball 127r that articulates with a rear socket 128r. The rear socket 128r is connected to a sliding mechanism 106 as described for the preferred sliding mechanism embodiment, comprising a ball base 130 that slides longitudinally within a mounting track 131. The sliding mechanism 106 is attached within the movable underbody 101. FIG. 16A is an elevation view of the left side of a vehicle fitted with a movable underbody 101 and telescoping stabilization linkages 308f and 308r.

FIGS. 14C-E are elevation views of the rear telescoping stabilization linkage 308r showing the freedoms of movement of the movable underbody 101. FIG. 14C shows rotation of the movable underbody 101 about a transverse axis. FIG. 14D shows elevation and depression of the movable underbody 101. FIG. 14E shows fore-and-aft motion of the movable underbody 101. Rotation of the movable underbody 101 about a longitudinal axis (not shown) is the same as shown in FIG. 14C, but as seen from frontal view. With respect to the front telescoping stabilization linkage 308f, the freedoms of movement of the movable underbody 101 are the same, except that there is no fore-and-aft freedom of movement.

FIGS. 15A-E show front and rear stabilization linkages of a pantographic design in accordance with the present invention. FIG. 15A is an elevation view and FIG. 15C is a perspective three-quarter view of a front pantographic stabilization linkage 408f in an extended position. The front pantographic stabilization linkage 408f comprises a front base plate 136f and front ball plate 137f connected by two sets of front folding support rods 138f. One end of each front folding support rod is articulated through a front support rod hinge 139f to either the front base plate 136f or front ball plate 137f while the other end of each front folding support rod is attached to either the base plate or ball plate through a front support rod slider 140f. The front ball plate 137f is attached to a front ball joint 107f (FIG. 1A) as described for the basic embodiment with the ball 127f of the front ball joint 107f (FIG. 1A) shown in FIGS. 15A-C and the ball 127r of the rear ball joint 107r (FIG. 1A) shown in FIGS. 15D-E. FIG. 15B is an elevation view of a front pantographic stabilization linkage 408f in its fully elevated position. FIG. 15D is an elevation view and FIG. 15E a front view of a rear pantographic stabilization linkage 408r in an extended position. The rear pantographic stabilization linkage 408r includes equivalent components to those described for the front pantographic stabilization linkage 408f, viz. rear base plate 136r, rear ball plate 137r, rear folding support rods 138r, rear support rod hinges 139r, and rear support rod sliders 140r, interconnected in the same way as described above for the pantographic front stabilization linkage 408f. The rear ball plate 137r of the rear pantographic stabilization linkage 408r is attached to a sliding mechanism 106 as described with reference to the above-disclosed basic embodiment comprising a mounting track 131 and sliding ball base 130. The sliding ball base 130 is attached to a rear ball joint 107r (FIG. 1A) as described for the basic embodiment with the ball 127r of the rear ball joint 107r (FIG. 1A) shown in FIGS. 15D-E. Alternatively, the ball 127r of the rear ball joint 107r (FIG. 1A) may be directly attached to the rear ball plate 137r and the sliding mechanism 106 attached to the movable underbody 101, as described above for the rear telescoping stabilization linkage 308r (FIG. 14B).

FIG. 16B is an elevation view of the left side of a vehicle fitted with a movable underbody 101 and pantographic stabilization linkages, 408f and 408r.

Stabilization linkages of both telescoping and pantographic design allow the movable underbody 101 to have a linear, vertical path of movement.

The foregoing disclosure of stabilization linkage embodiments and alternative arrangements should be read as illustrative of stabilization linkage means only and should not be construed as limiting. It is possible, though not desirable, to eliminate the stabilization linkage means altogether from a design of a movable underbody device in accordance with the present invention. Without such a stabilization linkage means, however, the movable underbody 101 will tend to swing from its support linkage attachment points on the vehicle's suspension. It is possible to design an alternative system for stabilizing the horizontal position of the movable underbody 101 that involves components extending between the suspension system and the movable underbody 101. Such an alternative stabilization system would, however, tend to increase the unsprung mass of the vehicle.

FIGS. 17-18—Additional Embodiments of the Stabilization Linkage Ball Joints and Sliding Mechanism In any embodiment of the front or rear stabilization linkages, the ball joint 107f (FIG. 1A) or 107r (FIG. 1A) may be reversed so that the ball 127f (FIG. 6A) or 127r (FIG. 6E) is on the end of the stabilization linkage, rather than the socket 128f (FIG. 6A) or 128r (FIG. 6E). Likewise, in any embodiment of a front or rear stabilization linkage, the orientation of the stabilization linkages may be reversed so that the hinge 109f (FIG. 3A) or 109r (FIG. 3A) and ball joint 107f or 107r on the ends of the stabilization linkages are correspondingly reversed. That is, the hinges 109f and 109r may be located on the vehicle body 158 (FIG. 1A) and the ball joints 107f and 107r located on the movable underbody 101, as shown in FIG. 3B. Switching the orientations of the stabilization linkages, and thus the articulations, results only in a minor difference in the geometry of the movement of the movable underbody 101. Additionally, the sliding mechanism 106 may be positioned at the base of either ball joint 107f or 107r or, much less optimally, at the base of either hinge 109f or 109r if the hinge is made narrow enough. Rod end couplings and similar coupling devices are functionally equivalent to ball joints.

FIGS. 17A and 17C are perspective front three-quarter views from below of a universal joint 207f in accordance with the present invention. In the context of the presently disclosed subject matter, a universal joint of this type is functionally equivalent to a ball joint. The front universal joint 207f is connected to the end of the front stabilization linkage 108f. FIG. 17B is an exploded view of the front universal joint 207f, which comprises a front universal joint base 141f that bears a front first bracket 142f and front second bracket 143f that between them support a front support rod 144f. On the front support rod 144f articulates a front spider 145f that is free to rotate about a longitudinal axis relative to the base of the front universal joint 141f. On the front spider 145f is a transversely oriented front hinge 146f connected to the front end of the front stabilization linkage 108f. The front hinge allows the front stabilization linkage 108f to rotate about a transverse axis relative to the front spider 145f. FIG. 17C shows these freedoms of movement of the front stabilization linkage 108f relative to the front universal joint base 141f. These freedoms of movement are rotation through a transverse axis between front spider 145f and the end of the front stabilization linkage 108f and rotation through a longitudinal axis between the front spider 145f and the base of the front universal joint 141f. These two axes of rotation allow the front stabilization linkage 108f to assume any position required so that the movable underbody 101 may conform to any position of the roadway 199 (FIG. 10A) relative to the vehicle body 158 (FIG. 1A).

FIGS. 18A-B are perspective front three-quarter views from below of a universal joint 207r in accordance with the present invention. For purposes of the presently disclosed subject matter, a universal joint of this type is functionally equivalent to a ball joint mounted on a sliding mechanism. This rear universal joint with integral slider 207r is connected to the front end of the rear stabilization linkage 108r. As shown in FIG. 18A, the rear universal joint with integral slider 207r comprises a rear universal joint base 141r, a rear first bracket 142r and rear second bracket 143r between which is connected a rear support rod 144r. On the rear support rod 144r articulates a rear spider 145r that is free to rotate about a longitudinal axis and to move back-and-forth longitudinally along the rear support rod 144r relative to the rear universal joint base 141r. On the rear spider 145r is a transversely oriented rear hinge 146r connected to the front end of the rear stabilization linkage 108r. The rear universal joint with integral slider 207r is identical to the front universal joint 207f (FIG. 17A) except that the separation between the first and second brackets 142r and 143r is greater and the rear support rod 144r is longer. This allows the rear spider 145r to move back-and-forth longitudinally relative to the rear universal joint base 141r, as shown in FIG. 18B.

FIG. 3B is a perspective rear three-quarter view of a movable underbody with minimal inlet and diffuser 201 (see additional embodiments of the movable underbody below) with a front universal joint 207f and rear universal joint with integral slider 207r mounted on pylons 198f and 198r, and with T-shaped stabilization linkages 208f and 208r in reversed orientation.

There are other arrangements that will perform the same function as the sliding mechanisms herein described. For example, a stabilization linkage, such as 208r, may incorporate a telescoping section at some point along its length or a stabilization linkage may be composed of a pair of arms that may articulate about a transverse axis. Both these alternatives effectively include the function of a sliding mechanism in the structure of a stabilization linkage.

In accordance with the spirit and scope of the present invention, the foregoing disclosure of ball joint embodiments, universal joint embodiments, and sliding mechanism embodiments should be read as illustrative and should not be construed as limiting the invention to these specific devices.

FIGS. 7B-I and 8F-G—Additional Embodiments of the Support Linkages

FIGS. 7B-H show additional embodiments of tensile support linkages in accordance with the present invention. FIG. 7B shows a cable support linkage, exemplified by 204c (the corresponding cable support linkages of the other three corners are identical), and FIG. 7C shows a Kevlar webbing support linkage, exemplified by 304c (the corresponding Kevlar webbing support linkages of the other three corners are identical). Both cable support linkages, such as 204c, and Kevlar webbing support linkages, such as 304c, may be attached along their lengths to a thin flat spring adapted to bend the support linkages toward the vehicle body 158 when not under tensile load so that support linkage tensioner springs, exemplified by 159c-159d (FIG. 2A), are not required. Kevlar webbing support linkages, exemplified by 304c, may be light, extremely strong for their weight, and resistant to breakage. Of course, Kevlar rope may also be used for this purpose. FIG. 8F is an exploded view of a left rear upper support bracket 103c (FIG. 3A) mounted on a left rear upper control arm 121c (FIG. 2A) and a cable support linkage 204c showing how the cable support linkage 204c may be secured to the upper support bracket 103c using a pivot bolt 5000. The same system may be used to attach the lower end of the cable support linkage 204c to the lower support bracket 105c (FIG. 3A). FIG. 8G shows a perspective left side view of the apical end of the left rear upper control arm 121c (FIG. 2A) and upper support bracket 103c (FIG. 3A) attached to a Kevlar webbing support linkage 304c using a large pivot bolt 5010.

FIG. 7D is a perspective view and FIG. 7E is a frontal view of an additional embodiment of a tensile support linkage, exemplified by 404c, comprising an articulating pair of arms. This articulating support linkage 404c (the corresponding articulating support linkages of the other three corners are identical) comprises an upper arm 147c and lower arm 148c. The lower arm 148c bears a stop 149c that prevents full extension of the articulating pair of arms 404c so that the linkage will fold consistently and always in the same direction. FIG. 7E shows the extended and compressed positions of the articulating support linkage 404c. FIG. 7F is an elevation view of a fully-extended telescoping support linkage, exemplified by 504c, with a frontal cross-sectional view of the same shown in FIG. 7G taken along the line 7G-7G in FIG. 7F, and a frontal view of the same in fully-compressed conformation shown in FIG. 7H. This telescoping support linkage, exemplified by 504c (the corresponding telescoping support linkages of the other three corners are identical), comprises an outer cylinder 150c and an inner piston 151c. The lower end of the piston 151c bears appropriately-sized air holes to allow air to move within the telescoping support linkage 504c.

Support linkages that are composed of articulating pairs of arms, such as 404c, or telescoping rods, such as 504c, may be articulated to the upper support brackets 103a-103d and lower support brackets 105a-105d through rod-end bearings 152. This will impart the necessary freedom of movement to allow the support linkages to freely align with axial forces between the upper support brackets 103a-103d and lower support brackets 105a-105d. A pivot bolt of appropriate size may be used to attach support linkage embodiments that include rod end bearings 152 to the upper support brackets 103a-103d (FIG. 3A). A pivot bolt may also be used to attach the lower end of support linkage embodiments that include a rod end bearing 152 to the lower support brackets 105a-105d. Rod-end bearings 152 are generally not necessary when using support linkages composed of roller chain 104a-104d (FIG. 3A), cable, exemplified by 204c, and Kevlar webbing, exemplified by 304c, because of the inherent flexibility of such linkages. With any of these embodiments, more than a single support linkage may be used at each corner area of the vehicle to provide a failsafe should a support linkage break.

FIGS. 8F-G show a portion of the left rear support linkage of two embodiments and how these linkage embodiments may be attached to the left rear upper support bracket 103c. The means of attachment are identical for the support linkages at the other corners of the vehicle to the corresponding upper support brackets not shown (103a-103b and 103d, shown in FIG. 3A). These support linkages may all be fastened to the upper support brackets 103a-103d (FIG. 3A) with pivot bolts of various dimensions.

All of the above listed support linkage embodiments may exhibit sufficient tensile strength and the ability to be freely compressed in length. They represent just some examples of tensile support linkage systems. Tensile support linkages that provide a degree of resistance to compression (through the use of integral springs, for example) are also possible. The foregoing disclosure of tensile support linkage systems should be read as illustrative and should not be construed as limiting.

FIG. 7I shows a rigid support linkage, exemplified by 604c (the corresponding rigid support linkages of the other three corners are identical). The ends of rigid support linkages, exemplified by 604c, may be attached to the upper support brackets 103a-103d (FIG. 3A) and lower support brackets 105a-105d (FIG. 3A) through rod-end bearings 152 and appropriately-sized pivot bolts to allow the linkage to align with axial forces between the movable underbody 101 and attachment point on the vehicle's suspension. The rigid support linkages, exemplified by 604c, do not, in themselves, allow the movable underbody 101 (FIG. 1A) to be retracted and disengaged from the suspension through elevation of the movable underbody 101. If rigid support linkages, exemplified by 604c, are to be used and if the movable underbody 101 is to be made retractable and capable of being disengaged from the suspension, then alternative systems to disengage the movable underbody 101 from the suspension must be provided. Effectively rigid support linkages that allow compression under comparatively high compressive loads are also possible. Indeed, a continuum of support linkage embodiments is possible, from perfectly rigid to freely compressible. It is also possible to use support linkage embodiments capable of a degree of extension under load.

All of the foregoing examples of support linkage embodiments described should be read as illustrative of support linkage systems only and not construed as limiting. As discussed below under additional embodiments of the lower support brackets, it is possible to eliminate the support linkage system from a design of a movable underbody device that is still in accordance with the present invention. Without such a support linkage system, the movable underbody 101 (FIG. 1A) is supported from the vehicle's suspension by directly opposing the lower and upper support brackets (see below).

FIGS. 8C-E, 22-23, 24A, 25, 26A, 27—Additional Embodiments of the Upper Support Brackets The upper support brackets 103a-103d (FIG. 3A) may be attached as near to the apical ends of the suspension as possible. This may be at or near the ends of either the upper control arms 121a-121d (FIG. 1A, 2A, 12G) or lower control arms, exemplified by 122c-122d (FIG. 2A), in vehicles fitted with double-wishbone suspension systems. In vehicles fitted with a McPherson/Chapman strut suspension system the bracket may be situated at or near the end of the control arm. It is also possible to mount the upper support brackets 103a-103d on the suspension uprights, exemplified by 123c-123d (FIG. 2A), taking into account that the front suspension uprights rotate with the vehicle's steering movements. Regardless of suspension type, however, any portion of the vehicle's suspension that reciprocates to some degree with the corresponding wheel 124a-124d (FIG. 30A) may potentially serve as a mounting point for the corresponding upper support bracket 103a-103d.

As previously noted and shown in FIGS. 10A-D, the movable underbody 101 moves substantially with the roadway 199 (FIG. 10A) relative to the vehicle body 158 when the upper support brackets 103a-103d (FIG. 3A) are mounted at or near the apical ends of the suspension control arms. The vertical load generated by the movable underbody 101 is also substantially applied directly to the unsprung portions of the vehicle's suspension and therefore more directly to the vehicle wheels 124a-124d (FIG. 30A). If more basal positions on the suspension control arms are chosen for the mounting points of the upper support brackets 103a-103d (or positions on other portions of the vehicle's suspension that reciprocate less perfectly with the corresponding vehicle wheels 124a-124d than the ends of the suspension control arms), the movable underbody 101 (FIG. 1A) will move more substantially relative to the roadway 199 with the vehicle's suspension movements. The vertical load generated by the movable underbody 101 will also be less directly applied to the unsprung components of the vehicle's suspension and thus less directly to the vehicle wheels 124a-124d. Mounting the upper support brackets 103a-103d more basally on the upper control arms 121a-121d (FIGS. 1A, 2A, and 12G) or lower control arms, exemplified by 122c-122d (FIG. 2A) (or on other portions of the vehicle's suspension that reciprocate less perfectly with the corresponding wheels 124A-124D than the ends of the suspension control arms), at least has the benefit of making the movable underbody 101 maintain a more constant distance and orientation above the roadway being traversed than maintained by the vehicle body 158.

FIG. 26 is a perspective side view of the left rear upper control arm 121c with an additional embodiment of the upper support bracket consisting of a basal upper support bracket with bellcrank 903c. The purpose of this additional embodiment of the upper support bracket is to allow the movable underbody 101 to move more substantially in unison with the vehicle wheels 124a-124d while, at the same time, mounting the upper support brackets, exemplified by 903c, away from the ends of the upper control arms, exemplified by 121c. The same would apply for corresponding mounting positions on the lower control arms, exemplified by 122c, and the control arms of Chapman/McPherson strut suspension systems.

The basal upper support bracket with bellcrank, exemplified by 903c, consists of a crank 177c, attached and articulated to a mounting bracket 178c, with a pivot bolt 170c. The basal upper support bracket with bellcrank, exemplified by 903c, is attached to a pushrod 179c, that is itself attached to a pushrod mount 180c, attached at an appropriate point on the vehicle body 158 between the upper control arm 121c, and lower control arm 122c. The basal end of the pushrod, exemplified by 179c, is secured to the pushrod mount 180c, by a clevis, while the apical end of the pushrod 179c, is attached by a clevis to the lower end of the crank 177c. The upper, medial end of the crank, exemplified by 177c, is attached to the upper end of the support linkage 104c, the lower end of which attaches to a medially situated lower support bracket 805c. When the upper control arm, exemplified by 121c, moves upward as part of the vehicle's suspension movements, the pushrod 179c, pulls on the crank 177c, causing the crank 177c to rotate such that the inner end of the crank is elevated above the point of attachment between the crank 177c, and upper control arm 121c. This compensates for the reduced movement of the upper attachment point of the support linkage, exemplified by 104c, at this more basal position on the upper control arm 121c. If the linkage were to be attached directly to a simple upper support bracket 103c at this position, movement of the upper attachment point of the support linkage, and thus movement of the movable underbody 101 relative to the vehicle body 158, would be noticeably less than the movement of the vehicle wheels 124a-124d relative to the vehicle body 158. Such an arrangement, while still in accordance with the present invention, is typically less ideal than mounting the upper support brackets nearer the end of the suspension, as described for the basic embodiment.

Figure 27A:
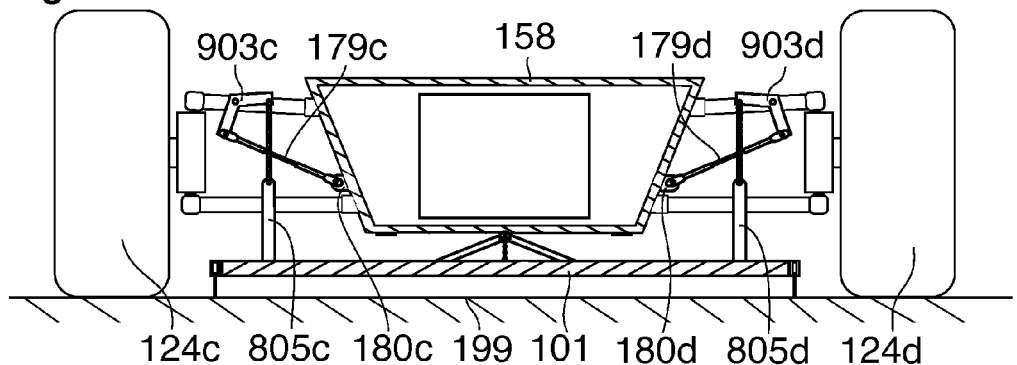
Figure 27B:
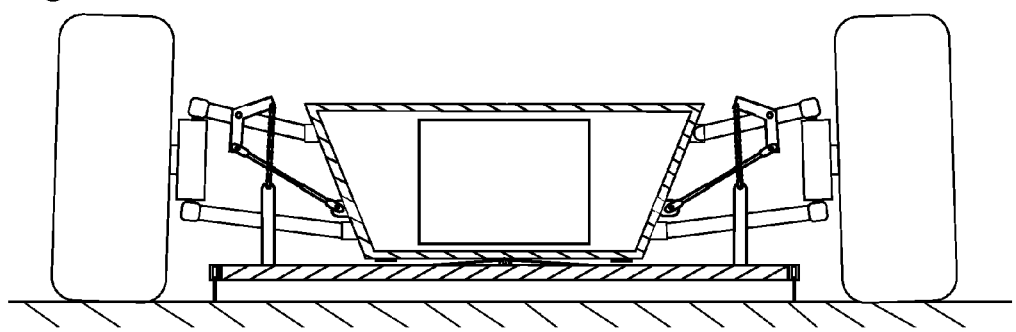
Figure 27C:
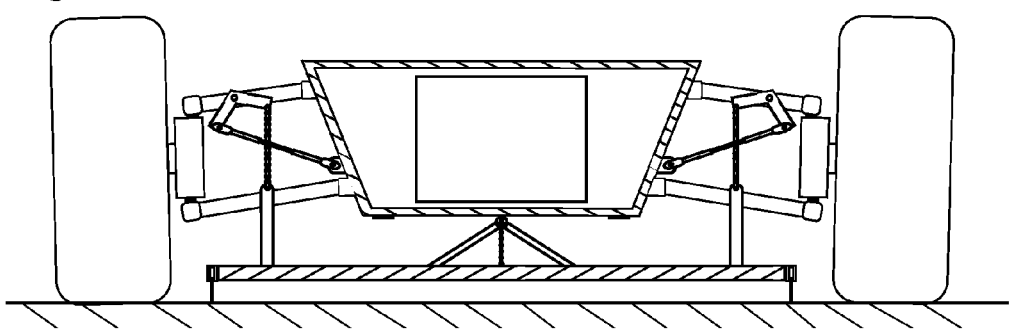
Figure 27D:
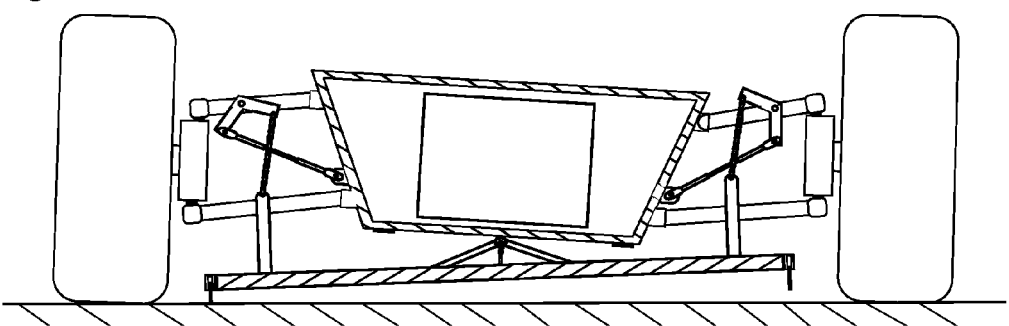

FIGS. 27A-D are rear cross-sectional views immediately behind the rear wheels 124c-124d of a vehicle equipped with basal upper support brackets with bellcrank, exemplified by 903c-903d, in accordance with the present invention. Also shown in FIGS. 27A-D are the corresponding pushrods, exemplified by 179c-179d, pushrod mounts, exemplified by 180c-180d, and medially-situated lower support brackets, exemplified by 805c-805d. The direction of sight in these Figures is in accordance with the direction of sight indicated by cross-sectional line 2A-2A of FIG. 1A. As shown in FIGS. 27A-C, the movable underbody 101 moves correctly when right and left suspension components move together, as when the vehicle heaves or pitches. However, it does not position the movable underbody 101 correctly when the vehicle rolls, as shown in FIG. 27D. To maintain a near constant positional relationship between the movable underbody 101 and roadway 199 for all orientations of the vehicle body 158 relative to the roadway 199, a simple solution is to mount the upper support brackets 103a-103d near the apical free ends of the vehicle's upper control arms 121a-121d (as in the basic embodiment), lower control arms, exemplified by 122c-122d, or suspension uprights, exemplified by 123c-123d (FIG. 2A).

Several additional embodiments of an upper support bracket are now described. FIG. 8C is a perspective side view and FIG. 8D is an exploded view of the left rear upper control arm 121c with an alternative embodiment to a simple upper support bracket in accordance with the present invention. In this embodiment, the upper support bracket incorporates a bellcrank mechanism. The upper support bracket with bellcrank, exemplified by 603c, redirects the tension from the support linkage, exemplified by 104c, via a pushrod, exemplified by 166c, to a movable underbody height-adjustment actuator, exemplified by 167c, mounted at the base of the suspension. The bellcrank mechanism, exemplified by 603c, comprises a mounting bracket 168c, crank 169c, and crank mounting bolt 170c. The purpose of this arrangement is to allow the ride height of the movable underbody 101 (FIG. 1A) to be adjusted by height-adjustment actuators, exemplified by 167c, (see below) while driving. The height-adjustment actuators, exemplified by 167c, may be mounted toward the base of the vehicle's suspension as shown or, alternatively, within the vehicle body 158 (FIG. 1A). If the height-adjustment actuators, exemplified by 167c, are to be mounted within the vehicle body 158, the pushrods, one of which is exemplified by 166c, should attach to the corresponding height-adjustment actuators, exemplified by 167c, or a bellcrank arrangement (or similar) attached thereto, at a point along the axis of rotation of the upper control arms 121a-121d (FIGS. 1A, 2A, and 12G) with the vehicle body 158. This ensures that there is no significant movement of the pushrods caused by suspension movements. The same is true if elongate cable, exemplified by 804c (FIG. 22B) or elongate roller chain support linkages, one of which his exemplified by 704c (FIG. 22A), are used. That is, the basal portion of each cable or roller chain support linkage should pass through a point along the axis of rotation of the upper control arms 121a-121d with the vehicle body 158. This may be accomplished through use of an appropriate sprocket for an elongate roller chain support linkage, exemplified by 704c, or an appropriate pulley for an elongate cable support linkage, exemplified by 804c. The height-adjustment actuators, exemplified by 167c, may be of various types, including, for example, electric, pneumatic, or hydraulic actuators and be of sufficient strength to deal with the vertical loads generated by the movable underbody 101.

Between the pushrods (e.g., 166c) and movable underbody height-adjustment actuators, exemplified by 167c, may be placed downforce-measuring strain gauges, one of which is exemplified by 171c in FIG. 8E. The downforce-measuring strain gauges, exemplified by 171c, are used to measure the load on the support linkages 104a-104d (FIG. 3A). Because the support linkages 104a-104d are vertically oriented (or nearly so), the amount of load measured by the downforce-measuring strain gauges, exemplified by 171c, gives close to a direct measure of downforce generated by the movable underbody 101. This is because horizontal loads imparted by the movable underbody 101 to the rest of the vehicle are dealt with by the stabilization linkages 108f and 108r (FIG. 1A). Further, because the support linkages 104a-104d are situated toward the corner areas of the movable underbody 101, differences in measured load between the four downforce-measuring strain gauges may give a direct measure of the downforce distribution, front-to-rear and side-to-side, that is generated by the movable underbody 101. The ability to directly measure downforce load and the distribution of that load to the four wheels 124a-124d (FIG. 30A) is an advantage of the present invention over the prior art.

Using a computer processor, microcontroller, analog circuitry, or the like ("computer processor") the measured loads at each of the four wheels 124a-124d (FIG. 30A), along with position and motion data from the vehicle's suspension, if desired, may be used to estimate instantaneous tire adhesion levels at each wheel 124a-124d while driving. These estimated tire adhesion or grip levels may then be compared by the computer processor with the horizontal loads sensed by a two-axis accelerometer sensor. The difference between instantaneous horizontal loads and instantaneous grip levels may then be output to the driver through appropriate visual or auditory output systems, such as lights, display screens, and/or speakers. When horizontal loads approach or exceed estimated grip levels, for example, a warning signal may be conveyed to the driver.

FIG. 22A is a rear view of the left rear suspension of a vehicle with an alternative embodiment for redirecting the tension of a roller chain support linkage to the base of the vehicle's suspension, in accordance with the present invention. The direction of sight in FIG. 22A is in accordance with the direction of sight indicated by cross-sectional line 2A-2A of FIG. 1A. This embodiment comprises an upper support bracket with sprocket, exemplified by 703c, that supports and redirects the tension of an elongated roller chain support linkage, exemplified by 704c, to a basally-mounted movable underbody height-adjustment actuator, exemplified by 167c. FIG. 22B shows a comparable mechanism for use with an elongated cable support linkage, exemplified by 804c, comprising an upper support bracket with pulley, exemplified by 803c, that supports and redirects the tension of an elongated cable support linkage, exemplified by 804c, to a basally-mounted movable underbody height-adjustment actuator, exemplified by 167c. The direction of sight in FIG. 22B is in accordance with the direction of sight indicated by cross-sectional line 2A-2A of FIG. 1A.

Mounting the movable underbody height-adjustment actuators, exemplified by 167c (FIG. 8E), and/or downforce-measuring strain gauges, exemplified by 171c (FIG. 8E), basally on the suspension provides more room for these components than if such components were to be mounted more apically on the vehicle's suspension. A basal mounting position on the vehicle's suspension also separates these components from the most severe suspension vibrations at the end of the control arms and from the heat generated by the vehicle's brakes. Additionally, when mounted basally on the vehicle's suspension or on the vehicle body 158, the mass of the movable underbody height-adjustment actuators, exemplified by 167c, and downforce-measuring strain gauges (e.g., 171c) contributes less to the unsprung mass of the vehicle. Less unsprung mass generally benefits vehicle handling.

The ride height and orientation of the movable underbody 101 (FIG. 1A) may be changed while driving by using the four movable underbody height-adjustment actuators, exemplified by 167c (FIG. 8C). The movable underbody 101 may be raised and lowered by all four movable underbody height-adjustment actuators, exemplified by 167c, working in unison to either lift or lower the corresponding support linkages 104a-104d (FIG. 3A). If the height-adjustment actuators, exemplified by 167c, are adapted to produce sufficient throw, they may substantially lift the movable underbody 101 to the vehicle body 158 (FIG. 1A) and thus serve to retract the movable underbody 101 without disengaging the structure from the vehicle's suspension (see additional embodiments of the retraction means, below). Change in the fore-and-aft pitch or left-and-right roll of the movable underbody 101 may be accomplished through the differential lowering and raising of the appropriate support linkages 104a-104d by the movable underbody height-adjustment actuators, exemplified by 167c. For example, the movable underbody 101 may be pitched forward by lowering the two front support linkages 104a and 104b, and raising the two rear support linkages 104c and 104d. All of the appropriate inputs to the movable underbody height-adjustment actuators, exemplified by 167c, may be coordinated by a computer processor to translate inputs from the driver and/or from one or more sensors. Such sensors may include, for example, the downforce-measuring strain gauges, exemplified by 171c (FIG. 8E), and a body-mounted two-axis accelerometer sensor 172 (FIG. 24A). The ability to readily change the ride height and orientation of the movable underbody 101 while driving is enabled by the novel suspension-mounted support means of the movable underbody 101 of the basic embodiment of the present invention. Further, it is an advantage of the present invention over the prior art.

FIG. 24A is a block diagram of an example of a movable underbody height-adjustment control means in accordance with the present invention. In this example, the four movable underbody height-adjustment actuators 167a-167d are controlled by a movable underbody height-adjustment electronic control unit ("ECU") 173 that is responsive to a driver-operated movable underbody height-adjustment on/off switch 174, a body-mounted two-axis accelerometer sensor 172, a movable underbody position sensor 175, and suspension position sensors 176a-176d at each corner of the vehicle.

The foregoing movable underbody height-adjustment control means is just one example of possible movable underbody height-adjustment means pursuant to the present invention. The potential uses of such a movable underbody height-adjustment control means are now described.

In its deployed position, the movable underbody 101 (FIG. 1A) may be set below the vehicle body 158 (FIG. 1A) at its lowest position at maximal vehicle suspension compression or jounce. This ensures that the vehicle body 158 will not impact the movable underbody 101 during the vehicle's suspension movements. With a movable underbody height-adjustment control means like that described above, however, the movable underbody 101 may be set at a higher position and the movable underbody height-adjustment control means programmed to lower the movable underbody 101 when the vehicle body 158 would otherwise contact the movable underbody 101 during suspension compression. The movable underbody height-adjustment control means may then restore the normal movable underbody 101 position as the vehicle suspension reassumes a less compressed state. Imminent contact between the vehicle body 158 and the movable underbody 101 may be calculated by the movable underbody height-adjustment ECU 173 (FIG. 24A) using input from the suspension position sensors 176a-176d (FIG. 24A). Alternatively or additionally, portions of the movable underbody 101 may be made from flexible material to accommodate contact with portions of the vehicle body 158 or suspension components such as the lower control arms exemplified by 122c and 122d (FIG. 2A).

Because the movable underbody 101 (FIG. 1A) works in ground effect, its ride height and orientation relative to the roadway 199 (FIG. 1A) may have a significant effect on overall levels of generated downforce. These parameters may be varied to select a particular downforce level at a given time. On a closed-course racetrack, for example, a high-downforce configuration may be selected during a turn or in a braking zone, and a low-downforce configuration selected while on a straight. A high-downforce configuration might, for example, be characterized by a slightly pitched forward, comparatively low movable underbody 101 ride height. On the other hand, a low-downforce configuration might, for example, be characterized by a markedly pitched rearward, comparatively high movable underbody 101 ride height. The movable underbody height-adjustment control means described above may use input from the two-axis accelerometer sensor 172 (FIG. 24A) to determine the downforce configuration required at any particular time. Variation in movable underbody ride height and orientation may be combined with changes to the angle of an adjustable underbody diffuser and/or adjustable inlet for enhanced aerodynamic effect (see additional movable underbody embodiments below).

In addition to affecting the overall level of downforce generated by the movable underbody 101 (FIG. 1A), a change in movable underbody orientation relative to the roadway 199 (FIG. 1A) may shift the center of aerodynamic pressure generated by the movable underbody 101, and thus downforce, forward or back. FIGS. 23A-C are elevation views of the left side of a vehicle in accordance with the present invention. These figures show the effect of changes in the orientation of the movable underbody 101 to the distribution of downforce to the front and rear wheels ($F_f$ and $F_r$). A slightly pitched-forward movable underbody orientation tends to apply more downforce to the front wheels 124a-124b (FIG. 23B, $F_f$), while a slightly pitched-rearward movable underbody orientation tends to apply more downforce to the rear wheels 124c-124d (FIG. 23C, $F_r$) when compared with a more neutral movable underbody orientation (FIG. 23A). This effect may be used to change the distribution of downforce between the front wheels 124a-124b (FIG. 30A) and rear wheels 124c-124d (FIG. 30A) to best match downforce requirements during different vehicle maneuvers, such as vehicle braking, accelerating, or turning. Shifting downforce load to the rear wheels 124c-124d, for example, is desirable during braking because it counteracts the natural forward shift in weight that occurs at that time and leads to a more equal distribution in tire grip. Side-to-side changes in movable underbody orientation may be used to counter differential tire compression during a turn.

With a movable underbody height-adjustment control means, such as described above, the height and orientation of the movable underbody 101 (FIG. 1A) may be automatically adjusted to a preset, low-downforce configuration. This might occur, for example, when input from a two-axis accelerometer sensor 172 (FIG. 24A) is below a certain preset level, indicating that the vehicle is not experiencing high accelerative forces. When input from the two-axis accelerometer sensor 172 exceeds that preset level, the height and orientation of the movable underbody 101 may be adjusted to a preset, high-downforce configuration. Further, when accelerative forces exceed such a preset level, the direction of acceleration may be used to determine whether the movable underbody is to be adjusted to one of: a) a neutral configuration, b) a configuration with downforce biased to the front wheels 124a-124b (FIG. 30A), or c) a configuration with downforce biased to the rear wheels 124c-124d (FIG. 30A). In this example of a movable underbody height-adjustment control means, the driver may override the movable underbody height-adjustment by turning the system off with the driver-operated on/off switch 174 (FIG. 24A). Of course, a more complex system may be designed. Such a system might give the driver direct control of overall generated downforce levels and the distribution of that downforce to the front and rear wheels, while driving. This is comparable to how many race cars are fitted with a mechanism that allows the driver to continuously vary the brake bias between the front and rear wheels during driving.

FIG. 25 is a flowchart of an example of a process that may be performed by a movable underbody height-adjustment ECU 173 (FIG. 24A) to produce the functions described in the preceding paragraph. The first step in the process, Step 1000, is detecting the movable underbody position through input from the movable underbody position sensor 175 (FIG. 24A) to the movable underbody height-adjustment ECU 173 (FIG. 24A). The process then proceeds to Step 1001 where the position of the movable underbody 101 (FIG. 1A), as detected in Step 1000, is used to determine if a series of steps will be performed. If the movable underbody 101 is deployed then a series of steps beginning with Step 1002 is performed. On the other hand, if the movable underbody is not deployed, then the process proceeds back to Step 1000, which is described above. The purpose of Step 1000 and Step 1001 is simply to ensure that the movable underbody height-adjustment control means may be activated only when the movable underbody 101 is deployed.

In Step 1002 the position of the driver-operated height-adjustment control means on/off switch 174 (FIG. 24A) is detected through input to the movable underbody height-adjustment ECU 173 (FIG. 24A). The process then proceeds to Step 1003 where the switch position detected in Step 1002 is used to determine which further steps will be performed. If the switch is detected to be in the on position, then the process proceeds to Step 1004. Otherwise, the process proceeds back to Step 1000, which is described above.

In Step 1004 the absolute acceleration level is detected through input to the movable underbody height-adjustment ECU 173 (FIG. 24A) from the two-axis accelerometer sensor 172 (FIG. 24A). The absolute acceleration level may be categorized as a) not exceeding a preset threshold level stored in the movable underbody height-adjustment ECU 173 or b) exceeding that preset threshold level. The process then proceeds to Step 1005. In Step 1005, the result from Step 1004 is used to determine which further steps will be performed. If the absolute acceleration level does not exceed the preset threshold level, then the process proceeds to Step 1006. On the other hand, if the absolute acceleration level exceeds the preset threshold level, then the process proceeds to Step 1007.

In Step 1006, the movable underbody 101 (FIG. 1A) is positioned in a preprogrammed low-downforce configuration using preprogrammed positional data stored in the movable underbody height-adjustment ECU 173 (FIG. 24A) for each of the four movable underbody height-adjustment actuators 167a-167d (FIG. 24A). The process then proceeds back to Step 1000, which is described above.

In Step 1007, the direction of acceleration is detected through input to the movable underbody height-adjustment ECU 173 (FIG. 24A) from the two-axis accelerometer sensor 172 (FIG. 24A). The direction of acceleration may be categorized as a) being within a preset threshold of rearward acceleration, b) being within a preset threshold of forward acceleration, or c) not being within either the rearward or forward acceleration thresholds. The process then proceeds to Step 1008, where the direction of acceleration, as detected in Step 1007, is used to determine which further steps will be performed. If the direction of acceleration is categorized as being within the preset threshold of rearward acceleration (i.e. hard braking), then the process proceeds to Step 1009. Otherwise, the process proceeds to Step 1010.

In Step 1009, the movable underbody 101 (FIG. 1A) is positioned in a preprogrammed high-downforce, rearward bias configuration using preprogrammed positional data stored in the movable underbody height-adjustment ECU 173 (FIG. 24A) for each of the four movable underbody height-adjustment actuators 167a-167d (FIG. 24A). The process then proceeds back to Step 1000, which is described above.

In Step 1010, the direction of acceleration as detected in Step 1007 is used to determine which further steps will be performed. If the direction of acceleration is categorized as being within the preset threshold of forward acceleration, then the process proceeds to Step 1011. Otherwise, the process proceeds to Step 1012.

In Step 1011, the movable underbody 101 (FIG. 1A) is positioned in a preprogrammed high-downforce, forward bias configuration using preprogrammed positional data stored in the movable underbody height-adjustment ECU 173 (FIG. 24A) for each of the four movable underbody height-adjustment actuators 167a-167d (FIG. 24A). The process then proceeds back to Step 1000, which is described above.

In Step 1012, the movable underbody 101 (FIG. 1A) is positioned in a preprogrammed high-downforce, neutral configuration using preprogrammed positional data stored in the movable underbody height-adjustment ECU 173 (FIG. 24A) for each of the four movable underbody height-adjustment actuators 167a-167d (FIG. 24A). The process then proceeds back to Step 1000, which is described above.

FIGS. 19B-E, 20-21—Additional Embodiments of the Lower Support Brackets

FIGS. 19B-D show a left rear adjustable lower support bracket 205c that is in accordance with the present invention. The adjustable lower support brackets in the three other corner areas of the vehicle are identical to that shown for the left rear corner area. FIG. 19C is a rear perspective view of the left rear adjustable lower support bracket 205c, while FIG. 19B is a cross-sectional view, in accordance with line 19B-19B of FIG. 19C, and FIG. 19D is an exploded view of the same bracket. The left rear adjustable lower support bracket 205c comprises an inner bracket piece 153c that may slide up and down within an outer bracket piece 154c. The two pieces of the adjustable lower support bracket are held together with an adjustment bolt 156c, along with a spring 155c and washer 157c. The vertical length of the adjustable lower support bracket, exemplified by 205c, is finely adjustable from below by turning the adjustment bolt 156c, moving the inner bracket piece 153c up and down within the outer bracket piece 154c. This mechanism allows for precise control of the ride height and orientation of the movable underbody 101 (FIG. 1A) from an easily accessed location. The adjustment bolt 156c may be unscrewed completely to free the outer bracket piece 154c from the inner bracket piece 153c, thereby separating the left rear corner of the movable underbody 101 from the suspension of the vehicle. This process may be repeated in the three other corners to remove the movable underbody 101 from the vehicle's suspension system. To remove the movable underbody 101 completely from the vehicle, it is necessary to also unbolt the mounting plate of the front ball joint 129 (FIG. 4B), unbolt the mounting track of the sliding mechanism 131 (FIG. 4B), and disconnect the fitting 112 (FIG. 1A) that holds the retraction linkage 111 (FIG. 1A). These three structures are accessed through three small access panels on the movable underbody 101 (see additional embodiments of the movable underbody).

FIG. 19E shows an adjustable left rear lower support bracket 305c that is in accordance with the present invention and that is of substantially the same design as the adjustable lower support bracket 205c (FIG. 19C) described above. The difference, however, is that this lower support bracket embodiment 305c bears at the top of the inner bracket piece 253c an attachment point for one of the retraction linkages 211c (see additional retraction means embodiments below). Also shown in FIG. 19E is the outer bracket piece 254c and left rear support linkage 104c.

The lower support brackets may be of other shapes and designs than as described above. As shown in FIG. 21B, the support linkages exemplified by 104c, may alternatively mount directly to the movable underbody 101 via minimal fittings, exemplified by 705c, in accordance with the present invention. The view in FIG. 21B is in accordance with line 2A-2A of FIG. 1A.

FIGS. 20A-B are rear views of an alternative embodiment of a lower support bracket 405c of the left rear corner of the vehicle, in accordance with the present invention. This alternative embodiment does not attach to a support linkage 104c (FIG. 2A). When the movable underbody 101 is deployed, this left rear free lower support bracket 405c rests directly upon a left rear free upper support bracket 203c attached at or near the end of the left rear lower control arm 122c of the vehicle's suspension, with no intervening support linkage 104c. This provides an alternative mechanism for supporting the movable underbody 101, based upon a normal force acting between the upper and lower support brackets, not a tensile force. FIG. 20A shows the left rear free lower support bracket 405c in direct contact with the left rear free upper support bracket 203c on the left rear lower control arm 122c. This is the relative position of the free support brackets when the movable underbody 101 is deployed and engaged with the suspension. FIG. 20B shows the left rear free lower support bracket 405c elevated above the left rear free upper support bracket 203c. This is the relative position of the free support brackets when the movable underbody 101 is retracted. FIG. 21A shows the same in perspective left side view. Contact between the left rear free lower support bracket 405c and left rear free upper support bracket 203c is through the opposing load-bearing surface of the left rear free lower support bracket 161c and load-bearing surface of the left rear free upper support bracket 162c. The free lower support brackets are of the same form in the other three corner areas of the vehicle, as are the corresponding free upper support brackets of the other three corner areas of the vehicle.

The upper and/or lower load bearing surfaces, exemplified by 161c (FIG. 21A) and/or 162c (FIG. 21A), may be alternatively connected to the rest of the upper and/or lower free support brackets, exemplified by 203c (FIG. 21A) and/or 405c (FIG. 21A), through very compact shock-damping mechanisms. Such compact shock-damping mechanisms may include a spring and damper to absorb some suspension movements that would otherwise be directly transmitted to the movable underbody 101 (FIG. 1A). It is also possible to mount the load-bearing surface of the upper support bracket, exemplified by 162c, (less optimally the load-bearing surface of the lower support bracket, exemplified by 161c) on the end of a compact actuator, particularly a hydraulic actuator, to enable changes in the height of the load-bearing surface. This, in turn, would cause corresponding changes to the ride height and/or orientation of the movable underbody 101 during vehicle travel.

Like the use of tensile support linkages, the arrangement described above allows for the elevation and disengagement of the movable underbody 101 from the suspension.

FIG. 20C is a rear view, FIG. 21C is a perspective side view, and FIG. 21D is an exploded view of an additional embodiment of the left rear lower support bracket, in accordance with the present invention. In this embodiment, the left rear lower support bracket 505c bears a roller bearing that helps accommodate positional changes between the left rear free lower support bracket with roller 505c and corresponding left rear free upper support bracket for roller 303c that occur during the vehicle's suspension movements. This left rear free lower support bracket with roller 505c includes a left rear bearing wheel fork 163c (FIG. 21D), a left rear bearing axle 164c (FIG. 21D), and a left rear bearing wheel 165c (FIG. 21D) that may be of metal or other strong, hard material. The free lower support brackets with roller are of the same form in the other three corner areas of the vehicle as are the corresponding free upper support brackets for roller of the other three corner areas of the vehicle. As with the upper and lower free support brackets, exemplified by 203c (FIG. 21A) and 405c (FIG. 21A), a compact shock-damping mechanism may be incorporated as part of the design of a free lower support bracket with roller, exemplified by 505c (FIG. 21C), and/or free upper support bracket for roller, exemplified by 303c (FIG. 21C). The position of the bearing surface of the free upper support bracket for roller, exemplified by 303c, may also be made adjustable by use of an actuator, particularly a hydraulic actuator, to change the ride height and/or orientation of the movable underbody 101 (FIG. 1A) during travel.

FIG. 20E shows a rear view of a left rear free lower support bracket for upper control arm 605c and left rear free upper support bracket for upper control arm 403c that are in accordance with the present invention. FIG. 20E shows the left rear free lower support bracket for upper control arm 605c and left rear free upper support bracket for upper control arm 403c coupled as they are when the movable underbody 101 is deployed. The elongate form of both brackets is required when the distal portion of the upper control arm of the vehicle's suspension is used for a mounting point for a free upper support bracket. FIG. 20F is a rear view of the left rear free lower support bracket for upper control arm 605c decoupled from the left rear free upper support bracket for upper control arm 403c. FIG. 21E is the same in perspective side view. The free lower support brackets for upper control arm are of the same form in the other three corner areas of the vehicle as are the corresponding free upper support brackets for upper control arm of the other three corner areas of the vehicle.

In the rear of the vehicle, the rear free upper support brackets may be placed at some location on the suspension uprights 123c-123d (FIG. 2A) instead of the end of the lower control arms 122c and 122d (FIG. 2A). FIG. 20D shows this latter arrangement with a left rear upright-mounted free upper support bracket 503c supporting a left rear free lower support bracket with roller 505c. The right rear upright-mounted free upper support bracket and right rear free lower support bracket with roller are of the same form. Because the front suspension uprights swivel with the steering movements of the vehicle, they are not as suitable for attachment points for free support brackets. If done, such an upright-mounted free upper support bracket may be mounted as close as practical to the steering axis of the corresponding front suspension upright.

It is possible to support the movable underbody 101 (FIG. 1A) from the vehicle's suspension without a discrete support bracket. This can be done by directly resting a part of the lower support bracket, or even just a portion of the movable underbody itself, on part of the vehicle's suspension.

The foregoing disclosure of the suspension-mounted support means embodiments, viz. upper support bracket embodiments, lower support bracket embodiments, and support linkage embodiments, should be read as illustrative of suspension-mounted support means only and should not be construed as limiting. Any functioning combination of support linkage embodiment, upper support bracket embodiment, and lower support bracket embodiment, including those embodiments where the support linkage is absent and/or an upper and/or a lower support bracket is minimized or absent, that may support the movable underbody from the vehicle's suspension, represents a suspension-mounted support means for the movable underbody that is in accordance with the present invention.

FIGS. 19E, 24B, 28A, 29—Additional Embodiments of the Retraction Means

Like the support linkages 104a-104d (FIG. 3A), the retraction linkage 111 (FIG. 1A) may be formed of chains, cables, Kevlar webbing, or the like, working in tension to lift the movable underbody 101 (FIG. 1A) to the undersurface of the vehicle body 158 (FIG. 1A). Such retraction linkage embodiments are in accordance with the present invention. Use of such a tensile retraction linkage allows the movable underbody 101 to move vertically without restriction when the movable underbody 101 is deployed. A manually operated crank may be used instead of a retraction actuator 110 (FIG. 1A) to retract the movable underbody 101.

FIG. 28A shows an additional embodiment of the movable underbody retraction means in accordance with the present invention. This embodiment includes four retraction actuators 210a-210d that attach to four corresponding retraction linkages 211a-211d that extend to the four corner areas of the movable underbody 101. The four retraction linkages 211a-211d attach to the same lower support brackets 305a-305d to which the support linkages 104a-104d attach (see FIG. 19E and additional embodiments of the lower support brackets above). The four retraction linkages 211a-211d are tensioned by four corresponding tensioner springs 260a-260d that extend to attachment points on the vehicle body 158. The purpose of this arrangement over the use of a single retraction linkage 111 (FIG. 1A) and retraction actuator 110 (FIG. 1A), as in the basic embodiment, is to allow control over the orientation of the movable underbody 101 during the processes of retraction and deployment of the movable underbody 101. Many other arrangements involving more than a single retraction actuator are possible. A retraction actuator or actuators may alternatively operate to lift the movable underbody 101 to the body of the vehicle 158 (FIG. 1A) by operating through one or both of the stabilization linkages 108f or 108r (FIG. 1A). If the stabilization linkages 108f and 108r of the basic embodiment are used for this purpose, for example, the stabilization linkages 108f and 108r may be reversed so that the hinged end of each stabilization linkage is mounted to the vehicle body 158. This arrangement more easily allows for a control horn that extends into the vehicle body 158 to be attached to the base of either stabilization linkage 108f or 108r for operation by a retraction actuator.

Retraction of the movable underbody 101 (FIG. 1A) may be alternatively accomplished through use of a vacuum pump. Such a retraction means would require a sufficiently loose-fitting airtight shroud to span the gap between the movable underbody 101 and vehicle body 158 (FIG. 1A) and to enclose a portion of the upper surface of the movable underbody 101 and lower surface of the vehicle body 158. Retraction of the movable underbody 101 would be accomplished through operation of the vacuum pump to evacuate the volume of air enclosed by the shroud. Deployment of the movable underbody 101 would be accomplished through reverse operation of the vacuum pump to partially fill the volume of air that may be enclosed by the shroud.

A retraction means may also be additionally designed to partially unweight the movable underbody 101 (FIG. 1A) rather than lift the movable underbody 101 to the vehicle body 158 (FIG. 1A). This allows some of the downforce load generated by the movable underbody 101 to be transferred from the ends of the vehicle suspension to the vehicle body 158. A retraction means may also be designed to transfer load from the vehicle body 158 to the movable underbody 101.

Retraction of the movable underbody 101 (FIG. 1A) to the vehicle body 158 (FIG. 1A) may be alternatively accomplished through the movable underbody height-adjustment actuators, exemplified by 167c (FIG. 8C), operating to elevate the lower support brackets 105a-105d (FIG. 3A) to the upper support brackets 103a-103d (FIG. 3A) through elevation of the support linkages 104a-104d (FIG. 3A). Unlike the previously mentioned movable underbody retraction means, however, there is no disengagement of the movable underbody 101 from the suspension of the vehicle. This means that the movable underbody 101 will continue to move with the wheels 124a-124d (FIG. 30A) of the vehicle when in the retracted position. Such a movable underbody retraction means is discussed above as additional embodiments of the upper support brackets.

The preceding descriptions of retraction means are examples only and should not be understood as limiting. Other embodiments of the retraction means in accordance with the spirit and scope of the present invention are possible.

In alternative embodiments of the invention, the retraction means may be made operable by a retraction control means that may be incorporated as part of the vehicle's electronic stability control system. FIG. 24B is a block diagram of an example of a retraction control means. In this example, the retraction actuator 110 is a servo motor controlled by a movable underbody retraction ECU (Electronic Control Unit) 184 that is responsive to the vehicle electronic stability control system 185, driver-operated retraction switch 186, movable underbody position sensor 175, and suspension position sensors 176a-176d at the four corners of the vehicle. The suspension position sensors may be linear potentiometers, for example, that extend from the vehicle body 158 (FIG. 1A) to distal positions on the lower control arms, exemplified by 122c-122d (FIG. 2A), of the suspension. This is just one example of a retraction control means in accordance with the present invention. In other embodiments, a retraction control means could be responsive to just the vehicle electronic stability control system 185, the driver-operated retraction switch 186, the movable underbody position sensor 175, or the suspension position sensors 176a-176d, or a chosen combination thereof.

With the retraction control means described above, the movable underbody 101 (FIG. 1A) may be held in its retracted position until a loss of traction is detected by the vehicle's electronic stability control system 185. At that time, the movable underbody 101 may be deployed by the movable underbody retraction ECU 184. The movable underbody 101 may also be deployed when the driver so chooses and the movable underbody retraction ECU 184 determines that the roadway 199 (FIG. 1A) is appropriate for deployment of the movable underbody 101. Additionally, the movable underbody retraction ECU 184 may be designed to retract the movable underbody 101 when the roadway 199 is not appropriate for deployment of the movable underbody 101. The latter may occur, for example, when the vehicle leaves a paved road surface.

FIG. 29 is a flowchart of an example of a process that may be performed by a movable underbody retraction ECU 184 (FIG. 24B) to produce the functions described in the preceding paragraph. The first step, Step 2000, is detecting the movable underbody position through input from the movable underbody position sensor 175 (FIG. 24B) to the movable underbody retraction ECU 184 (FIG. 24B). The process then proceeds to Step 2001, where the position of the movable underbody 101, as detected in Step 2000, is used to determine which further steps will be performed. If the movable underbody 101 (FIG. 1A) is deployed, then the process proceeds to Step 2002. If the movable underbody 101 is not deployed, then the process proceeds to Step 2010.

In Step 2002, the roughness of the roadway 199 (FIG. 1A) is detected through input to the movable underbody retraction ECU 184 (FIG. 24B) from the four vehicle suspension position sensors 176a-176d (FIG. 24B). Roadway 199 roughness may be categorized by the movable underbody retraction ECU 184 as either rough or not rough by comparing the amplitude and speed of suspension movements to preprogrammed threshold levels stored in the movable underbody retraction ECU 184. The process then proceeds to Step 2003, where the condition of the roadway 199 as either rough or not rough, as detected in Step 2002, is used to determine which further steps will be performed. If the roadway 199 is rough then the process proceeds to Step 2004. If the roadway 199 is not rough, then the process proceeds to Step 2005.

In Step 2004, the movable underbody 101 (FIG. 1A) is retracted by the retraction actuator 110 (FIG. 1A). This occurs when the movable underbody 101 is in its deployed position and the roadway 199 (FIG. 1A) is determined to be rough. The process then proceeds back to Step 2000, which is described above.

In Step 2005, the status of the vehicle's electronic stability control system 185 (FIG. 24B) is detected through input from the vehicle's electronic stability control system 185 to the movable underbody retraction ECU 184 (FIG. 24B). The process then proceeds to Step 2006 where the status of the vehicle's electronic stability control system 185 as either activated or not activated, as detected in Step 2005, is used to determine which further steps will be performed. For purposes of the example flowchart of FIG. 29, the vehicle's electronic stability control system 185 may be considered activated only when the vehicle's electronic stability control system 185 provides output for the deployment of the movable underbody 101 (FIG. 1A). If the vehicle's electronic stability control system 185 is activated, then the process proceeds back to Step 2000. This occurs when the movable underbody 101 is in its deployed position, the roadway 199 (FIG. 1A) is not rough, and the vehicle's electronic stability control system 185 is activated. If the vehicle's electronic stability control system 185 is not activated, then the process proceeds to Step 2007.

In Step 2007, the driving mode selected by the driver is detected through input from the driver-operated retraction switch 186 (FIG. 24B) to the movable underbody retraction ECU 184 (FIG. 24B). The process then proceeds to Step 2008, where the driving mode selected by the driver as either deployed or not deployed, as detected in Step 2007, is used to determine which further steps will be performed. If the driver selected driving mode is the deployed mode then the process proceeds back to Step 2000. This occurs when the movable underbody 101 (FIG. 1A) is in its deployed position, the roadway 199 (FIG. 1A) is determined to be not rough, the vehicle's electronic stability control system 185 (FIG. 24B) is not activated, and the driver has selected the deployed mode. If the driver selected driving mode is not the deployed mode then the process proceeds to Step 2009.

In Step 2009, the movable underbody 101 (FIG. 1A) is retracted by the retraction actuator 110 (FIG. 1A). This occurs when the movable underbody 101 is in its deployed position, the roadway 199 (FIG. 1A) is determined to be not rough, the vehicle's electronic stability control system 185 (FIG. 24B) is not activated, and the driver has selected the not deployed mode. The process then proceeds back to Step 2000.

In Step 2010, the roughness of the roadway 199 (FIG. 1A) is detected and categorized as rough or not rough in the same way as described above for Step 2002. The process then proceeds to Step 2011 where the condition of the roadway 199 as either rough or not rough, as detected in Step 2010, is used to determine which further steps will be performed. If the roadway 199 is rough, then the process proceeds back to Step 2000. This occurs when the movable underbody 101 (FIG. 1A) is not in the deployed position and the roadway 199 is rough. If the roadway 199 is not rough then the process proceeds to Step 2012.

In Step 2012, the driving mode selected by the driver is detected through input from the driver-operated retraction switch 186 (FIG. 24B) to the movable underbody retraction ECU 184 (FIG. 24B). The process then proceeds to Step 2013, where the driving mode selected by the driver as either the deployed mode or not deployed mode, as detected in Step 2012, is used to determine which further steps will be performed. If the driver selected driving mode is the deployed mode, then the process moves to Step 2014. If the driver selected driving mode is not the deployed mode, then the process proceeds to Step 2015.

In Step 2014 the movable underbody 101 (FIG. 1A) is deployed by reverse operation of the retraction actuator 110 (FIG. 1A). This occurs when the movable underbody 101 is not in its deployed position, the roadway 199 (FIG. 1A) is not rough, and the driver has selected the deployed mode. The process then proceeds back to Step 2000.

In Step 2015, the status of the vehicle's electronic stability control system 185 (FIG. 24B) is detected through input from the vehicle's electronic stability control system 185 to the movable underbody retraction ECU 184 (FIG. 24B). The process then proceeds to Step 2016 where the status of the vehicle's electronic stability control system 185 as either activated or not activated, as detected in Step 2015, is used to determine which further steps will be performed. If the vehicle's electronic stability control system 185 is activated, then the process proceeds to Step 2017. If the vehicle's electronic stability control system 185 is not activated, then the process proceeds back to Step 2000.

In Step 2017, the movable underbody 101 (FIG. 1A) is deployed by reverse operation of the retraction actuator 110 (FIG. 1A). This occurs when the movable underbody 101 is not in its deployed position, the roadway 199 (FIG. 1A) is not rough, the driver has not selected the deployed mode, and the vehicle's electronic stability control system 185 (FIG. 24B) is activated. The process then proceeds back to Step 2000.

Figure 9C:
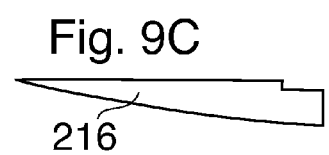
Figure 30B:
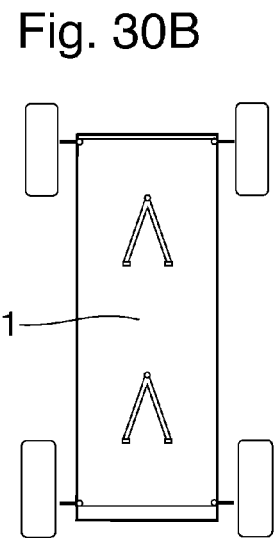

FIGS. 4, 9C, E, G-H, 28B, 30B-E, 31, 32, 39—Additional Embodiments of the Movable Underbody FIGS. 30B-E are plan views of additional embodiments of the movable underbody in accordance with the present invention. FIG. 30B shows a simple rectangular embodiment of the movable underbody 201 with minimal inlet and minimal diffuser (see below), along with adjustable lower support brackets 205a-205d (labeled in FIG. 30A) positioned near the corners of the movable underbody 201. This embodiment is also shown in perspective rear three-quarter view in FIG. 3B with different lower support brackets and a different stabilization linkage arrangement. In the embodiment shown in FIG. 3B, the front stabilization linkage 208f is mounted on a front pylon 198f and the rear stabilization linkage 208r is mounted on a rear pylon 198r. The pylons 198f and 198r decrease aerodynamic drag because they allow the stabilization linkages 208f and 208r to be recessed within the undersurface of the vehicle body 158.

Figure 30C:
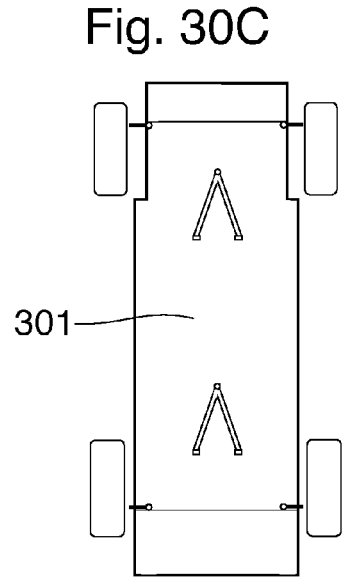
Figure 30D:
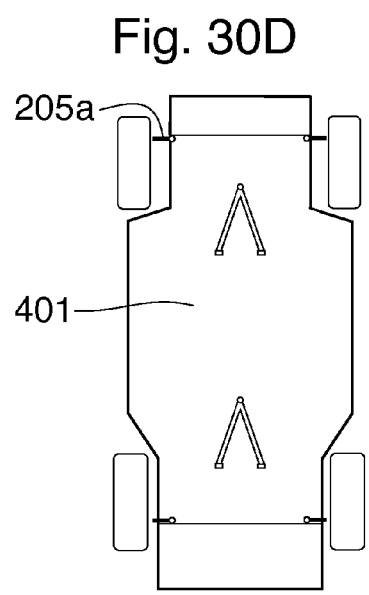
Figure 30E:
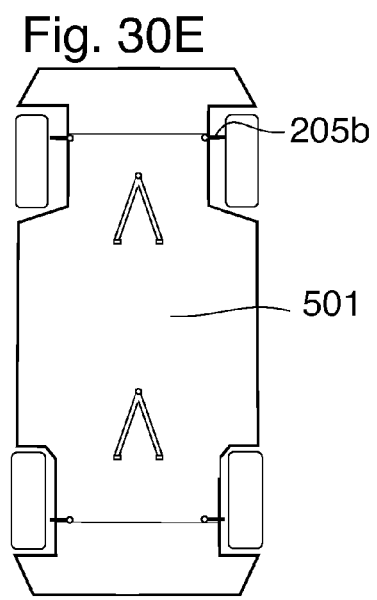

FIG. 30C shows a third embodiment of the movable underbody 301 with side cutouts in the front to accommodate steering movements of the front wheels 124a-124b (FIG. 30A). FIG. 30D shows a fourth embodiment of the movable underbody 401 with side extensions well to the sides of the mounting points of the adjustable lower support brackets 205a-205d (labeled in FIG. 30A). FIG. 30E shows a fifth embodiment of the movable underbody 501 with side, front, and rear extensions of the movable underbody significantly beyond the mounting points of the adjustable lower support brackets 205a-205d (FIG. 30A). This embodiment is also shown in perspective rear three-quarter view in FIG. 28B.

Embodiments of the movable underbody may be built to withstand the comparatively high loads that may be generated with ground effect. This is especially the case because the points of vertical support are located in the four corner areas of the movable underbody. Movable underbody embodiments may be structurally rigid both in longitudinal and transverse directions, but not necessarily torsionally rigid (see below). Because it may be situated so close to the roadway 199 (FIG. 1A) in the deployed position, even small amounts of flex in the movable underbody, when subjected to significant vertical load, may significantly change the dimensions of the venturi duct that it defines with the roadway 199. Greater movable underbody thickness may increase movable underbody stiffness. A thicker movable underbody, however, may decrease vehicle ground clearance. This may be addressed with the addition of movable underbody support braces (see below) on the upper surface of the movable underbody. Such support braces may allow for a stiff movable underbody, yet one that is thin where it needs to be in order to maximize ground clearance. In particular, embodiments of the movable underbody may be of minimal thickness in the areas corresponding with the lowest parts of the vehicle body 158 (FIG. 1A), such as the engine sump.

FIG. 28B shows a perspective rear three-quarter view of a movable underbody 501 with side, front, and rear extensions, and with two longitudinally oriented support braces on the upper surface. The left support brace 188a and right support brace 188b increase the stiffness of the movable underbody so that the movable underbody may be built thin to maximize ground clearance when in the retracted position. These support braces 188a-188b may be designed to fit into corresponding grooves on the underside of the vehicle body 158 (FIG. 1A). FIG. 4B is a perspective front three-quarter view from below of a vehicle in accordance with the present invention. The movable underbody 101 (FIG. 1A) is removed to expose the lower surface of the vehicle body 158 (FIG. 1A), showing a left support brace groove 189a near the left sill of the vehicle and a right support brace groove 189b near the right sill of the vehicle. Support braces may also serve as aerodynamic fences (see below) to help regulate the flow of air through the space between embodiments of the movable underbody and the vehicle body 158 (see below). It is also possible to have a folding support brace that will fold against embodiments of the movable underbody when the movable underbody is retracted against the vehicle body 158.

Embodiments of the movable underbody may be designed to be capable of a degree of torsional flex to better comply with the changing contours of the roadway 199 (FIG. 1A). If a more torsionally flexible movable underbody embodiment is desired, then diagonal support braces may be excluded because such support braces tend to decrease torsional flexibility. On the other hand, longitudinally oriented and transversely oriented support braces may impart longitudinal and transverse rigidity, while allowing for torsional flex.

To maximize torsional flex, embodiments of the movable underbody may be composed of more than a single element. FIG. 32A is a perspective rear three-quarter view of a medially-divided, two-element movable underbody 701 in accordance with the present invention. FIG. 32B is similar, but shows relative movement in the two halves of the two-element movable underbody 701. FIG. 32C shows an exploded view of the two-element movable underbody 701 showing the articular rod 194 that is received by a left articular cylinder 181a and a right articular cylinder 181b and about which the two halves of the two-element movable underbody 701 articulate. FIG. 32C also shows the retention bands 195 made from a suitable elastomeric material that serve to hold the two halves of the two-element movable underbody 701 together and that are secured by short pegs 182. Alternatively, it is possible to have a two-element movable underbody articulate about a longitudinal axis, rather than the transverse axis of articulation of the movable underbody embodiment shown.

Figure 9F:
Figure 9D:
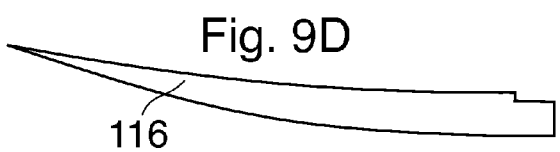
Figure 9G:
Figure 9E:
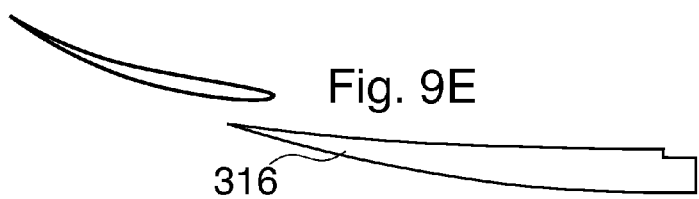
Figure 9H:
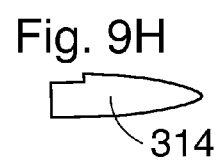

FIGS. 9F-H are side views of three embodiments of a movable underbody inlet in accordance with the present invention. The basic embodiment is shown in FIG. 9F. FIG. 9G and FIG. 3B show an upturned minimal inlet 214 that does not require a corresponding inlet depression 113 (FIG. 1A) on the vehicle body 158 (FIG. 1A). FIG. 9H shows a symmetrical minimal inlet 314. As shown in FIG. 11B, the upturned minimal inlet 214 (as well as the symmetrical minimal inlet 314) allows a considerable amount of airflow to enter between the vehicle body 158 and embodiments of the movable underbody compared with the basic embodiment shown in FIG. 11A. In the basic embodiment shown in FIG. 11A, essentially all of the airflow travels below the movable underbody 101. All of these inlet embodiments have varying degrees of an upturned leading edge that, beyond functioning as a venturi inlet, tends to make embodiments of the movable underbody ride over any object or debris that may be encountered on the roadway 199 (FIG. 1A).

FIGS. 39C-E are side views of three additional embodiments of a movable underbody inlet in accordance with the present invention. Unlike the preceding inlet embodiments that are designed to concentrate the flow of air entering the venturi duct defined by the movable underbody, the embodiments shown in FIGS. 39C-E are designed to limit or exclude the flow of air entering the space below the movable underbody. The purpose of this is to allow negative pressure that is formed at the rear of the movable underbody during vehicle travel to extend forward without being equalized by a flow of air from the front of the movable underbody. That negative pressure at the rear of the movable underbody, by the way, may be enhanced by use of a movable underbody spoiler 516 (FIG. 39F) (see below). For this purpose it is very useful to have some form of aerodynamic skirt 119a-119b (FIG. 2A) or 219a-219b (FIG. 34A) included at the sides of the movable underbody. FIG. 39C is a simple downturned minimal inlet 514. FIG. 39D is a downturned minimal inlet with brush 614 that may scrape along the roadway 199 (FIG. 1A). FIG. 39E is a downturned, two-element inlet 714. The front element, or slat, of the downturned two-element inlet 714 is designed to draw off air that would otherwise enter the space below the movable underbody. The front element of the downturned two-element inlet 714 may be attached to the rear element of the downturned two-element inlet 714 through posts or aerodynamic fences that extend between the two elements of the inlet. Inlet shapes other than those described may, of course, be used.

FIGS. 9C-E are elevation views of three embodiments of a movable underbody diffuser in accordance with the present invention. The basic embodiment is shown in FIG. 9D. FIG. 9C and FIG. 3B show a minimal movable underbody diffuser 216 that does not need to be accommodated by a vehicle body diffuser 125 when the movable underbody is retracted. FIG. 9E shows a two-element movable underbody diffuser 316. The upper element of the two-element underbody diffuser 316 may be attached to the lower element of the two-element underbody diffuser 316 through posts or aerodynamic fences that extend between the two elements of the movable underbody diffuser.

FIG. 39F is an elevation view of an additional embodiment of a movable underbody diffuser in accordance with the present invention. This movable underbody spoiler 516 incorporates an abrupt and prominent upturn that is designed to create drag at the back of the movable underbody. The purpose of that is to increase the amount of negative pressure at the rear of the movable underbody that may then extend forward under the movable underbody to enhance downforce. The movable underbody spoiler 516 may be usefully combined with the several embodiments of downturned minimal inlets described above, as well as other inlet shapes.

The movable underbody inlet and diffuser mounting systems shown in FIGS. 9A-B allow the various movable underbody inlets and diffusers to be easily switched out, facilitating experimentation between different inlet and diffuser embodiments. Such experimentation is particularly enabled by fitting the vehicle with downforce-measuring strain gauges, exemplified by 171c (FIG. 8E), and a suitable data logging system adapted to record downforce levels and other parameters. A system of downforce-measuring strain gauges, exemplified by 171c, and a suitable data logger may also be used to compare the effect of changes to movable underbody ride height and pitch on downforce levels and distribution to the wheels 124a-124d (FIG. 30A).

FIG. 31A is a perspective rear three-quarter view of another embodiment of a movable underbody that is in accordance with the present invention. This adjustable movable underbody 801 has an adjustable inlet 414 articulated to the front of the movable underbody plate 102 through a front hinge of the movable underbody 191f and an adjustable diffuser 416 articulated to the rear of the movable underbody plate 102 through a rear hinge of the movable underbody 191r. The adjustable inlet 414 is moved by an adjustable inlet actuator 197f. The adjustable inlet actuator 197f moves a pushrod of the adjustable inlet 192f that is connected through a clevis to a control horn of the adjustable inlet 193f that is attached to the adjustable inlet 414. Similarly, the adjustable diffuser 416 is moved by an adjustable diffuser actuator 197r. The adjustable diffuser actuator 197r moves a pushrod of the adjustable diffuser 192r that is connected through a clevis to a control horn of the adjustable diffuser 193r that is attached to the adjustable diffuser 416. If the adjustable inlet actuator 197f and adjustable diffuser actuator 197r, both of which are "adjustable aerodynamic surface actuators," are made operable by the driver or by an automatic control system, the position of the adjustable inlet 414 and adjustable diffuser 416 may be changed during vehicle travel to affect the performance of the adjustable movable underbody 801. These surfaces may also be moved downward when the adjustable movable underbody 801 is retracted to allow the adjustable movable underbody 801 to fit compactly against the vehicle body 158 (FIG. 1A). The movable underbody may also incorporate other articulating panels that fold flat against the vehicle body 158 when the movable underbody is retracted.

The adjustable inlet 414 (FIG. 31A) and adjustable diffuser 416 (FIG. 31A) are just two examples of adjustable aerodynamic surface embodiments that may be included in the design of a movable underbody. Movable underbody embodiments involving only one or the other adjustable aerodynamic surface, or more complex arrangements involving additional or alternative adjustable aerodynamic surfaces or bending aerodynamic surfaces, may be readily envisioned. The foregoing disclosure of these two adjustable aerodynamic surface embodiments should be read as illustrative only and should not be construed as limiting. An actuator that is adapted to move any such adjustable aerodynamic surface is also herein referred to as an adjustable aerodynamic surface actuator.

FIG. 39A is a further embodiment of a movable underbody 901. This embodiment includes transversely oriented slots 4000 that extend from the upper surface of the slotted movable underbody 901 to the lower surface of the structure. The function of the slots 4000 is to draw air from below the slotted movable underbody 901. This, in turn, decreases air pressure below the slotted movable underbody 901. This aerodynamic effect depends upon the flow of air above the slotted movable underbody 901. Accordingly, this design may incorporate a downturned minimal inlet 514 or other inlet designs that promote the flow of air above the slotted movable underbody 901. Aerodynamic fences (see below) may also be used to concentrate and speed the flow of air above the slotted movable underbody 901. FIG. 39B is a cross section of the leading portion of the slotted movable underbody 901 in accordance with line 39B-39B of FIG. 39A. FIG. 39B shows the orientation of the slots 4000 with their openings on the upper surface of the slotted movable underbody 901 behind the corresponding lower openings. Also apparent in FIG. 39B is the airfoil shape of each area between adjacent slots 4000. The slotted movable underbody 901 may be provided with longitudinally oriented strips or regions free of slots 4000 for longitudinal support. Longitudinally oriented support braces 188a-188b may also be usefully employed for support with a slotted movable underbody 901.

Some movable underbody slots 4000 may be positioned so that they line up with corresponding openings on the undersurface of the vehicle body 158 to provide cooling air to components of the vehicle when the slotted movable underbody 901 is retracted. An arrangement of such cooling slots or other openings may be added to other embodiments of the movable underbody described herein. Such slots may also be adapted to open when the movable underbody is retracted and close when the movable underbody is deployed.

A single prominent movable underbody slot 4000 may be positioned toward the front of the movable underbody to form a front movable underbody diffuser in addition to the rear movable underbody diffuser 116. This is similar to the arrangement seen on the vehicle body undersurface of Le Mans Prototype race cars ("LMP").

The preceding arrangements of movable underbody slots 4000 are only examples of the many movable underbody slot arrangements that may be used. For example, movable underbody slots may be alternatively arranged to direct high-speed air from the space above the movable underbody to the space below the movable underbody for the purpose of decreasing air pressure below the movable underbody.

FIG. 41A is a further embodiment of a movable underbody 10001. This winged movable underbody 10001 is reduced to a front movable underbody wing 10010f and a rear movable underbody wing 10010r connected by a left connecting rod 10020a and a right connecting rod 10020b. While the connecting rods 10020a-10020b do not generate downforce, they serve to maintain the orientation of the front and rear wings, 10010f and 10010r, of the winged movable underbody 10001. The wings, 10010f and 10010r, may be placed between the wheels or they may be situated before or behind the wheels. Many other arrangements of such movable underbody wings, including arrangements involving more than two wings or a single wing may be envisioned. Wings with two or more elements and wings with movable aerodynamic surfaces are also possible. The rear movable underbody wing 10010r is shown in FIG. 41A with left and right winglets, 10015a and 10015b, that may improve the aerodynamic efficiency of the wing. When positioned between the vehicle wheels 124a-124d (FIG. 30A), the winged movable underbody 10001 does not need to be built to withstand significant bending forces along its length. Thus the connecting rods 10020a-10020b do not need to be constructed to resist significant bending forces. Even a single lightly built connecting rod may be sufficient. However, the front and rear wings, 10010f and 10010r, should be rigid enough to withstand significant bending forces across their spans.

FIG. 41B is a further embodiment of a movable underbody 20001. This frame-like movable underbody 20001 is reduced to a mere frame that serves for the attachment of the aerodynamic skirts 119a-119b and/or aerodynamic fences 190 or fairings that extend between the frame-like movable underbody 20001 and the undersurface of the vehicle body 158 (FIG. 1A) (see an additional embodiment of the aerodynamic skirts and embodiments of aerodynamic fences that span the gap between the movable underbody and vehicle body, below). To decrease drag, portions of the frame-like movable underbody 20001 may be recessed within the lower surface of the vehicle body 158. Additionally or alternatively, portions of the frame-like movable underbody 20001 may be designed to pass through openings in the vehicle body 158 and be completely concealed. Such a frame-like movable underbody 20001 may generate downforce through the enhancement or smoothing of the flow of air under the vehicle body 158. This, for example, may be by limiting the cross flow of air from the sides of the vehicle and/or the flow of air from around the wheel wells. This may help maintain a lower aerodynamic pressure below the vehicle body 158 and thus generate downforce. The smoothing of the flow of air under the vehicle body 158 and/or around the wheels 124a-124d (FIG. 30A) that may result from the use of a frame-like movable underbody 20001 may also serve to reduce overall vehicle aerodynamic drag. Unlike most other embodiments of the movable underbody, the frame-like movable underbody 20001 does not necessarily need to be built to withstand significant longitudinal bending forces or significant transverse bending forces.

Both the frame-like movable underbody 20001 (FIG. 41B) and winged movable underbody 10001 (FIG. 41A) may be retracted using corner retraction actuators 210a-210d (see FIG. 28A), operating through corresponding corner retraction linkages 211a-211d (see FIG. 28A) and appropriate lower support brackets with retraction linkage attachment points, such as 305a-305d (FIG. 28A). Alternatively, other retraction means may be used, as well as other arrangements of a frame-like movable underbody.

Embodiments of the movable underbody may be fitted with access panels that may be used to facilitate removal of the movable underbody from the rest of the vehicle. FIG. 4A is a perspective front three-quarter view from below of the basic embodiment of the movable underbody 101 in accordance with the present invention. FIG. 4A shows a front access panel 187*f* that allows access to the mounting plate of the front ball joint 129, a middle access panel 187*m* that allows access to the retraction linkage fitting 112 (FIG. 1A), and a rear access panel 187*r* that allows access to the mounting track of the sliding mechanism 131. Through these three access panels, 187*f*, 187*m*, and 187*r*, the mounting hardware that connects the movable underbody 101 to the vehicle body 158 (FIG. 1A) may be disconnected. The movable underbody 101 may then be easily disconnected from the vehicle's suspension by unscrewing the adjustment bolts, exemplified by 156*c* (FIG. 19D), of the adjustable lower support brackets 205*a*-205*d* (FIG. 30A) (see additional embodiments of the lower support brackets, above).

Embodiments of the movable underbody may be designed to serve as one very large access panel that may be removed for access to all parts of the vehicle from below. In this case, the undersurface of the vehicle body 158 (FIG. 1A) may be designed to be largely open from below so that there is obtained easy access to many components of the vehicle when the movable underbody is removed. Additional access panels may be built into the movable underbody to facilitate access to different vehicle components, such as the engine and transmission. Small access panels on the movable underbody may be made for jacking points on the vehicle chassis if it is desired to lift the vehicle body 158 with or without lifting the movable underbody. These access panels may be built as hard points to serve as jacking points if the vehicle body 158 and underbody are to be lifted together.

Like the leading portion of the movable underbody, the lateral edges of the movable underbody may be upturned to produce downforce in case the vehicle loses control and travels sideways over the roadway 199 (FIG. 1A). Additionally, upturned sides may be better able to glide over the roadway 199. This may be advantageous in situations when the vehicle spins and leaves the road, causing the vehicle to travel sideways over a loose roadway 199.

The undersurface of the movable underbody may be flat. If so, thin skins of differing aerodynamic profiles may be applied to the undersurface to change the aerodynamic characteristics of the movable underbody. For example, the lengthwise profile of the undersurface of the movable underbody may be changed by changing the aerodynamic skin. Alternatively, the undersurface of the movable underbody may be of a more complex profile, such as shown in FIG. 31B. FIG. 31B shows a movable underbody with tunnels 601. The movable underbody with tunnels 601 may bear appropriately designed openings for the passage of suspension components, such as the lower control arms. The movable underbody with tunnels 601, as well as other movable underbody embodiments, may include flexible regions to allow the movable underbody to conform to the lower surface of the vehicle body and/or components of the vehicle's suspension, particularly when the movable underbody is retracted. Longitudinal strakes may be fitted to the underside of embodiments of the movable underbody for aerodynamic reasons. Other aerodynamic structures may, of course, be added to embodiments of the movable underbody. Skids or small wheels may be fitted to help protect embodiments of the movable underbody from any abrasion that may result from contact with the roadway 199 (FIG. 1A).

Many combinations of the foregoing embodiments and other variations are possible. The foregoing disclosure of movable underbody embodiments and variations should be read as illustrative and should not be construed as limiting.

FIGS. 33-34—An Additional Embodiment of the Aerodynamic Skirts and Embodiments of Aerodynamic Fences that Span the Gap Between the Movable Underbody and Vehicle Body FIG. 33F is a perspective rear three-quarter view from above of the left side portion of a movable underbody 101 with an alternative skirt embodiment in deployed position. Instead of sliding within skirt grooves 118*a*-118*b* (FIG. 1A), this left hinged skirt 219*a* (right hinged skirt 219*b* shown in FIG. 34A), is hinged through a left skirt hinge 196*a* (right hinged skirt is articulated in the same way), to the side of the movable underbody 101. At intervals along their length, the hinged skirts 219*a*-219*b* are expanded into hinged skirt levers 183. FIG. 33C is a cross-sectional view of the left hinged skirt 219*a* in accordance with line 33C-33C of FIG. 33F. FIG. 33D is a cross-sectional view of the left hinged skirt 219*a* in accordance with line 33D-33D of FIG. 33F. FIG. 33E is the same view as FIG. 33D, except with the left hinged skirt 219*a* in retracted position against the lower surface of the vehicle body 158. When retracted against the vehicle body 158 (FIG. 1A), the hinged skirt levers 183 cause the hinged skirts 219*a*-219*b* to rotate up and out of the way. A similar retraction mechanism involving levers may be adapted for use with sliding skirts 119*a*-119*b* (FIG. 2A).

FIG. 34A is a cross-section behind the front stabilization linkage 108*f*, in accordance with line 34A-34A of FIG. 23A, showing only the lower portion of the vehicle body 158 (FIG. 1A). In FIG. 34A the movable underbody 101 is deployed with the lower edges of the hinged skirts 219*a*-219*b* resting upon or supported just above the roadway 199. FIG. 34B shows the same view (taken along line 34A-34A of FIG. 23A), except with the movable underbody 101 retracted against the vehicle body 158. The hinged skirts 219*a*-219*b* may be made from an appropriate abrasion-resistant material, such as strips of glass reinforced plastic ("GRP"). Further, each hinged skirt 219*a*-219*b* may bear a brush strip along its lower edge to help conform to the roadway 199. Hinged skirts 219*a*-219*b* of this design must be situated at the sides of the movable underbody 101. It is possible, however, to articulate hinged skirts of other designs to the lower surface of the movable underbody 101 and thus away from the sides of the movable underbody 101. Similarly, it is also possible to mount sliding skirts 119*a*-119*b* (FIG. 2A) away from the side of the movable underbody 101. It is also possible to mount more than one skirt of either design to each side of the movable underbody 101. Alternatively, the movable underbody 101 may be fitted without aerodynamic skirts.

As shown in FIG. 34A, a folding aerodynamic fence 190 may extend between the movable underbody 101 and vehicle body 158. The region between the movable underbody 101 and vehicle body 158 is hereinbelow termed the "interspace". The folding aerodynamic fence 190 may partially or completely seal off the interspace. A folding aerodynamic fence 190 may be made from any suitably strong yet flexible sheet material, such as, for example, thick Mylar. The folding aerodynamic fence 190 may be secured to the underside of the vehicle body 158 and upper side of the movable underbody 101 with hook and loop fasteners, such as Velcro. Hook and loop fasteners may allow easier access to the interspace than other fasteners for a folding aerodynamic fence 190. Alternatively, a rigid aerodynamic fence 290 (FIG. 28B) may be fitted, similar or identical in form to the support braces 188*a*-188*b* (FIG. 28B) described above. Such rigid aerodynamic fences 290 are shown in FIG. 28B positioned to deflect the air stream from before the vehicle's front wheels 124*a*-124*b* (FIG. 30A). A rigid aerodynamic fence 290 may need to be accommodated by a corresponding depression on the undersurface of the vehicle body 158 to allow the movable underbody 101 to be fully retracted.

Figure 34C:
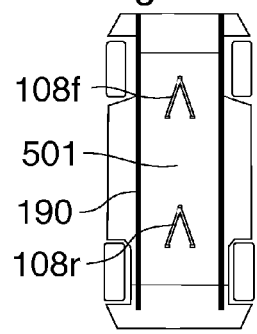
Figure 34D:
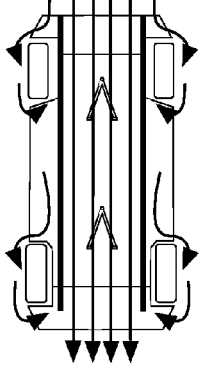
Figure 34E:
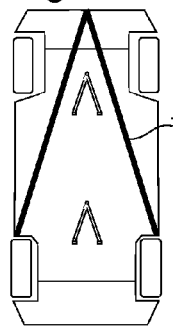
Figure 34F:
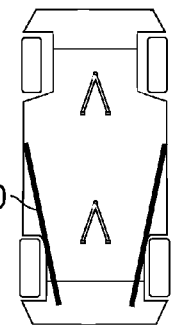
Figure 34G:
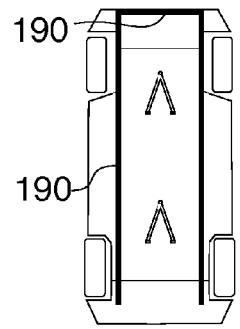
Figure 34H:
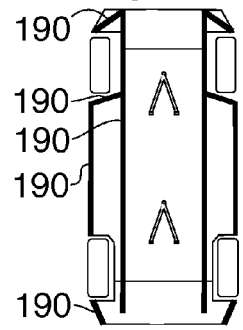

FIGS. 34C, E-H are plan views of a movable underbody 501 with side, front, and rear extensions. These figures show various arrangements of folding aerodynamic fence 190. FIGS. 34D and 34I-L show corresponding diagrams of the effects of such aerodynamic fences 190 on airflow through the interspace. As shown in FIG. 34D, aerodynamic fences 190 may serve to smooth the flow of air in the interspace so that the interspace may function as a very large air duct. This is useful for cooling the engine, as well as other components located in the engine compartment such as an intercooler. This is particularly true for mid-engined and rear-engined vehicles where the engine compartment is exposed to less airflow at the back of the vehicle. Enhanced airflow in the interspace is also useful for improving the effectiveness of the movable underbody diffuser 116 (FIG. 1A) by increasing the level of airflow above the trailing edge of the movable underbody diffuser 116. FIG. 34J shows another arrangement of aerodynamic fences designed to concentrate airflow in the interspace for the same purposes.

Figure 34I:
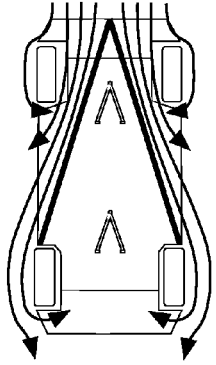
Figure 34J:
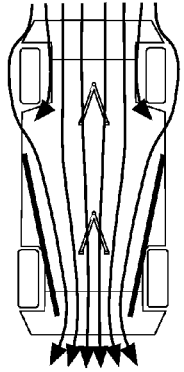

As shown in FIGS. 34I and L, folding aerodynamic fences 190 may be arranged to deflect the airstream before the wheels 124a-124d (FIG. 30A), in order to decrease aerodynamic drag produced by the wheels 124a-124d. Aerodynamic fences 190 may also be designed to encircle the wheel wells as much as practical to isolate the air volume around the wheels 124a-124d from that below the vehicle body 158 (FIG. 1A) for the purpose of decreasing drag. To that end, the movable underbody 101 (FIG. 1A) may be made to conform as closely as possible to the wheels to better enclose the wheel wells from below. Such wheel enclosure areas may be constructed of a flexible material if needed to accommodate full suspension extension when the movable underbody 101 is in its retracted position.

Figure 34K:
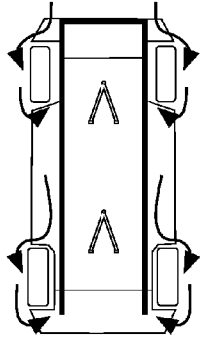
Figure 34L:
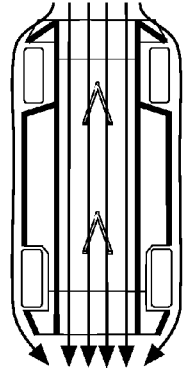

As shown in FIG. 34K, a folding aerodynamic fence may also be used to exclude fast flowing air from the interspace. In all of these embodiments, a folding aerodynamic fence 190 may be replaced with a rigid aerodynamic fence 290 (FIG. 28B). Rigid aerodynamic fences 290 provide the potential to define more streamlined aerodynamic fence shapes than the necessarily straight folding aerodynamic fences 190 would allow. Rigid aerodynamic fences 290 may be optimized, for example, as streamlined fairings before the wheels and other structures on the underside of the vehicle. It is possible to expand such a wheel fairing to enclose the wheel from above. Such a complete wheel fairing may, itself, be enclosed by the vehicle body 158 (FIG. 1A) or be partially or entirely exposed and not covered by the vehicle body 158. A complete wheel fairing must include appropriate openings for the passage of components of the suspension.

FIG. 41C shows a left front complete wheel fairing 9000a for a left front wheel 124a (FIG. 30A) and a right front complete wheel fairing 9000b for a right front wheel 124b (FIG. 30B) installed on a movable underbody 501 with side, front, and rear extensions. The advantage of a complete wheel fairing, as exemplified by 9000a-9000b, over a conventional wheel fender attached to the vehicle body 158 (FIG. 1A) is that it may be designed to much more closely conform to the corresponding wheel when the movable underbody is in the deployed position. This is because a complete wheel fairing, as exemplified by 9000a-9000b, attached to a movable underbody, moves vertically with the corresponding wheel when the movable underbody is deployed. Therefore, such a complete wheel fairing, as exemplified by 9000a-9000b, need not accommodate vertical movement of the corresponding wheel, unlike a conventional wheel fender. When the movable underbody is deployed, such a complete wheel fairing, as exemplified by 9000a-9000b, may decrease overall vehicle drag by both decreasing the frontal area of the vehicle and by decreasing the volume of air surrounding the rotating wheel. Like conventional wheel fenders, such wheel fairings may also serve to contain the spray of water, mud, and other material that may occur with vehicle travel. If conventional wheel fenders are not also to be included in a vehicle design, such wheel fairings may be necessary to conform to specific governmental and racing regulations. It is also in accordance with the present invention to enclose other components of the vehicle, including parts of the vehicle body 158, with fairings attached to the movable underbody. Other embodiments of the present invention would include surrounding the entire vehicle body 158 with an expanded fairing attached to the movable underbody.

FIGS. 35A and 36A—First Alternative Embodiment

FIG. 35A is an elevation view of the left side and FIG. 36A a perspective rear three-quarter view of a first alternative embodiment in accordance with the present invention. This first alternative embodiment is identical to the basic embodiment described above except for the addition of electric fans 1100 at the rear of the movable underbody 101. Each electric fan 1100 is mounted on a fan pylon 1200 attached to the lower surface of the movable underbody diffuser 116. The fans 1100 must be positioned so that they are at least partially elevated above the roadway 199 when the movable underbody 101 is deployed. When operated, the electric fans 1100 are adapted to draw air from below the movable underbody 101. The electric fans 1100 may be operated whenever the movable underbody 101 is deployed. Alternatively, they may be operated by the driver through a driver-operated on/off switch and/or operated as part of a vehicle's stability assist system. Although not illustrated as such, the electric fans 1100 may be in the form of ducted fans. The ducting around such ducted electric fans 1100 may be continuous and there may be a skirt that spans the gap between the ducting and the roadway 199 so that airflow is substantially restricted to the fan ducts.

The electric fans 1100 serve to accelerate the flow of air below the movable underbody 101, thereby decreasing the air pressure below the movable underbody 101 and increasing downforce. This fan-induced "active" aerodynamic ground effect may be contrasted with "passive" aerodynamic ground effect that is generated solely through travel of the vehicle, as with the basic embodiment of the present invention. Such active aerodynamic ground effect allows increased levels of downforce to be achieved at lower vehicle speeds, where the amount of downforce generated through passive aerodynamic ground effect may be comparatively low. By use of such electric fans 1100, active aerodynamic ground effect may be used to generate downforce at comparatively lower vehicle speeds (even when the vehicle is stopped, as prior to forward launch) and passive aerodynamic ground effect used to generate downforce at comparatively higher vehicle speeds.

The electric fans 1100 may be mounted so that they are retractable above the lower surface of the movable underbody 101. For example, the electric fans 1100 may be mounted on the undersurface of a plank articulated to the rear of the movable underbody 101 that may rotate upward relative to the rest of the movable underbody. Retraction of the electric fans 1100 may promote the flow of air below the movable underbody 101 when the electric fans 1100 are not in use.

Electric fans 1100 may be combined with many combinations of additional component embodiments listed above. Electric fans 1100 may also be mounted at other positions on the movable underbody and similarly adapted to speed the flow of air under the movable underbody. The electric fans 1100 may, for example, be located behind the movable underbody and adapted to draw air from both below and above the movable underbody. The electric fans 1100 may be located at the front of the movable underbody and adapted to propel air below the movable underbody. The electric fans 1100 may be located at the sides of the movable underbody and adapted to either propel air below the movable underbody or draw air from below the movable underbody. Finally, the electric fans may be located within one or more openings in the movable underbody and adapted to speed the flow of air both below and above the movable underbody. Although much less practical, it is also possible to use gasoline or other liquid fuel powered fans or even miniature turbines in place of the electric fans 1100. It is also possible to use a flow of compressed air below the movable underbody to create downforce.

By use of an appropriate skirt system around the perimeter of the movable underbody, including use of a downturned inlet with brush 614 (FIG. 39D) at the front of the movable underbody, for example, the electric fans 1100 may, alternatively, generate downforce through decrease in the static pressure below the movable underbody by the direct evacuation of air below the movable underbody.

FIGS. 35B and 36B—Second Alternative Embodiment

FIG. 35B is an elevation view of the left side and FIG. 36B is a perspective rear three-quarter view of a second alternative embodiment in accordance with the present invention. This second alternative embodiment is similar to the basic embodiment described above with the following exceptions: the movable underbody is in the form of a vacuum plate 2100 with a centrally-located vacuum plate orifice 2300 to which is attached a vacuum hose 2400. Additionally, there is a vacuum generator 2500 that may be mounted within the vehicle body 158. The upper end of the vacuum hose 2400 attaches to the vacuum generator 2500. The perimeter of the vacuum plate 2100 is completely surrounded by a vacuum skirt 2200 that may be in the form of a brush, flexible abrasion-resistant material, or the like, capable of forming at least a partial seal with the roadway 199.

The vacuum generator 2500 serves to generate a negative pressure that is transmitted by the vacuum hose 2400 and vacuum plate orifice 2300 to the undersurface of the vacuum plate 2100. This creates downforce when the vacuum plate 2100 is deployed and the vacuum generator 2500 is activated. Unlike the other embodiments herein described in which downforce is generated through a decrease in the dynamic pressure below the plate (except for the last variant of the first alternative embodiment described above), the second alternative embodiment generates downforce through a decrease in the static pressure below the plate. The former means of downforce generation may be termed "aerodynamic ground effect" while the latter means of downforce generation may be termed "aerostatic ground effect". As described for the first alternative embodiment, aerodynamic ground effect may be further divided into passive aerodynamic ground effect and active aerodynamic ground effect.

The vacuum skirt 2200 serves to enclose the space below the vacuum plate 2100. This facilitates the decrease of pressure below the vacuum plate 2100 and thus increases the level of downforce generated. The vacuum generator 2500 may be automatically operated whenever the vacuum plate 2100 is deployed or may be independently operated. The vacuum generator 2500 may be alternatively mounted at some point on the vacuum plate 2100 and the vacuum hose 2400 made correspondingly short or eliminated. If the vacuum plate 2100 is positioned close enough to the roadway 199 (FIG. 1A), a useful amount of negative pressure may be generated below the vacuum plate 2100 by the operation of a sufficiently powerful vacuum generator 2500, even without a vacuum skirt 2200 installed.

The vacuum plate orifice 2300 may be situated at other positions besides the center of the vacuum plate 2100 and may be replaced with a plurality of orifices connected to the vacuum generator 2500 with an appropriate vacuum hose system. The vacuum generator 2500 may also be replaced with a plurality of vacuum generators.

Both the first and second alternative embodiments of the present invention allow for the generation of high levels of downforce regardless of vehicle speed. This means increased tire grip even at low vehicle speeds where conventional methods of generating downforce are relatively ineffectual. This, for example, allows a vehicle equipped in accordance with either the first or second alternative embodiments of the present invention to attain higher speeds through tight, low-speed turns, and improved acceleration from a standstill.

As a further alternative embodiment, the vacuum skirt 2200 may be eliminated from the front and rear of the vacuum plate 2100 and negative pressure applied to the undersurface of the vacuum plate 2100 for the purpose of drawing off a portion of the aerodynamic boundary layer to enhance the flow of air below the plate and thus enhance the generation of downforce produced through aerodynamic ground effect. This contrasts with the generation of downforce through aerostatic ground effect, as described in the immediately preceding paragraphs.

FIGS. 26B, 37, 38—Third Alternative Embodiment

FIG. 26B is a perspective rear three-quarter view of a third alternative embodiment in accordance with the present invention. This third alternative embodiment is similar to the basic embodiment described above except that the four support linkages 104a-104d attach to minimal fittings 705a-705d on the movable underbody 101 and extend directly to corresponding body-mounted height-adjustment actuators 3100a-3100d located in the vehicle body 158. There are also four laser sensors 3300a-3300d located on the movable underbody 101. The four laser sensors 3300a-3300d are adapted for sensing the ride height of the movable underbody 101 at their respective points of mounting. Each laser sensor 3300a-3300d is substantially coincident with a corresponding fitting 705a-705d that is attached to a corresponding support linkage 104a-104d. The body-mounted height-adjustment actuators 3100a-3100d and laser sensors 3300a-3300d are distributed toward the corner areas of the movable underbody 101. Unlike all other embodiments described herein, including the basic embodiment, there is no connection between the movable underbody support system and the suspension of the vehicle. Further, there is no force transfer through the suspension of the vehicle in this third alternative embodiment of the present invention.

FIG. 37 is a block diagram of a body-mounted movable underbody height-adjustment and retraction control means that may be used with the third alternative embodiment described above. The four body-mounted height-adjustment actuators 3100a-3100d are each controlled by output from a body-mounted movable underbody height-adjustment ECU (Electronic Control Unit) 3200. As shown in FIG. 37, the body-mounted movable underbody height-adjustment ECU (hereinafter the "ECU") 3200 may also be made responsive to a driver-operated retraction switch 3400, movable underbody position sensor 175, and the vehicle electronic stability control system 185, in addition to the laser sensors 3300a-3300d, for determining the movable underbody ride height, as described above. The ECU 3200 may follow the same process as described for the movable underbody retraction ECU 184 and as shown in FIG. 29, to produce the same functionality as that described for the movable underbody retraction ECU 184, in terms of movable underbody 101 deployment and retraction.

The laser sensors 3300a-3300d provide output to the ECU 3200. Based upon ride-height data input from the laser sensors 3300a-3300d, the ECU 3200 provides appropriate output to the four body-mounted height-adjustment actuators 3100a-3100d to maintain an approximately constant positional relationship between the movable underbody 101 (FIG. 1A) and the roadway 199 (FIG. 1A). For example, if the measured ride-height output from one of the laser sensors 3300a-3300d is below a preprogrammed movable underbody lower ride-height limit value stored in the ECU 3200, the ECU 3200 may send output to the corresponding body-mounted height-adjustment actuator 3100a-3100d to raise the movable underbody 101 at that position by the difference in ride height between the preprogrammed lower limit value stored in the ECU 3200 and that measured by the laser sensor 3300a-3300d. If the measured ride-height output from the same laser sensor 3300a-3300d is, instead, above a preprogrammed movable underbody upper ride-height limit value stored in the ECU 3200, the ECU 3200 may send output to the corresponding body-mounted height-adjustment actuator 3100a-3100d to lower the movable underbody 101 at that position by the difference in ride height between the preprogrammed upper limit value stored in the ECU 3200 and that measured by the laser sensor 3300a-3300d. The same process is performed by the ECU 3200 using input from all four laser movable underbody ride-height sensors 3300a-3300d to produce appropriate output for all four body-mounted height-adjustment actuators 3100a-3100d. This ensures that the orientation and ride height of the movable underbody 101 above the roadway 199 varies minimally from the upper and lower ride-height limit values stored in ECU 3200.

The ECU 3200 also provides output to the four body-mounted height-adjustment actuators 3100a-3100d for the alternate retraction and deployment of the movable underbody 101 (FIG. 1A). This operation is based upon preprogrammed positional data stored in the ECU 3200 for the retracted position of the movable underbody 101. Unlike all other embodiments of the present invention, including the basic embodiment, there is no separate retraction system in this embodiment.

More than four body-mounted height-adjustment actuators and a corresponding number of laser sensors may be used to support and move the movable underbody 101 (FIG. 1A) directly from the vehicle body 158 (FIG. 1A). Also, there may be as few as three body-mounted height-adjustment actuators and a corresponding number of laser sensors employed. Unlike the other embodiments of the present invention described herein, use of body-mounted height-adjustment actuators to support a movable underbody allows such a movable underbody to be of a design that does not include four corner areas near the four wheels 124a-124d (FIG. 30A) of the vehicle.

It is possible to obtain the appropriate output from the ECU 3200 to the body-mounted height-adjustment actuators 3100a-3100d by measuring ride height of the vehicle body 158 (FIG. 1A), such as that from suspension position sensors 176a-176d (FIG. 24A). This is an alternative to directly measuring the ride height of the movable underbody 101 (FIG. 1A), as described above. In this case, several steps must be performed by the ECU 3200 to convert ride-height data input from vehicle body ride-height sensors into appropriate output to the body-mounted height-adjustment actuators 3100a-3100d in order to maintain the movable underbody 101 near a set ride height above the roadway 199 (FIG. 1A). This is because the body-mounted height-adjustment actuators 3100a-3100d cannot be easily made coincident with the point on the vehicle where vehicle body ride height is measured. This is because such measurement must be made to the side, front, or rear of the movable underbody 101, due to the blocking effect of the movable underbody 101. For example, laser sensors for detecting ride height that are mounted to the vehicle body 158, rather than the movable underbody 101, will be blocked by the movable underbody 101, unless appropriately sized holes are made in the movable underbody 101 to allow for the passage of the laser beams.

It is in accordance with the invention to use suspension position sensors 176a-176d (FIG. 24A) for the purpose of measuring body ride height. When suspension position sensors 176a-176d are employed for this purpose, ride height is effectively measured at the four wheels 124a-124d (FIG. 30A) and those points are not coincident with the mounting positions of the body-mounted height-adjustment actuators 3100a-3100d.

FIG. 38 shows an example of a process that may be performed by the ECU 3200 (FIG. 37) to produce the desired output to the body-mounted height-adjustment actuators 3100a-3100d (FIG. 37) to maintain the movable underbody 101 (FIG. 1) at or near a preprogrammed ride height above the roadway 199 (FIG. 1) using input from suspension position sensors 176a-176d (FIG. 24A).

In Step 3001 output from the four suspension position sensors 176a-176d (FIG. 24A) is detected. The process then proceeds to Step 3002.

In Step 3002 the ride height at each wheel is calculated from the input from the four suspension position sensors 176a-176d (FIG. 24A). Depending upon how the suspension position sensors 176a-176d are connected and oriented relative to the suspension of the vehicle, there may be a simple linear relationship between the positional data input from each of the suspension position sensors 176a-176d and the ride height at each corresponding wheel 124a-124d (FIG. 30A). The ECU 3200 (FIG. 37) is preprogrammed with either a table to convert suspension position sensor values to ride height at the wheel values or the ECU 3200 is programmed with an appropriate mathematical equation to convert suspension position sensor output values to corresponding ride height at the wheels values. The process then proceeds to Step 3003.

In Step 3003 the ride height at the wheel values generated in Step 3002 are used to generate an equation that describes the plane of the roadway 199 (FIG. 1A). To do this it is useful to first define a reference plane 3500 (FIG. 40A) from which the estimated support plane 3600 (FIG. 40B) may be measured. The reference plane 3500 may be defined, for example, as the plane that intercepts the points of support of the four wheels 124a-124d (FIG. 30A) with the roadway 199 when the vehicle's suspension is at full suspension compression or jounce. FIG. 40A is a perspective front three-quarter view of the four wheels 124a-124d of a vehicle at full suspension compression. FIG. 40A also shows a reference plane 3500 defined as described above with the four wheel support points at full suspension compression labeled 3510a-3510d. Other reference planes may be defined instead. The origin 3520 on the reference plane 3500 may be defined as the point on the reference plane 3500 exactly between these four points 3510a-3510d. As shown in FIG. 40A, a longitudinally oriented X-axis 3530 (increasing values forward) and a transversely oriented Y-axis 3540 (increasing values to the right) may be defined as being on that reference plane. The Z-axis 3550 (increasing values downward) is orthogonal to the reference plane and represents height below the reference plane 3500. All three axes go through the origin.

FIG. 40B is a perspective front three-quarter view of the four wheels 124a-124d, as labeled in FIG. 40A, of a vehicle as the wheels rest upon the roadway 199 at representative positions below the reference plane 3500. These wheel positions may be assumed by the four wheels 124a-124d, for example, during vehicle travel. The position of each of the four wheel support points relative to the reference plane 3500 is defined in terms of the three coordinates (X, Y, Z). Thus, the front left wheel 124a may have the coordinates of its support point relative to the reference plane designated (Xa, Ya, Za) 3610a. Likewise, the support point of the front right wheel 124b is designated (Xb, Yb, Zb) 3610b. Further, the support point of the left rear wheel 124c is designated (Xc, Yc, Zc) 3610c. Finally, the support point of the right rear wheel 124d is designated (Xd, Yd, Zd) 3610d. The estimated support plane 3600 intercepts these four wheel support points 3610a-3610d. The estimated support plane 3600 is represented by an equation in the form of a dependent Z variable (height) in terms of an independent X variable (longitudinal position) and independent Y variable (transverse position). With such an equation, the distance between the reference plane 3500 and the estimated support plane 3600 may be determined for any horizontal position on the vehicle, as defined by the X and Y coordinate of the position.

Because the actual roadway 199 is rarely, if ever, totally flat, a mathematical equation for the estimated support plane 3600 that best fits the ride-height data must be generated by the ECU 3200. There are different ways that this may be done. One method is to have the ECU 3200 perform an ordinary least squares calculation using the coordinate data for the four measured wheel support points, (Xa, Ya, Za) 3610a, (Xb, Yb, Zb) 3610b, (Xc, Yc, Zc) 3610c, and (Xd, Yd, Zd) 3610d, to derive an equation for the mathematical plane that best fits those four points. This method is particularly appropriate if data from more than four ride-height points is available. Alternatively, the average slope (T) of a transverse line 3640 on the estimated support plane 3600, along with the average slope (L) of a longitudinal line 3630 on the estimated support plane 3600, and average height from the reference plane (D) 3620 may be calculated for the estimated support plane 3600 from the four wheel support points 3610a-3610d.

These may then be combined, as described below, to derive an equation for the mathematical plane that well fits those four points 3610a-3610d.

The slope (T) of the transversely oriented line 3640 on the estimated support plane 3600 is calculated by averaging the slope of a line connecting the support points of the two front wheels (T1=(Za−Zb)/(Ya−Yb)) with the slope of a line connecting the support points of the two rear wheels (T2=(Zc−Zd)/(Yc−Yd)). Thus, the transverse slope (T) of the estimated support plane 3600 is (T1+T2)/2. The slope (L) of the longitudinally oriented line 3630 on the estimated support plane 3600 is calculated by averaging the slope of a line connecting the support points of the two left wheels (L1=(Za−Zc)/(Xa−Xc)) with the slope of a line connecting the support points of the two right wheels (L2=(Zb−Zd)/(Xb−Xd)). Thus, the longitudinal slope (L) of the estimated support plane 3600 is (L1+L2)/2. The Z-intercept (D) of both transverse and longitudinal lines, 3640 and 3630, is the average of the height below the reference plane for the four wheel support points sensed by the suspension position sensors 176a-176d (FIG. 24A). The Z-intercept (D), or estimated ride height at the origin 3620, is therefore given by (Za+Zb+Zc+Zd)/4. Thus, the height below the reference plane (Z) to any point on the estimated support plane 3600 may be determined by the following equation: Z=TX+LY+D, where X and Y are the transverse and longitudinal coordinates of any point of interest relative to the origin. The points that are of interest in the following step, Step 3004, are the longitudinal (Y) and transverse (X) positions of each of the body-mounted height-adjustment actuators 3100a-3100d (FIG. 40C). The process then proceeds to Step 3004.

In Step 3004, the foregoing equation Z=TX+LY+D is used by the ECU 3200 to calculate the estimated ride height at all four of the movable underbody height-adjustment actuators 3100a-3100d (FIG. 40C). FIG. 40C shows these estimated actuator ride heights 3650a-3650d for the example wheel positions of FIG. 40B. For each of the body-mounted height-adjustment actuators 3100a-3100d this calculation is based upon the transverse (X) and longitudinal (Y) coordinates specific to that body-mounted height-adjustment actuator 3100a-3100d, along with the transverse slope (T), longitudinal slope (L), and average height above the reference plane (D) values calculated by the ECU 3200 (FIG. 37) in Step 3003. The transverse (X) and longitudinal (Y) coordinates of each of the body-mounted height-adjustment actuators 3100a-3100d are preset constants preprogrammed into the ECU 3200 based upon the exact position relative to the origin on the reference plane 3500 (FIG. 40A) of each of the height-adjustment actuators 3100a-3100d mounted on the vehicle body 158 (FIG. 1A). The process then proceeds to Step 3005.

In Step 3005, the desired movable underbody ride height is subtracted from the ride heights determined in Step 3004 for all four of the body-mounted height-adjustment actuators 3100a-3100d by the ECU 3200 (FIG. 37) to derive correct output values for the four body-mounted height-adjustment actuators 3100a-3100d. This assumes that the body-mounted height-adjustment actuators 3100a-3100d include a system that provides the ECU 3200 with feedback on current actuator output positions. The movable underbody ride height may be a preset value permanently stored in the ECU 3200 or a system may be provided to change that value based upon input from the driver or a computer processor. Additionally, movable underbody pitch values representing differences in the ride height at the front and rear of the movable underbody 101 (FIG. 1A) may be preprogrammed into the ECU 3200 and either added or subtracted to the front body-mounted height-adjustment actuators 3100a-3100b and either subtracted or added to the rear body-mounted height-adjustment actuators 3100c-3100d. The process then proceeds to Step 3006.

In Step 3006, the correct output to the body-mounted height-adjustment actuators 3100a-3100d, calculated in Step 3005, is output by the ECU 3200 (FIG. 37) to the body-mounted height-adjustment actuators 3100a-3100d. The process then proceeds back to Step 3001.

The foregoing method allows the body-mounted movable underbody height-adjustment actuators 3100a-3100d to be positioned at points well away from the vehicle wheels 124a-124d (FIG. 30A). This method also allows three or five or more body-mounted movable underbody height-adjustment actuators to be used instead of the arrangement of four body-mounted movable underbody height-adjustment actuators 3100a-3100d described above. Other suitable means for measuring vehicle body ride height, of course, may be used with the preceding method.

ADVANTAGES

The present invention has a number of important advantages over the prior art. These advantages are identified in the preceding description of the basic and additional embodiments. To summarize, these advantages have the following features:

(a) The movable underbody device is retractable. As described in the detailed description, the movable underbody of the present invention may be retracted or deployed by the driver and/or a retraction control means. This is a very significant advantage of the present invention because it allows a vehicle so equipped to have both a high-ride-height, low-downforce configuration and a low-ride-height, high-downforce configuration. This greatly increases the practicality of the movable underbody because it may remain in a retracted position for driving on public roads and only be deployed when the vehicle is to be driven on a closed-course racetrack or in emergency situations requiring increased tire grip.

(b) The movable underbody may be physically or functionally disengaged from the suspension. This is a further very important advantage of the present invention over the prior art. Physical or functional disengagement of the movable underbody from the suspension allows the movable underbody to be securely held against the vehicle body in the retracted position. Among other advantages, this means that there is less chance of physical damage to the movable underbody and cooperating systems when not in use. It is only when the movable underbody is deployed that it is engaged or coupled with the vehicle's suspension, such that it both moves with, and transfers downforce load directly to, the vehicle's suspension.

(c) The presently disclosed movable underbody may be largely or completely hidden from normal view when retracted.

(d) The movable underbody of the present invention is compliant upon impact with the roadway or objects thereon. This is because the suspension-mounted support means of the movable underbody may be adapted to transfer significant load only in tension.

(e) The movable underbody contributes only minimally to the unsprung mass of the vehicle because it is only the comparatively small and light upper support bracket and associated components of the movable underbody support system that are fixed to the unsprung portion of the vehicle's suspension. This may mean improved tire grip and vehicle handling in a vehicle equipped with a device in accordance with the present invention.

(f) The movable underbody is finely adjustable in both ride height and orientation during vehicle travel when, for example, the upper support bracket is made adjustable, as described in relation to the additional embodiments. This allows precise ground clearance to be controlled. It also may allow overall levels and distribution of downforce to be varied during travel.

(g) The movable underbody allows downforce to be measured directly using strain gauges attached to the support linkage system. This advantage is a result of the unique support system of the present invention where the horizontal loads generated by the movable underbody may be borne separately by one or more stabilization linkages and only vertical loads borne by the support linkage system.

(h) The movable underbody of the present invention may decrease the drag generated by the vehicle wheels. This advantage is a result of the aerodynamic fences that may be fitted between the movable underbody and the vehicle body or the wheel fairings that may be fitted to enclose the wheels. These structures may be arranged to both deflect the air stream before the vehicle wheels and isolate the volume of air around the wheels. The result is a decrease in the considerable drag often associated with the rotating wheels of a motor vehicle. The preceding means of drag reduction is in addition to both a) the drag reduction that is a result of low levels of induced drag generated in ground effect, and b) the effectiveness of the movable underbody for generating downforce that allows the body of a vehicle to be better optimized for minimized drag. Taken together, these advantages in drag reduction result in a motor vehicle that may produce markedly less drag than a comparable motor vehicle that is not fitted with a device in accordance with the present invention. Thus, not only may a motor vehicle equipped with a device in accordance with the present invention be driven more rapidly around a road course than a comparable vehicle not so equipped, a motor vehicle equipped with a device in accordance with the present invention may have better gas mileage and a higher maximum straight line speed than a comparable motor vehicle not so equipped.

(i) The present device may influence the flow of air between the vehicle body and movable underbody for potentially useful purposes. Such purposes include engine cooling, intercooler cooling, and the enhancement of ground effect through interaction with airflow below the movable underbody at the rear of the structure or through slots cut in the surface of the movable underbody.

(j) The first and second alternative embodiments of the present invention may generate high levels of downforce at low vehicle speeds or when the vehicle is stopped. Thus, a vehicle equipped in accordance with either the first or second alternative embodiments of the present invention may have higher performance at low vehicle speeds than a comparable vehicle not so equipped. The former may also have the potential to accelerate faster from a standstill than a comparable vehicle not so equipped.

The movable underbody described herein may also be fitted to other road vehicles besides sports cars and passenger cars. Although the detailed description above contains many specifics, these should not be construed as limiting the scope of the embodiments. Instead, the detailed description should be read as merely providing illustrations of some of the presently preferred embodiments. The scope of the disclosed subject matter should, therefore, be determined by the appended claims and their legal equivalents, rather than by the examples given above.

The invention claimed is:

1. A motor vehicle, including:
   (a) a body,
   (b) a motor adapted to propel said motor vehicle,
   (c) a set of wheels for supporting said motor vehicle on a roadway, said set of wheels comprising:
      a pair of front wheels; and
      a pair of rear wheels;
   wherein said set of wheels defines a set of corner areas of said motor vehicle,
   (d) a suspension system connecting said body with each of said wheels, said suspension system being adapted to permit relative displacement between said wheels and said body,
   (e) a movable underbody adapted to produce downforce, said movable underbody including a corresponding set of corner areas, wherein said movable underbody is not fixed to said body,
   (f) a retraction means for elevating and lowering said movable underbody relative to said body,
      wherein elevation of said movable underbody to said body functionally disengages said movable underbody from said suspension system so that said movable underbody does not substantially displace vertically with said set of wheels relative to said body, and wherein lowering of said movable underbody away from said body functionally engages said movable underbody with said suspension system so that said movable underbody displaces vertically and substantially relative to said body with said set of wheels, and (g) a suspension-mounted support means for dynamically supporting said movable underbody when said movable underbody is engaged with said suspension system, said support means being adapted so that said movable underbody maintains a more constant distance and orientation above a roadway being traversed than maintained by said body when said movable underbody is engaged with said suspension system.

2. The motor vehicle of claim 1, further including a retraction control means adapted to be actuated by a driver of said motor vehicle and operatively connected to said retraction means.

3. The motor vehicle of claim 1, further including:
a retraction control means, comprising
sensor means for sensing one or more of the following inputs: (a) current position of said movable underbody, (b) current movements of said suspension system, (c) a state of a vehicle electronic stability control system, and (d) a signal from a driver-operated retraction switch; and
a retraction actuator adapted to activate said retraction means responsive to said sensor means.

4. The motor vehicle of claim 1, wherein said suspension-mounted support means includes a tensile support linkage extending between said suspension system and said movable underbody at each of said corner areas of said motor vehicle, each said tensile support linkage being adapted to constrain in the downward direction, through tension thereon, and not to substantially constrain in the upward direction, movement of said movable underbody, and wherein each said tensile support linkage does not transmit substantial force between said suspension system and said movable underbody when said movable underbody is retracted.

5. The motor vehicle of claim 1, wherein said suspension-mounted support means includes a portion of each of said corner areas of said movable underbody, or a structure attached to each of said corner areas of said movable underbody, said portion or structure being adapted to press upon a portion of said suspension system, or a structure attached to said suspension system, such that movement of said movable underbody is constrained in the downward direction and not substantially constrained in the upward direction.

6. The motor vehicle of claim 1, further including a stabilization linkage means adapted to limit horizontal movements of said movable underbody relative to said body and to not substantially limit vertical movements of said movable underbody relative to said body as said motor vehicle traverses a roadway.

7. The motor vehicle of claim 1, further including a movable underbody height-adjustment means for varying the height of at least one of said corner areas of said movable underbody with respect to the roadway during travel of said motor vehicle when said movable underbody is supported by said suspension-mounted support means.

8. The motor vehicle of claim 1, further including at least one powered fan mounted to said movable underbody, said at least one powered fan being adapted to accelerate or evacuate air below said movable underbody.

9. The motor vehicle of claim 1, wherein said movable underbody includes a lower surface having an orifice, said motor vehicle further including:

a vacuum generator adapted to generate negative pressure, and
a vacuum connection adapted to transmit negative pressure generated by said vacuum generator to said orifice, whereby negative pressure is transmitted to said lower surface of said movable underbody.

10. The motor vehicle of claim 9, further including a skirt extending about and depending from a periphery of said movable underbody, said skirt being adapted to help maintain negative pressure below said movable underbody.

11. The motor vehicle of claim 1, wherein said movable underbody includes an adjustable aerodynamic surface, said motor vehicle further including an adjustable aerodynamic surface actuator adapted to move said adjustable aerodynamic surface during travel of said motor vehicle.

12. The motor vehicle of claim 1, further including at least one aerodynamic fence attached to said movable underbody and located between said movable underbody and said body, thereby influencing the airflow between and around said movable underbody and said body to promote the generation of downforce.

13. A motor vehicle, including:
(a) a body,
(b) a motor adapted to propel said motor vehicle,
(c) a set of wheels for supporting said motor vehicle on a roadway, said set of wheels comprising:
a pair of front wheels; and
a pair of rear wheels;
wherein said set of wheels defines a set of corner areas of said motor vehicle,
(d) a suspension system connecting said body with each of said wheels, said suspension system being adapted to permit relative displacement between said wheels and said body,
(e) a movable underbody adapted to produce downforce, said movable underbody including a corresponding set of corner areas, wherein said movable underbody is not fixed to said body,
(f) a suspension-mounted support means for dynamically supporting said movable underbody such that said movable underbody maintains a more constant distance and orientation above a roadway being traversed than maintained by said body, and
(g) a movable underbody height-adjustment means for varying the height of at least one of said corner areas of said movable underbody with respect to the roadway during travel of said motor vehicle including an element connected to said suspension system.

14. The motor vehicle of claim 13, further including a movable underbody height-adjustment control means adapted to be actuated by a driver of said motor vehicle and operatively connected to said movable underbody height-adjustment means.

15. The motor vehicle of claim 13, further including:
one or more sensors; and
a movable underbody height-adjustment control means which is responsive to a signal sent from said one or more sensors said movable underbody height-adjustment control means being operatively connected to said movable underbody height-adjustment means.

16. A motor vehicle, including:
(a) a body,
(b) a motor adapted to propel said motor vehicle,
(c) a set of wheels for supporting said motor vehicle on a roadway, said set of wheels comprising:
a pair of front wheels; and
a pair of rear wheels;

wherein said set of wheels defines a set of corner areas of said motor vehicle,
(d) a suspension system connecting said body with each of said wheels, said suspension system being adapted to permit relative displacement between said wheels and said body,
(e) a movable underbody adapted to produce downforce, said movable underbody including a corresponding set of corner areas, wherein said movable underbody is not fixed to said body,
(f) a suspension-mounted support means for dynamically supporting said movable underbody such that said movable underbody maintains a more constant distance and orientation above a roadway being traversed than maintained by said body, and
(g) a stabilization linkage means adapted to limit horizontal movements of said movable underbody relative to said body and to not substantially limit vertical movements of said movable underbody relative to said body as said motor vehicle traverses a roadway.

17. The motor vehicle of claim 16, wherein said suspension-mounted support means includes a support linkage extending between said suspension system and said movable underbody at each of said corner areas of said motor vehicle, each said support linkage being adapted to at least constrain in the downward direction, through tension thereon, movement of the movable underbody.

18. A motor vehicle, including:
(a) a body,
(b) a motor adapted to propel said motor vehicle,
(c) a set of wheels for supporting said motor vehicle on a roadway, said set of wheels comprising:
a pair of front wheels; and
a pair of rear wheels;
wherein said set of wheels defines a set of corner areas of said motor vehicle,
(d) a suspension system connecting said body with each of said wheels, said suspension system being adapted to permit relative displacement between said wheels and said body,
(e) a movable underbody adapted to reduce aerodynamic drag, said movable underbody including a corresponding set of corner areas, wherein said movable underbody is not fixed to said body,
(f) a retraction means for elevating and lowering said movable underbody relative to said body,
wherein elevation of said movable underbody to said body functionally disengages said movable underbody from said suspension system so that said movable underbody does not substantially displace vertically with said set of wheels relative to said body, and
wherein lowering of said movable underbody away from said body functionally engages said movable underbody with said suspension system so that said movable underbody displaces vertically and substantially relative to said body with said set of wheels, and
(g) a suspension-mounted support means for dynamically supporting said movable underbody when said movable underbody is engaged with said suspension system, said support means being adapted so that said movable underbody maintains a more constant distance and orientation above a roadway being traversed than maintained by said body when said movable underbody is engaged with said suspension system.

19. The motor vehicle of claim 18, further including at least one aerodynamic fence attached to said movable underbody and located between said movable underbody and said body, thereby influencing the airflow between and around said movable underbody and said body to reduce aerodynamic drag.

20. The motor vehicle of claim 18, further including at least one wheel fairing attached to said movable underbody.

21. A motor vehicle, including:
(a) a body,
(b) a motor adapted to propel said motor vehicle,
(c) a set of wheels for supporting said motor vehicle on a roadway, said set of wheels comprising:
a pair of front wheels; and
a pair of rear wheels;
wherein said set of wheels defines a set of corner areas of said motor vehicle,
(d) a suspension system connecting said body with each of said wheels, said suspension system being adapted to permit relative displacement between said wheels and said body,
(e) a movable underbody adapted to produce downforce, wherein said movable underbody is not fixed to said body,
(f) body-mounted movable underbody height-adjustment actuators adapted to support and move said movable underbody thereby allowing said movable underbody to maintain a more constant distance and orientation above a roadway being traversed than maintained by said body,
(g) ride-height sensors adapted to produce output pertaining to the ride height and orientation of said movable underbody,
(h) a body-mounted movable underbody height-adjustment electronic control unit which is responsive to said output from said ride-height sensors and adapted to generate output to said body-mounted movable underbody height-adjustment actuators such that said movable underbody maintains a more constant distance and orientation above a roadway being traversed than maintained by said body, and
(i) a stabilization linkage means adapted to limit horizontal movements of said movable underbody relative to said body and to not substantially limit vertical movements of said movable underbody relative to said body as said motor vehicle traverses a roadway.

\* \* \* \* \*